(12) United States Patent
Shozakai et al.

(10) Patent No.: US 8,606,580 B2
(45) Date of Patent: Dec. 10, 2013

(54) SPEECH DATA PROCESS UNIT AND SPEECH DATA PROCESS UNIT CONTROL PROGRAM FOR SPEECH RECOGNITION

(75) Inventors: Makoto Shozakai, Atsugi (JP); Goshu Nagino, Kawasaki (JP)

(73) Assignee: Asahi Kasei Kabushiki Kaisha, Osaka (JP)

( * ) Notice: Subject to any disclaimer, the term of this patent is extended or adjusted under 35 U.S.C. 154(b) by 558 days.

(21) Appl. No.: 12/318,494

(22) Filed: Dec. 30, 2008

(65) Prior Publication Data
US 2009/0138263 A1 May 28, 2009

Related U.S. Application Data

(62) Division of application No. 10/896,317, filed on Jul. 22, 2004, now Pat. No. 7,548,651.

(30) Foreign Application Priority Data

| Oct. 3, 2003 | (JP) | 2003-345984 |
| Oct. 30, 2003 | (JP) | 2003-370980 |
| Dec. 24, 2003 | (JP) | 2003-428015 |

(51) Int. Cl.
*G10L 15/04* (2013.01)

(52) U.S. Cl.
USPC ........... 704/251; 704/246; 704/250; 704/255; 704/256; 704/231; 704/238; 704/239; 704/243; 704/244; 704/245

(58) Field of Classification Search
USPC .............................. 704/250–257
See application file for complete search history.

(56) References Cited

U.S. PATENT DOCUMENTS 6,990,238 B1    1/2006 Saffer et al.

FOREIGN PATENT DOCUMENTS

JP    2002-162989    6/2002

OTHER PUBLICATIONS

Roland Kuhn et al., "Rapid Speaker Adaptation in Eigenvoice Space", Nov. 2000, IEEE, pp. 695-707.*
Jain et al., "Statistical Pattern Recognition: A Review," IEEE Transactions on Pattern Analysis and Machine Intelligence, IEEE Service Center, Los Alamitos, CA, US, vol. 22, No. 1, Jan. 2000, pp. 4-37, XP000936788.
Nagino et al., "Building an Effective Corpus by Using Acoustic Space Visualization (Cosmos) Method," Acoustics, Speech, and Signal Processing, 2005. Proceedings. (ICASSP '05). IEEE International Conference in Philadelphia, Pennsylvania, USA Mar. 18-23, 2005, Piscataway, NJ, USA, IEEE, Mar. 18, 2005, pp. 449-452.

(Continued)

*Primary Examiner* — Richemond Dorvil
*Assistant Examiner* — Mark Villena
(74) *Attorney, Agent, or Firm* — Finnegan, Henderson, Farabow, Garrett & Dunner, L.L.P.

(57) ABSTRACT

To provide a data process unit and data process unit control program that are suitable for generating acoustic models for unspecified speakers taking distribution of diversifying feature parameters into consideration under such specific conditions as the type of speaker, speech lexicons, speech styles, and speech environment and that are suitable for providing acoustic models intended for unspecified speakers and adapted to speech of a specific person. The data process unit comprises a data classification section, data storing section, pattern model generating section, data control section, mathematical distance calculating section, pattern model converting section, pattern model display section, region dividing section, division changing section, region selecting section, and specific pattern model generating section.

31 Claims, 52 Drawing Sheets

(56) References Cited

OTHER PUBLICATIONS

Nagorski et al., "Optimal Selection of Speech Data for Automatic Speech Recognition Systems," ICSLP 2002: 7th International Conference on Spoken Language Processing, Sep. 2002, p. 2473-2476.
Jain et al., "Statistical Pattern Recognition: A Review," IEEE Transactions on Pattern Analysis and Machine Intelligence, vol. 22, No. 1, Jan 2001.
Mukaigawa et al., "Kino Ronri Program ni Okeru Zokusei no Tokeiteki Joho no Kashika ni Okeru ichi Kosatsu," Dai 47 Kai Jinko Chino Kisoron Kenkyukai Shiryo, Jan. 25, 2002, pp. 81-86.
Toriwaki, Ninshiki Kogaku, Koronasha Kabushiki Kaisha, Mar. 15, 1993, pp. 52-56.
Mori et al., "Shikibetsu Joho o Riyo shita Class Joho no Graph Hyoji." The Institute of Electroncis, Information and Communication Engineers Gitjutsu Kenkyu Hokoku, [Pattern Ninshiki Media Rikai], 2000, PRMU 2000-120, pp. 7-12.
Rabiner et al., "Fundamentals of Speech Recognition", Prentice-Hall, Inc., pp. vii-xiii, and 320-389, (1993).
Kosaka et al., "Tree-Structured Speaker Clustering for Fast Speaker Adaptation", Proc. ICASSP, vol. 1, pp. I-245 to I-248, (1994).
Kosaka et al., "Tree-Structured Speaker Clustering for Fast Speaker Adaptation", vol. J83-D-11, No. 1, (1995).
Sammon, Jr., "A Nonlinear Mapping for Data Structure Analysis", IEEE Trans. Computers, vol. C-18, No. 5, pp. 401-409, (1969).
Fisher, "The Use of Multiple Measurements in Taxonomic Problems", Ann. Eugenics, vol. 7, Part II, pp. 179-188, (1936).
Aladjem, "Multiclass Discriminant Mappings"; Signal Processing, vol. 35, pp. 1-18, (1994).
Mao et al., "Artificial Neural Networks for Feature Extraction and Multivariate Data Projection", IEEE Transactions on Neural Networks, vol. 6, No. 2, pp. 296-317, (1995).
Mori et al., "Comparison of Low-Dimensional Mapping Techniques Based on Discriminatory Information", Proc. $2^{nd}$ International ICSC Symposium on Advances in Intelligent Data Analysis (AIDA' 2001), CD-ROM Paper No. 1724-166, (2001).
Friedman et al., "A Projection Pursuit Algorithm for Exploratory Data Analysis", IEEE Transactions on Computers, vol. C-23, No. 9, pp. 881-889, (1974).
Kohonen, "Self-Organizing Maps"; Springer Series in Information Sciences, Third Edition, vol. 30, pp. XVI-XX, 103-177, (1995).
International Preliminary Examination Report dated May 9, 2005 (PCT/JP 2004/010390).
Isobe et al., "Speaker Verification Based on Speaker Background Model Virtually Synthesized Using Local Acoustic Information," vol. J83-D-11, No. 11, (Nov. 2000).
Kiyohiro et al., "Digital Signal Processing for Speech and Sound Signal," Nov. 10, 1997.

\* cited by examiner

FIG. 14

| REGIONAL ACOUSTIC MODEL | A | B | C | D |
|---|---|---|---|---|
| FIRST SEGMENT REGION | 95.4% | 88.5% | 59.8% | 28.2% |
| SECOND SEGMENT REGION | 96.0% | 89.1% | 60.9% | 24.7% |
| THIRD SEGMENT REGION | 98.3% | 96.0% | 83.3% | 54.0% |
| FOURTH SEGMENT REGION | 93.7% | 86.2% | 55.7% | 27.6% |
| FIFTH SEGMENT REGION | 95.4% | 87.4% | 47.7% | 23.6% |
| WHOLE REGION | 97.1% | 92.0% | 75.9% | 33.9% |

FIG. 15

| SPEECH STYLE | INSTRUCTIONS GIVEN BEFORE RECORDING | Star SYMBOL |
|---|---|---|
| NORMALLY | READ THE WORD LIST AT A USUAL SPEED | ◇ |
| PAPIDLY | READ THE WORD LIST FASTER THAN USUAL | ○ |
| IN A HIGH VOICE | READ THE WORD LIST IN A HIGHER THAN NORMAL VOICE | ● |
| IN A SMALL VOICE | READ THE WORD LIST IN A SMALLER THAN NORMAL VOICE | △ |
| IN A LOUD VOICE | READ THE WORD LIST LOUDLY SO THAT IT CAN BE HEARD EVEN BY PEOPLE FAR WAY | □ |
| LOMBARD | READ THE WORD LIST WHILE HEARING CAR NOISE | ■ |
| DISTINCTLY | READ THE WORD LIST BY PRONOUNCING EACH KANA DISTINCTLY | × |

F I G. 17
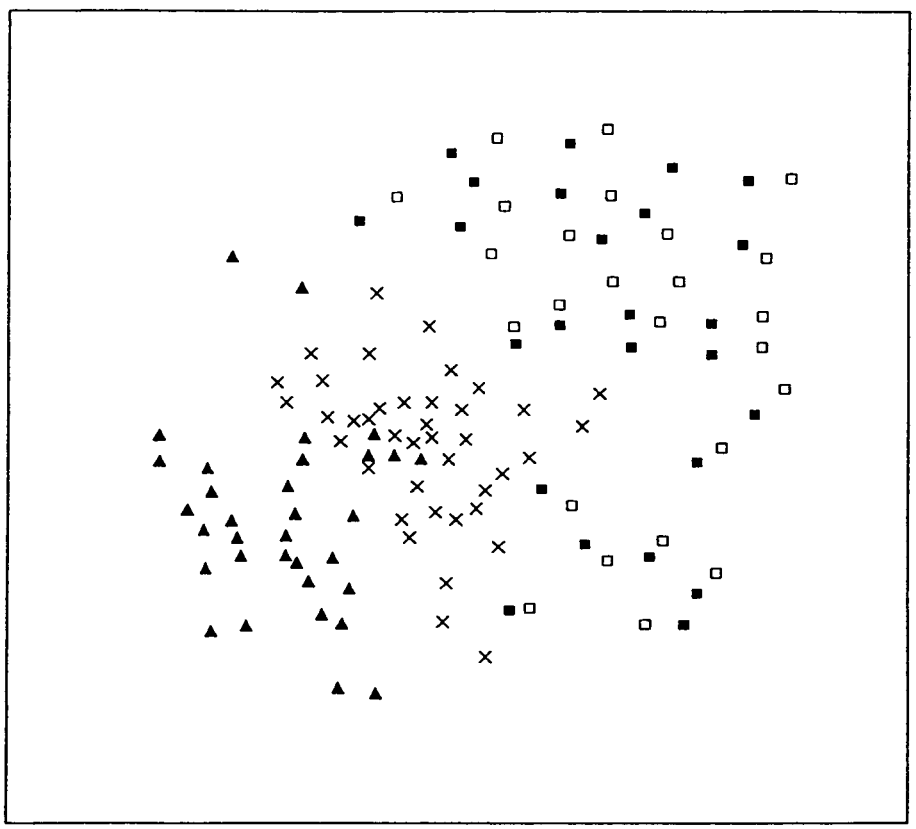

F I G. 18
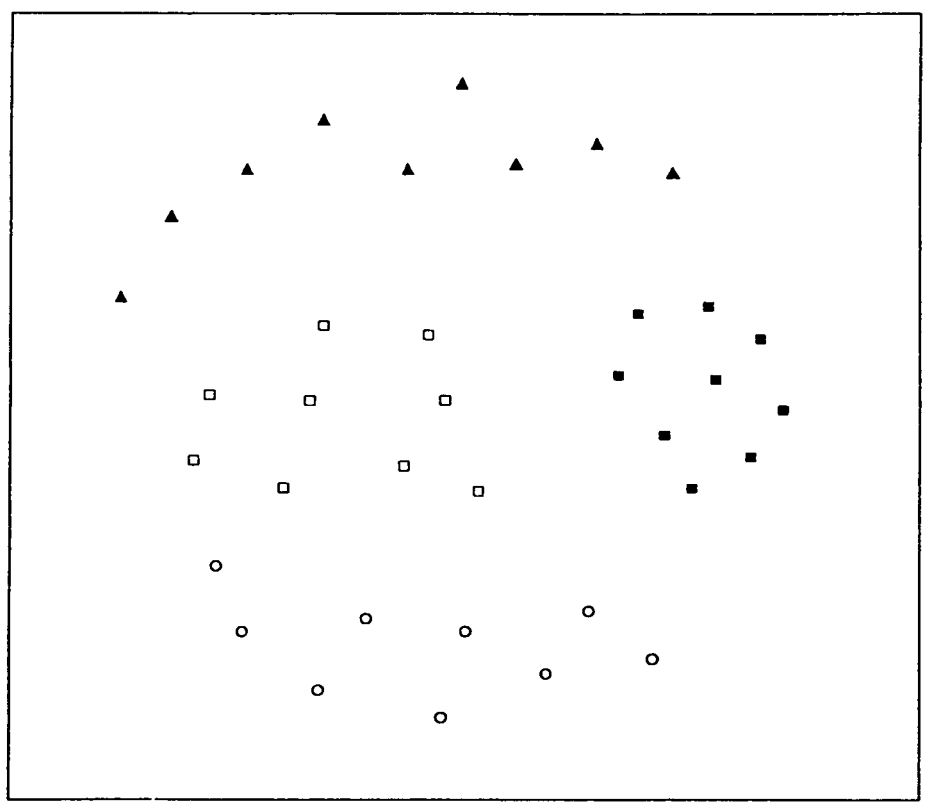

F I G. 19
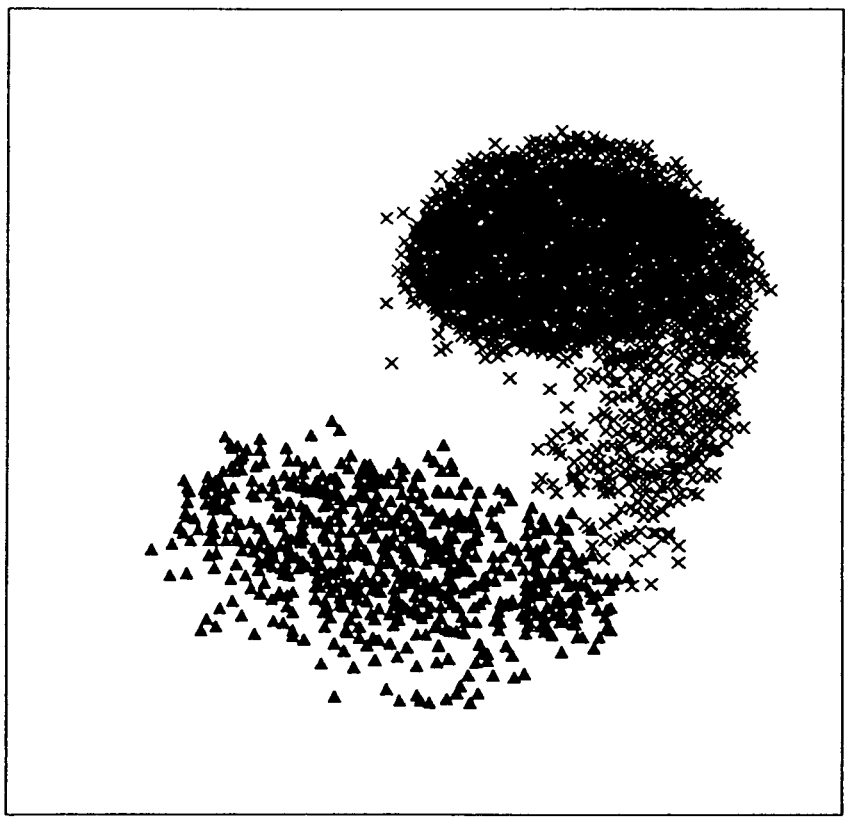

F I G. 20
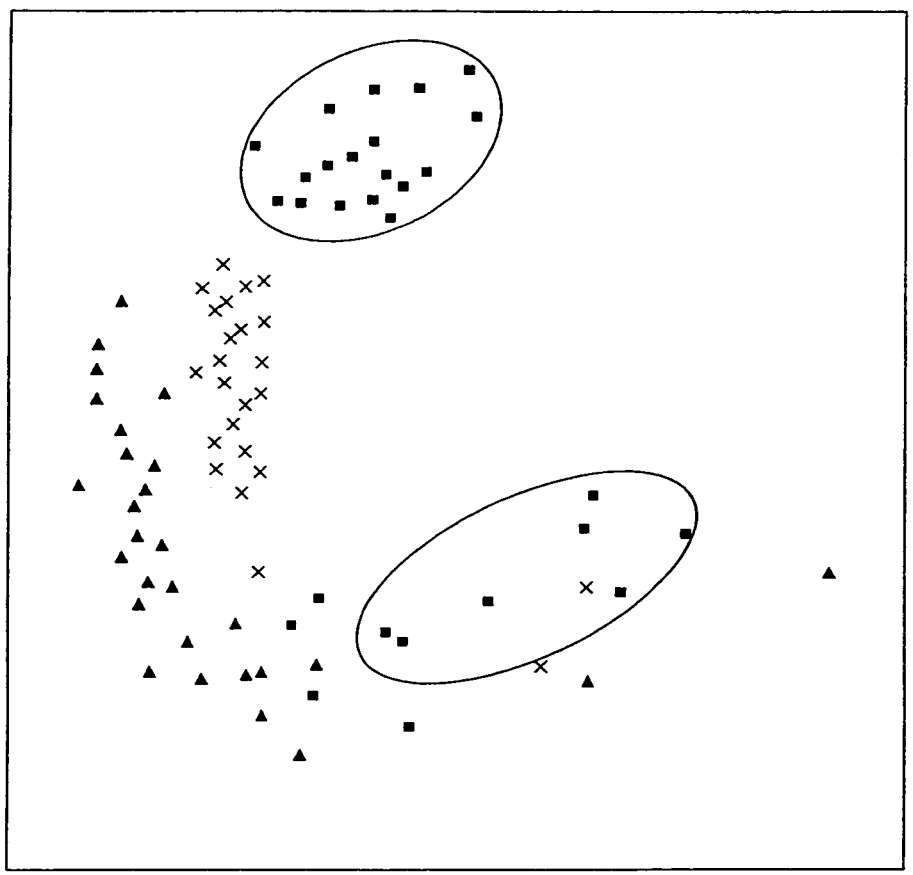

F I G. 23
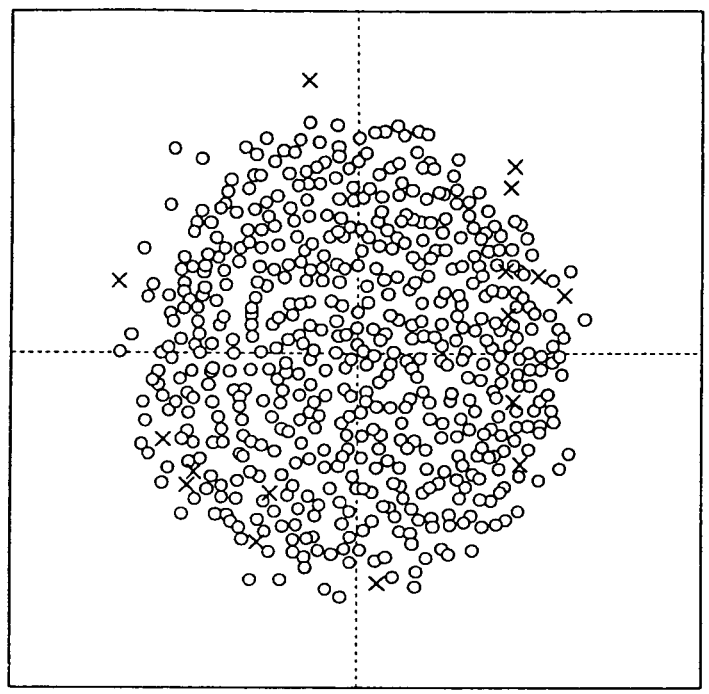
F I G. 24
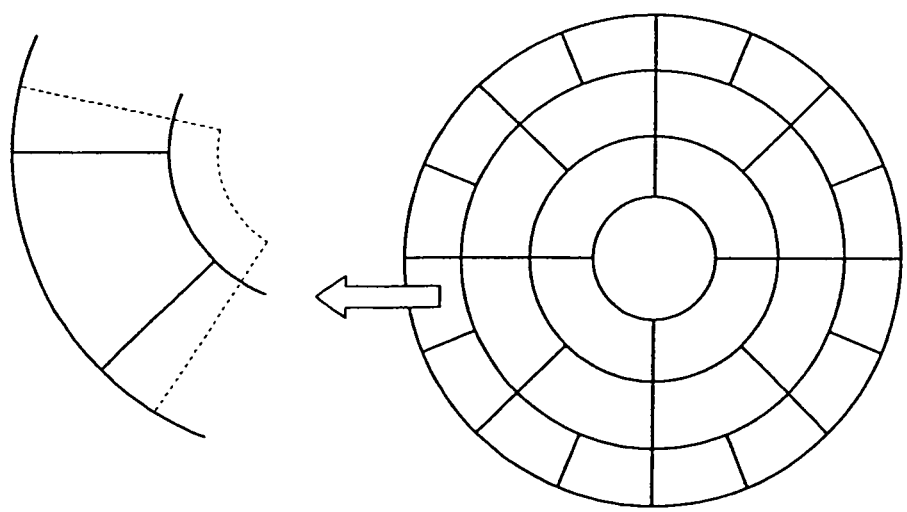

FIG.29(a)

| SPEECH STYLE | INSTRUCTIONS GIVEN BEFORE RECORDING | SYMBOL |
|---|---|---|
| NORMALLY | UTTER AT A USUAL SPEED | × |
| PAPIDLY | UTTER FASTER THAN USUAL | △ |
| IN A HIGH VOICE | UTTER IN A HIGHER THAN NORMAL VOICE | ○ |
| IN A SMALL VOICE | UTTER IN SUCH A WAY AS NOT TO BE HEARD EVEN BY PEOPLE NEARBY | ● |
| IN A LOUD VOICE | UTTER IN SUCH A WAY AS TO BE HEARD EVEN BY PEOPLE FAR WAY | ▲ |
| LOMBARD | UTTER WHILE HEARING CAR NOISE | □ |
| DISTINCTLY | PRONOUNCE EACH KANA DISTINCTLY | ■ |

FIG.29(b)

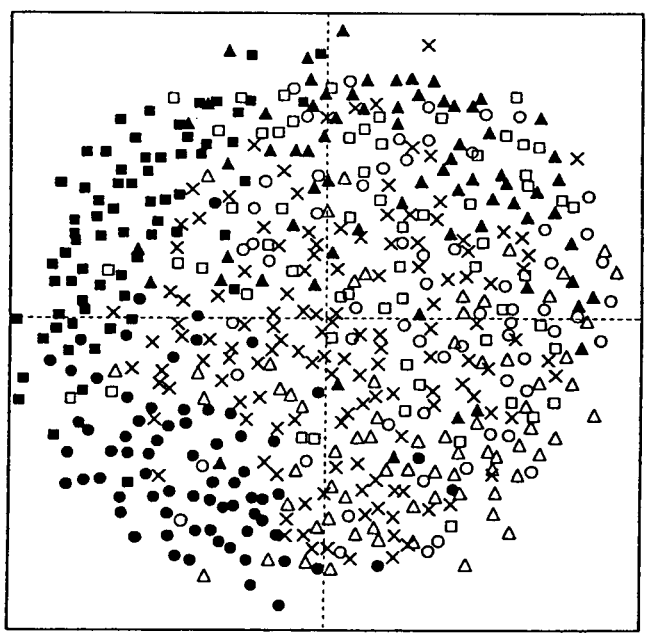

F I G. 43
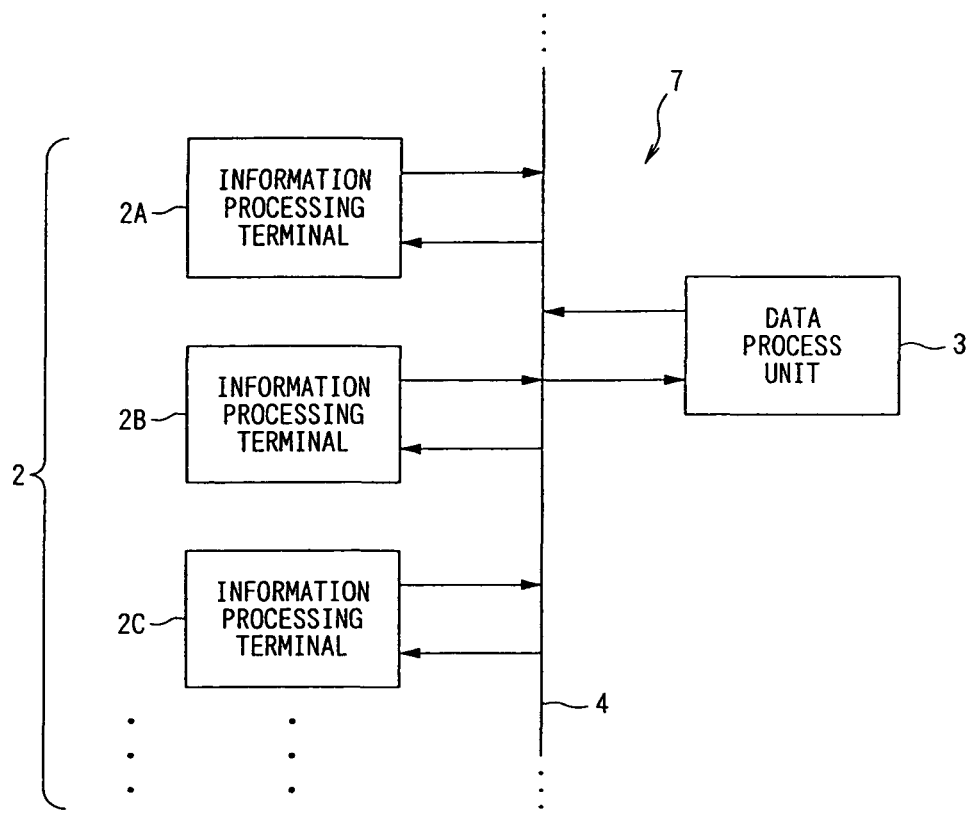

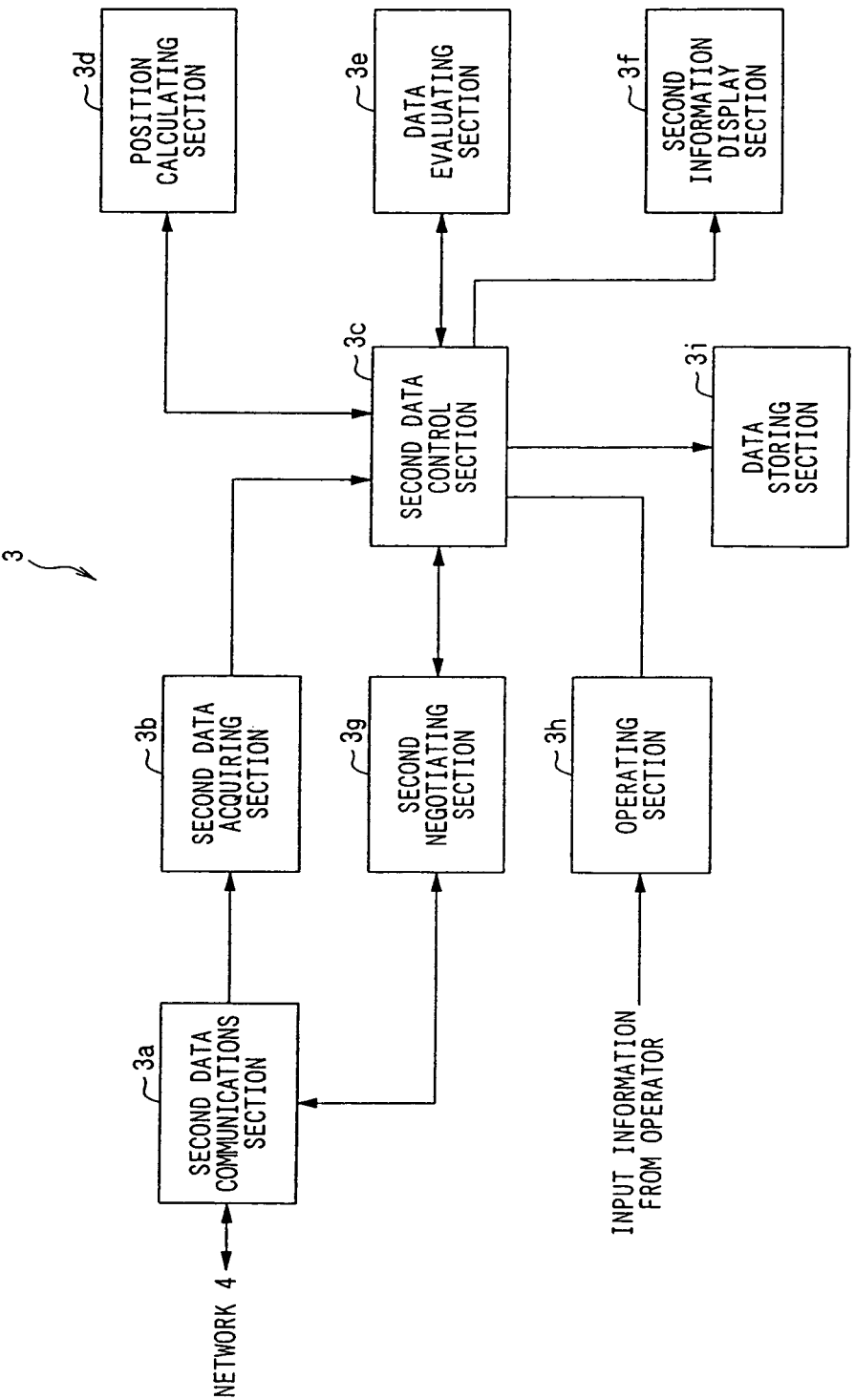

(a)

(b)

F I G. 48
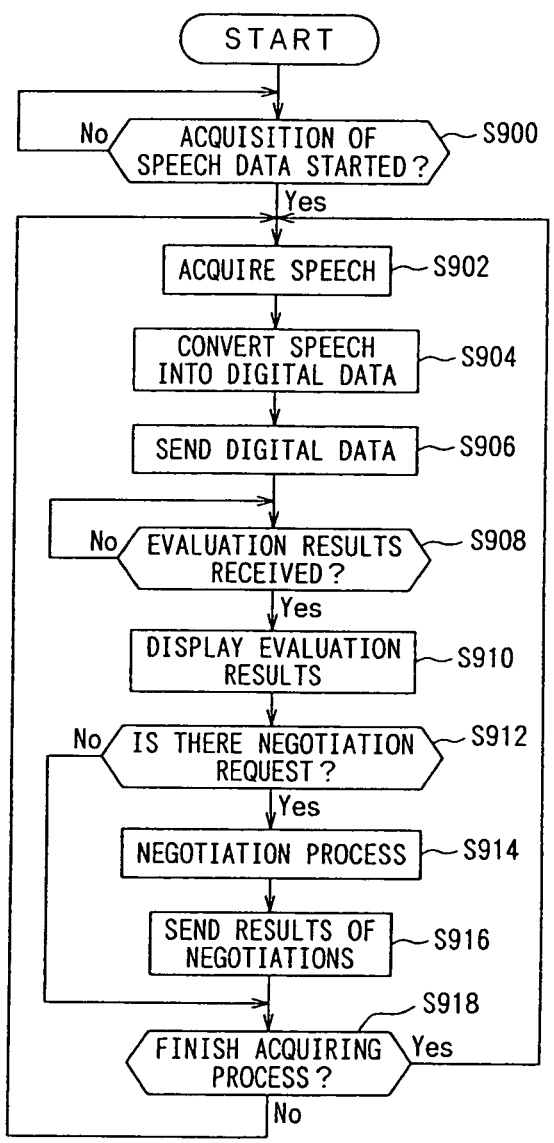

F I G. 50
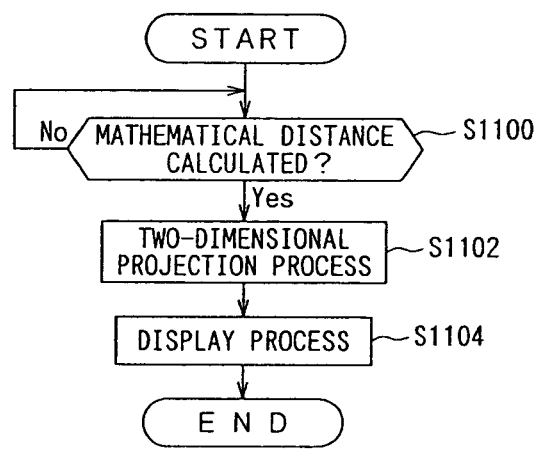

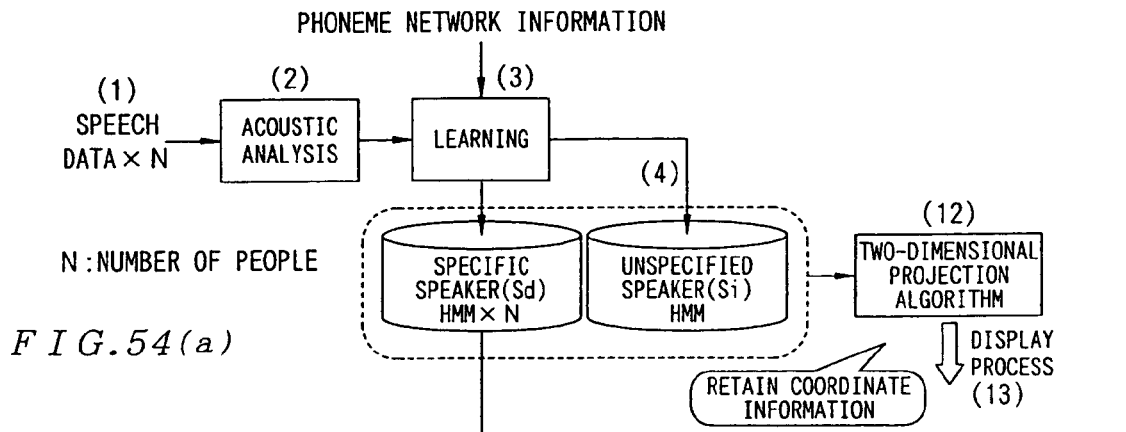
FIG.54(a)
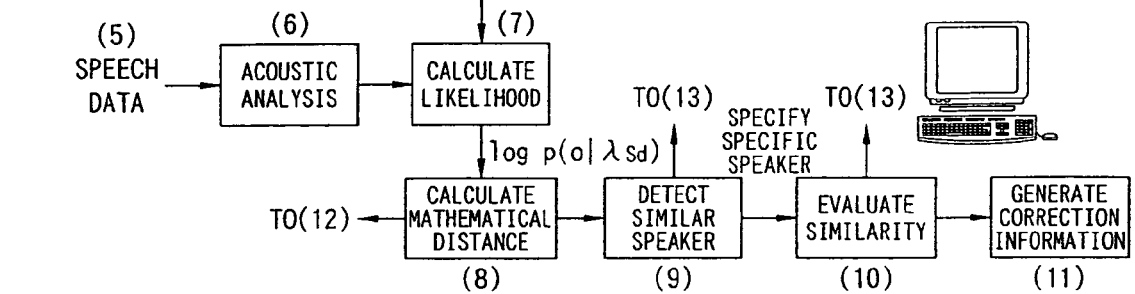
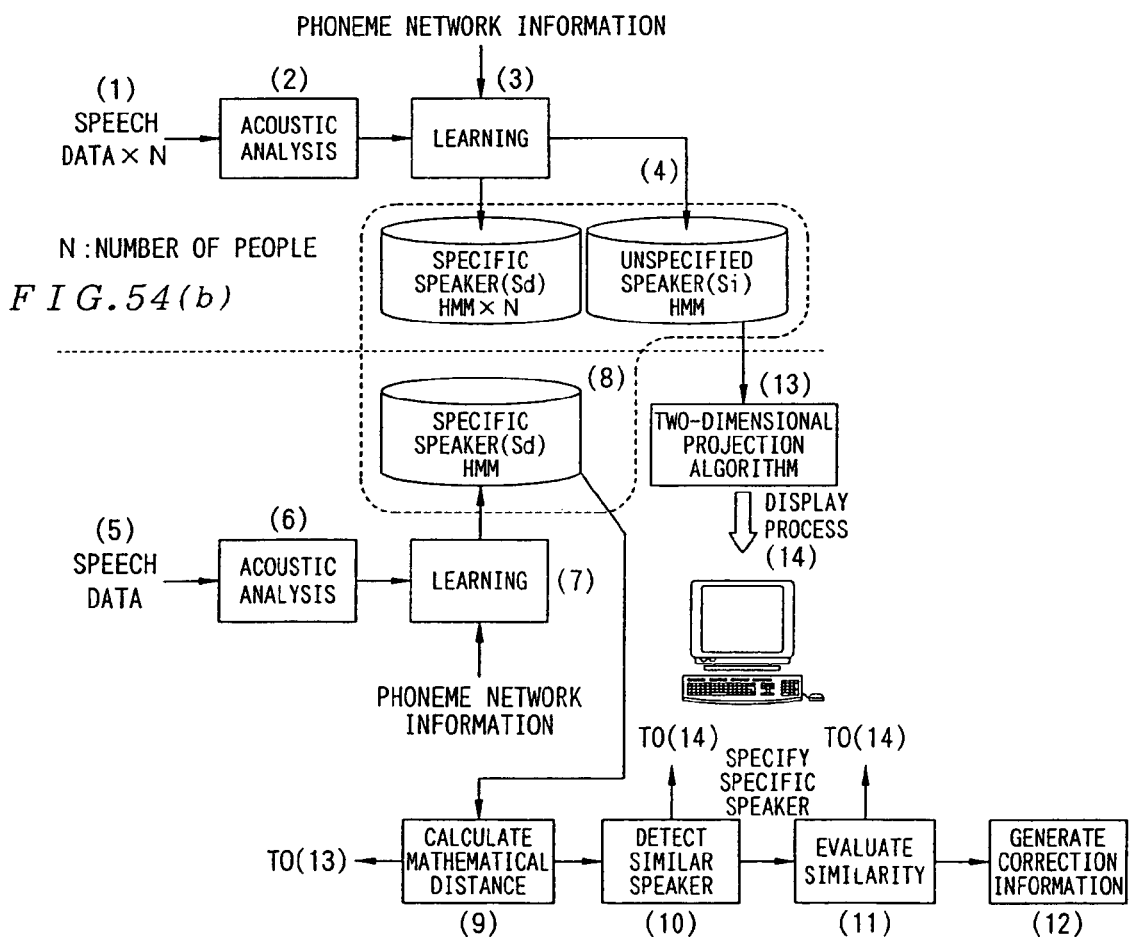
FIG.54(b)

F I G. 59
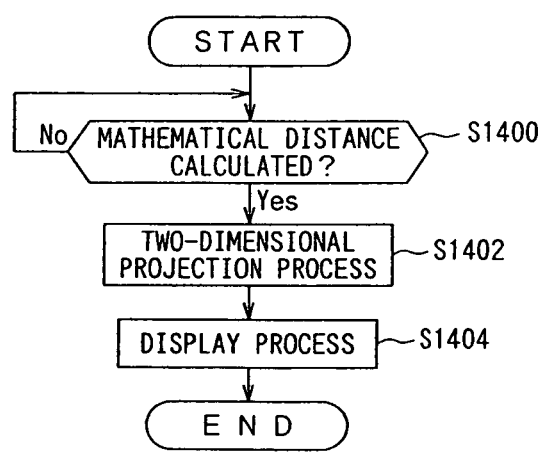

SPEECH DATA PROCESS UNIT AND SPEECH DATA PROCESS UNIT CONTROL PROGRAM FOR SPEECH RECOGNITION

This application is a division of application Ser. No. 10/896,317, filed on Jul. 22, 2004 now U.S. Pat. No. 7,548,651, which claims the benefit of priority from prior Japanese Patent Applications Nos. 2003-345,984, filed on Oct. 3, 2003, 2003-370,980, filed on Oct. 30, 2003, and 2003-428,015, filed on Dec. 24, 2003, the entire contents of each of which are incorporated herein by reference.

BACKGROUND OF THE INVENTION

1. Field of the Invention

The present invention relates to generation of pattern models used for pattern recognition of predetermined data on unspecified objects. More particularly, it relates to a data process unit, data process unit control program, pattern model search unit, pattern model search unit control program, and specific pattern model providing system which are suitable for generating pattern models for unspecified objects taking distribution of diversifying feature parameters into consideration under specific conditions consisting of a combination of such factors as a type of object and measurement environment of the predetermined data and which are suitable for providing pattern models intended for unspecified speakers and adapted to pattern recognition of predetermined data on specified objects; a data process unit, data process system, data process method, and data process unit control program which are suitable for evaluating the value of speech data of unidentified speakers using pattern models generated in relation to speech data of a plurality of speakers; and a data process unit, data process system, data process method, and data process unit control program which are suitable for detecting a speaker who resembles a target speaker in speech out of a plurality of speakers and which are suitable for providing information needed to enhance similarity in speech between the target speaker and the detected speaker.

2. Description of the Related Art

There is an information processing technology known as pattern recognition which involves observing or measuring some properties of objects and identifying and classifying the objects based on data obtained as a result of the observation or measurement.

Generally, speech recognition, which is a type of pattern recognition, comprises an acoustic analyzer which converts speech samples taken from a speaker into a series of feature parameters and speech matcher which matches the series of feature parameters obtained by the acoustic analyzer with information about feature parameters of vocabulary words prestored in a storage unit such as a memory or hard disk and selects the vocabulary word with the highest similarity as a recognition result.

Known acoustic analysis methods for converting speech samples into a series of feature parameters include cepstrum analysis and linear prediction analysis, which are described in Non-Patent Document 1.

Among speech recognition, a technique for recognizing speech of unspecified speakers is generally referred to as speaker independent speech recognition. Since information about feature parameters of vocabulary words is prestored in a storage unit, the speaker independent speech recognition frees the user from the task of registering words desired to be recognized, unlike speaker dependent speech recognition.

Regarding methods for preparing information about feature parameters of vocabulary words and matching it with a series of feature parameters obtained by converting input speech, methods based on Hidden Markov models (HMMs) are in common use. In HMM-based methods, phonetic units such as syllables, half-syllables, phonemes, biphones, and triphones are modeled using HMMs. Pattern models of such phonetic units are generally referred to as acoustic models.

Methods for creating acoustic models are described in detail in Section 1 of Non-Patent Document 1.

Also, those skilled in the art can easily construct a speaker independent speech recognition unit based on the Viterbi algorithm described in Section 6.4 of Non-Patent Document 1.

Conventionally, more than one acoustic model is often created according to sex (male/female), age (children/adults/the aged), and speech environment (which is dependent on noise).

Non-Patent Document 2 discloses a method for clustering high-dimensional acoustic models automatically using distance among the acoustic models. The clustering method involves performing clustering repeatedly on a trial-and-error basis by specifying a large number of clustering conditions until a good clustering result is obtained.

(Non-Patent Document 1) L. Rabiner et al., "Fundamentals of Speech Recognition," Prentice Hall, Inc., 1993.

(Non-Patent Document 2) T. Kosaka et al., "Tree-Structured Speaker Clustering for Fast Speaker Adaptation," Proc. ICASSP, Vol. I, pp. I-245-248, Adelaide, Australia, 1994.

However, as described above, a small number of acoustic models are often created according to sex (male/female), age (children/adults/the aged), and speech environment (which is dependent on noise) at the most. Consequently, to divide the acoustic models, there is no choice but to use a heuristic method based on transcendental knowledge. Thus, there are limits to available recognition rates.

Regarding Non-Patent Document 2, since there is no means to grasp interrelationship among acoustic models such as relative distance among acoustic models or the number and size of clusters of acoustic models easily in a visual way or the like, it is necessary to repeat calculations many times under a large number of clustering conditions until good clustering results are obtained. This requires a great deal of calculation time.

Generally, to implement high-accuracy speech recognition, since acoustic models are generated using cepstrum (described above), MFCC (Mel-Frequency Cepstrum Coefficient), or other high dimensional (10- to 30-dimensional) feature parameters, it is difficult to represent interrelationship among a plurality of acoustic models visually.

The above items apply not only to acoustic models, but also to pattern models in image recognition and other fields.

SUMMARY OF THE INVENTION

The present invention has been made in view of the above problems with conventional techniques and has an object to provide a data process unit, data process unit control program, pattern model search unit, pattern model search unit control program, and specific pattern model providing system which are suitable for generating pattern models for unspecified objects taking distribution of diversifying feature parameters into consideration under specific conditions consisting of a combination of factors and which are suitable for providing pattern models intended for unspecified speakers and adapted to pattern recognition of predetermined data on specified objects; a data process unit, data process system, data process method, and data process unit control program which are suitable for evaluating the value of speech data of unidentified speakers using pattern models generated in relation to speech data of a plurality of speakers; and a data process unit, data process system, data process method, and data process unit control program which are suitable for detecting a speaker who resembles a target speaker in speech out of a plurality of speakers and which are suitable for providing information needed to enhance similarity in speech between the target speaker and the detected speaker.

To achieve the above object, the present invention sets forth a data process unit comprising:

data classification means for classifying a plurality of predetermined data on a plurality of objects into a plurality of groups based on a plurality of specific conditions;

pattern model generating means for generating a plurality of pattern models which have 4-dimensional or higher dimensional elements for each group of predetermined data based on the predetermined data classified by the data classification means;

mathematical distance calculating means for calculating mathematical distance among the pattern models generated by the pattern model generating means for the respective groups;

pattern model converting means for converting the plurality of pattern models into the same number of low dimensional vectors corresponding to the pattern models in the lower dimension while maintaining distance relationship among the pattern models, based on the mathematical distance calculated by the mathematical distance calculating means; and low dimensional vector corresponding to pattern model display means for displaying the plurality of low dimensional vectors corresponding to pattern models as coordinate points in a low dimensional space of the same dimension as the low dimensional vectors corresponding to pattern models while maintaining the distance relationship, based on values of low dimensional elements.

With this configuration, the data classification means can classify a plurality of predetermined data on a plurality of objects into a plurality of groups based on a plurality of specific conditions, the pattern model generating means can generate a plurality of pattern models which contain 4-dimensional or higher dimensional elements for each group of predetermined data based on the predetermined data classified by the data classification means, the mathematical distance calculating means can calculate mathematical distance among the pattern models generated by the pattern model generating means for the respective groups, the pattern model converting means can convert the plurality of pattern models into the same number of low dimensional vectors corresponding to the pattern models in the lower dimension while maintaining distance relationship among the pattern models based on the mathematical distance calculated by the mathematical distance calculating means, and the low dimensional vector corresponding to pattern model display means can display the plurality of low dimensional vectors corresponding to pattern models as coordinate points in a low dimensional space of the same dimension as the low dimensional vectors corresponding to pattern models while maintaining the distance relationship based on values of low dimensional elements.

This makes it easy to grasp the distance relationship (similarity) among the pattern models visually. Also, since 4-dimensional or higher dimensional pattern models can be converted into 3-dimensional or lower dimensional pattern models, clustering and various other processes can be performed more easily.

Regarding the pattern models, when the predetermined data are speech data, for example, they are obtained by modeling patterns matched against the speech data and are expressed as statistical models or the like.

The predetermined data may be, for example, acoustic data on human voice, household noise, plant noise, traffic noise, or the like; animal sound data of wildlife such as wild birds, insects, frogs, bats, or other animals; image data; infrared sensor data, acceleration sensor data, azimuth sensor data, pressure sensor data, vibration sensor data from piezoelectric elements or vibration meters, or any other sensor data; physical data on charge status of batteries such as lithium-ion secondary batteries or fuel batteries; biomedical signal data such as electrocardiograms, electromyograms, blood pressure, or weight; microarray data for gene analysis; meteorological data such as temperature, humidity, or atmospheric pressure; environmental data such as oxygen concentration or nitrogen oxide concentration; economic trend data, such as stock prices or commodity prices, or other time series data; or the like.

It has been stated that pattern models contain 4-dimensional or higher dimensional elements. This is because, for example, in pattern recognition such as speech recognition, 4-dimensional or higher dimensional feature parameters are needed for high recognition performance as well as because there is no known 3-dimensional or lower dimensional feature parameter capable of achieving practically effective recognition performance.

Also, the predetermined data consist of, for example, a combination of data themselves which can be measured from a plurality of objects, feature values extracted from the data, pattern models generated based on the feature values, and a text file describing them. An example is a combination of data on speech uttered by a plurality of speakers, feature values extracted from the speech data, pattern models generated based on the feature values, and a text file describing them.

The mathematical distance represents similarity between the pattern model generated from the predetermined data on a specified object and pattern models of a plurality of objects. There can be various mathematical distances depending on measures of similarity. These measures correspond, for example, to distances such as Euclidean distance which can be measured with an ordinary ruler or distances such as Mahalanobis' generalized distance which cannot be measured with an ordinary ruler, where the Mahalanobis' generalized distance expresses distance corresponding to similarity as the inner product of two vectors and uses the angle between the two vectors as a measure of the similarity. According to the present invention, other possible mathematical distances include Bhattacharrya distance, squared Euclidean distance, cosine distance, Pearson correlation, Chebyshev distance, city-block distance (or Manhattan distance), Minkowski sums, Kullback information, and Chernov distance. In short, although called a distance, the mathematical distance according to the present invention may be anything as long as it represents similarity.

The pattern model converting means described above converts 4-dimensional or higher dimensional information into 2-dimensional, 3-dimensional, or other low dimensional information which lends itself easily to processing, using, for example, projection or the like. For example, all pattern models are projected into a low dimensional space (e.g., 2-dimensional or 3-dimensional space) in such a way that two pattern models with a small mathematical distance between them will be placed close to each other and that two pattern models with a large mathematical distance between them will be placed away from each other.

For example, if Euclidean distance is used as the mathematical distance, pattern models located at a small Euclidean distance from each other in the low dimensional space into which they are projected are considered to be similar to each other.

Known techniques for converting high dimensional pattern models into low dimensional vectors corresponding to lower dimensional pattern models and displaying the results in a low dimensional space include Sammon's method (see J. W. Sammon, "A nonlinear mapping for data structure analysis," IEEE Trans. Computers, Vol. C-18, No. 5, pp. 401-409, May 1969), discriminant analysis methods (see R. A. Fisher, "The use of multiple measurements in taxonomic Problems," Ann. Eugenics, Vol. 7, no. Part II, pp. 179-188, 1936), Aladjam's method (see M. Aladjem, "Multiclass discriminant mappings," Signal Process., Vol. 35, pp. 1-18, 1994), neural network techniques (see J. Mao et al., "Artificial neural networks for feature extraction and multivariate data projection," IEEE Trans. Neural Networks, Vol. 6, No. 2, pp. 296-317, 1995), graph-based techniques (see Y. Mod et al., "Comparison of low-dimensional mapping techniques based on discriminatory information," Proc. 2nd International ICSC Symposium on Advances in Intelligent Data Analysis (AIDA'2001), CD-ROM Paper No. 1724-166, Bangor, United Kingdom, 2001), projection pursuit methods (see J. H. Freidman et al., "A projection pursuit algorithm for exploratory data analysis," IEEE trans. Comput., Vol. C-23, No. 9, pp. 881-889, 1974), SOM methods (see T. Kohonen, "Self-Organizing Maps," Springer Series in Information Sciences, Vol. 30, Berlin, 1995).

The present invention sets forth the data process unit, wherein the plurality of predetermined data on a plurality of objects are one of human voice data, ambient noise data, animal sound data, image data, infrared data, and acceleration data.

In this way, the data process unit can generate pattern models from one type of data out of human voice data; ambient noise data such as household noise; animal sound data of wildlife such as wild birds, insects, frogs, bats, or other animals; image data; infrared sensor data; and acceleration sensor data.

The present invention sets forth the data process unit, wherein:
  the plurality of predetermined data on a plurality of objects are data on a plurality of speech sounds produced by a plurality of speakers; and
  the plurality of specific conditions include at least, the type of speaker, speech lexicons, speech styles, and speech environment.

This makes it possible to generate pattern models of speech data taking into consideration at least the type of speaker including the name, sex (male/female), age (children/adults/the aged) of speakers; speech lexicons such as numerals, sentences, and words; speech styles such as the rate of speech, loudness of speech, and features due to dialects; and speech environment such as indoor, in-car, in-plant, or outdoor environment (classification by location).

The present invention sets forth the data process unit, wherein the data classification means forms a group of predetermined data under each combination of specific conditions selected freely from the plurality of specific conditions.

In this way, the data classification means can form a group of predetermined data under each combination of specific conditions selected freely from the plurality of specific conditions.

Thus, for example, if the predetermined data are human voice data, a group can be formed under a desired combination of specific conditions, such as that an adult male (type of speaker) uttered words (speech lexicon) rapidly (speech style) indoors (speech environment). Of course, the data may be grouped under broader conditions, such as that an adult male (type of speaker) spoke indoors (speech environment).

The present invention sets forth the data process unit, wherein the pattern models are generated using HMMs (Hidden Markov Models).

In this way, the pattern models are generated using HMMs (Hidden Markov Models).

For example, speech varies in time span with the speaking speed and has a characteristic shape (spectral envelope) in the frequency domain according to the content of an utterance. The shape fluctuates depending on the specific conditions. The HMMs, for example, are statistical models which can absorb the fluctuations.

The present invention sets forth the data process unit, wherein the mathematical distance calculating means calculates the mathematical distance using one of Euclidean distance determined based on a mean vector of normal distributions of the pattern models generated using the HMMs, Euclidean distance determined based on a mean vector of normal distributions of the pattern models normalized by the standard deviation of the normal distributions of the pattern models, and Bhattacharrya distance determined based on normal distributions of the pattern models.

In this way, the mathematical distance calculating means can calculate the mathematical distance using one of Euclidean distance determined based on a mean vector of normal distributions of the pattern models generated using the HMMs, Euclidean distance determined based on a mean vector of normal distributions of the pattern models normalized by the standard deviation of the normal distributions of the pattern models, and Bhattacharrya distance determined based on normal distributions of the pattern models.

Thus, by using any of the above-mentioned distances, it is possible to calculate more appropriate mathematical distance among the pattern models.

The present invention sets forth the data process unit, wherein the pattern model converting means converts the pattern models into the low dimensional vectors corresponding to the pattern models using Sammon's method.

In this way, the pattern model converting means can convert the pattern models into the low dimensional vectors corresponding to the pattern models using Sammon's method.

Thus, the use of known Sammon's method makes it possible to convert the pattern models into the same number of low dimensional vectors corresponding to the pattern models while maintaining distance relationship among the pattern models.

The present invention sets forth the data process unit, comprising region dividing means for automatically dividing the coordinate points of the plurality of low dimensional vectors corresponding to pattern models displayed in the low dimensional space by the low dimensional vector corresponding to pattern model display means into a plurality of regions in the low dimensional space.

With this configuration, the region dividing means can automatically divide the coordinate points of the plurality of low dimensional vectors corresponding to pattern models displayed in the low dimensional space by the low dimensional vector corresponding to pattern model display means into a plurality of regions in the low dimensional space.

Thus, the coordinate points of the plurality of low dimensional vectors corresponding to pattern models can be divided easily, making it easy to see visually to what region a particular pattern model belongs.

The present invention sets forth the data process unit, wherein the region dividing means divides the plurality of low dimensional vectors corresponding to pattern models by an outer circle and n inner circles (n is an integer equal to or larger than 1) and further divides ring-shaped regions formed by the concentric outer and inner circles therebetween into a plurality of regions by lines extending radially, where the outer circle is centered at the center of gravity of the coordinate points of all the low dimensional vectors corresponding to pattern models and has a radius equal to the distance between the center of gravity and the coordinate point of the low dimensional vector corresponding to pattern model farthest from the center of gravity while the inner circle is centered at the center of gravity and has a radius smaller than that of the outer circle.

Thus, the ring-shaped regions formed by the concentric outer and inner circles can be divided into a plurality of fan-shaped regions.

The present invention sets forth the data process unit, comprising division changing means for changing the results of divisions produced automatically by the region dividing means.

With this configuration, the division changing means can change the results of divisions produced automatically by the region dividing means.

Thus, if results of divisions are inappropriate or new pattern models are added, the results of divisions can be changed appropriately. Also, since visualized results of divisions of pattern models are changed, the results of divisions can be changed easily.

The present invention sets forth the data process unit, comprising: region selecting means capable of selecting a plurality of low dimensional vectors corresponding to pattern models for each region produced by region dividing means; and regional pattern model generating means for generating pattern models based on the predetermined data related to the pattern models corresponding to the low dimensional vectors corresponding to pattern models located in the region selected by the region selecting means.

With this configuration, the region selecting means can select a plurality of low dimensional vectors corresponding to pattern models for each region produced by region dividing means and the regional pattern model generating means can generate pattern models based on the predetermined data related to the pattern models corresponding to the low dimensional vectors corresponding to pattern models located in the region selected by the region selecting means.

Thus, for example, by generating pattern models using the predetermined data corresponding to the region which contains the low dimensional vectors corresponding to pattern models of a specified object, it is possible to generate appropriate pattern models for the specified object.

Also, since pattern models are generated using the predetermined data on a specific segment region, it is possible to reduce the scale of the pattern models and memory requirements of the pattern models.

The present invention sets forth a data process unit control program which is a computer-executable program for controlling the data process unit, comprising:
a data classification step of classifying a plurality of predetermined data on a plurality of objects into a plurality of groups based on a plurality of specific conditions;
a pattern model generating step of generating a plurality of pattern models which have 4-dimensional or higher dimensional elements for each group of predetermined data based on the predetermined data classified in the data classification step;
a mathematical distance calculating step of calculating mathematical distance among the pattern models generated in the pattern model generating step of the respective groups;
a pattern model converting step of converting the plurality of pattern models into the same number of low dimensional vectors corresponding to the pattern models in the lower dimension while maintaining distance relationship among the pattern models, based on the mathematical distance calculated in the mathematical distance calculating step; and
a low dimensional vector corresponding to pattern model display step of displaying the plurality of low dimensional vectors corresponding to pattern models as coordinate points in a low dimensional space of the same dimension as the low dimensional vectors corresponding to pattern models while maintaining the distance relationship, based on values of low dimensional elements.

Since this invention is a program for controlling the data process unit, description of its effect will be omitted to avoid redundancy.

The present invention sets forth the data process unit control program comprising:
a region dividing step of automatically dividing the plurality of low dimensional vectors corresponding to pattern models displayed in the low dimensional space in the low dimensional vector corresponding to pattern model display step into a plurality of regions in the low dimensional space;
a division changing step of changing the results of divisions produced automatically in the region dividing step;
a region selecting step of selecting a plurality of low dimensional vectors corresponding to pattern models for each region produced in region dividing step; and
a regional pattern model generating step of generating pattern models corresponding to the selected region based on the predetermined data related to the pattern models corresponding to the low dimensional vectors corresponding to pattern models located in the region selected in the region selecting step.

Since this invention is a program for controlling the data process unit, description of its effect will be omitted to avoid redundancy.

The present invention sets forth a pattern model search unit comprising:
region dividing means for automatically dividing the coordinate points displayed in the low dimensional space by the data process unit into a plurality of regions in the low dimensional space;
regional pattern model generating means for generating pattern models for each region based on predetermined data corresponding to coordinate points of the low dimensional vectors corresponding to pattern models contained in the segment regions;
predetermined-data acquiring means for acquiring predetermined data on a new object; and
regional pattern model searching means for calculating likelihood of regional pattern models for respective segment regions in relation to the acquired predetermined data and searching for a regional pattern model with recognition performance suitable for recognizing the predetermined data on the new object based on the calculated likelihood.

With this configuration, the region dividing means can automatically divide the coordinate points in the low dimensional space into a plurality of regions in the low dimensional space, the regional pattern model generating means can generate pattern models for each region based on predetermined data corresponding to coordinate points of the low dimensional vectors corresponding to pattern models contained in the segment regions, the predetermined-data acquiring means can acquire predetermined data on a new object, and the regional pattern model searching means can calculate likelihood of regional pattern models for respective segment regions in relation to the acquired predetermined data and search for a regional pattern model with recognition performance suitable for recognizing the predetermined-data on the new object based on the calculated likelihood.

Thus, it is possible to search regional pattern models for a regional pattern model suitable for recognizing the patterns of the predetermined data on the new object based on the likelihood of the regional pattern models corresponding to respective segment regions in relation to the acquired predetermined data on the new object.

Claim 15 of the present invention sets forth a pattern model search unit control program which is a computer-executable program for controlling the pattern model search unit according to claim 14, comprising:

a region dividing step of automatically dividing the coordinate points displayed in the low dimensional space by the data process unit into a plurality of regions in the low dimensional space;

a regional pattern model generating step of generating pattern models for each region based on predetermined data corresponding to coordinate points of the low dimensional vectors corresponding to the pattern models contained in the segment regions;

a predetermined-data acquiring step of acquiring predetermined data on a new object; and a regional pattern model searching step of calculating likelihood of regional pattern models corresponding to respective segment regions in relation to the acquired predetermined data and searching for a regional pattern model with recognition performance suitable for recognizing the predetermined data on the new object based on the calculated likelihood.

Since this invention is a program for controlling the pattern model search unit according to claim 14, description of its effect will be omitted to avoid redundancy.

On the other hand, to achieve the above object, claim 16 of the present invention sets forth a data process unit comprising:

data classification means for classifying a plurality of predetermined data on a plurality of objects into a plurality of groups based on a plurality of specific conditions;

pattern model generating means for generating a plurality of pattern models which have 4-dimensional or higher dimensional elements for each group of predetermined data based on the predetermined data classified by the data classification means;

mathematical distance calculating means for calculating mathematical distance among the pattern models generated by the pattern model generating means for the respective groups;

pattern model converting means for converting the plurality of pattern models into the same number of low dimensional vectors corresponding to the pattern models in the lower dimension while maintaining distance relationship among the pattern models, based on the mathematical distance calculated by the mathematical distance calculating means; and low dimensional vector corresponding to pattern model display means for displaying the plurality of low dimensional vectors corresponding to pattern models as coordinate points in a low dimensional space of the same dimension as the low dimensional vectors corresponding to pattern models while maintaining the distance relationship, based on values of low dimensional elements, wherein the mathematical distance calculating means uses the occurrence frequency of each pattern unit in the plurality of predetermined data on the plurality of objects when calculating the mathematical distance.

With this configuration, the data classification means can classify a plurality of predetermined data on a plurality of objects into a plurality of groups based on a plurality of specific conditions, the pattern model generating means can generate a plurality of pattern models which contain 4-dimensional or higher dimensional elements for each group of predetermined data based on the predetermined data classified by the data classification means, the mathematical distance calculating means can calculate mathematical distance among the pattern models generated by the pattern model generating means for the respective groups, the pattern model converting means can convert the plurality of pattern models into the same number of low dimensional vectors corresponding to pattern models while maintaining distance relationship among the pattern models based on the mathematical distance calculated by the mathematical distance calculating means, the low dimensional vector corresponding to pattern model display means can display the plurality of low dimensional vectors corresponding to pattern models as coordinate points in a low dimensional space of the same dimension as the low dimensional vectors corresponding to pattern models while maintaining the distance relationship based on values of low dimensional elements, and the mathematical distance calculating means can use the occurrence frequency of each pattern unit in the plurality of predetermined data on the plurality of objects when calculating the mathematical distance.

This makes it easy to grasp the distance relationship (similarity) among the pattern models visually. Also, since 4-dimensional or higher dimensional pattern models can be converted into 3-dimensional or lower dimensional pattern models, clustering and various other processes can be performed more easily. Furthermore, since the occurrence frequency of each pattern unit is used to calculate the mathematical distance, if the mathematical distance is weighted using the occurrence frequency, it is possible to define the distance among the pattern models by taking into consideration all the pattern units in the pattern models, and thus to calculate distance relationship among the pattern models accurately.

Here, if the predetermined data are human voice data, for example, phonetic units such as syllables, phonemes, biphones, triphones, etc. are used as the pattern units.

Claim 17 of the present invention sets forth the data process unit according to claim 16, wherein the occurrence frequency of the pattern units is the occurrence frequency of pattern units whose recognition performance is lower than a predetermined threshold from among a plurality of pattern units related to the plurality of objects in pattern recognition of the plurality of predetermined data using the pattern models.

In this way, since the occurrence frequency of the pattern units whose recognition performance is lower than a predetermined threshold is used in the calculation of the mathematical distance, pattern models of objects with low recognition performance can be displayed in accurate distance relationship at a low dimensional level. This makes it easy to cluster pattern models of objects with low recognition performance.

The predetermined threshold can be a value in the range of 0% (inclusive) to 100%.

Also, to achieve the above object, claim 18 of the present invention sets forth a data process unit comprising:

data classification means for classifying a plurality of predetermined data on a plurality of objects into a plurality of groups based on a plurality of specific conditions;

pattern model generating means for generating a plurality of pattern models which have 4-dimensional or higher dimensional elements for each group of predetermined data based on the predetermined data classified by the data classification means;

mathematical distance calculating means for calculating mathematical distance among the pattern models generated by the pattern model generating means for the respective groups;

pattern model converting means for converting the plurality of pattern models into the same number of low dimensional vectors corresponding to pattern models in the lower dimension while maintaining distance relationship among the pattern models, based on the mathematical distance calculated by the mathematical distance calculating means;

low dimensional vector corresponding to pattern model display means for displaying the plurality of low dimensional vectors corresponding to pattern models as coordinate points in a low dimensional space of the same dimension as the low dimensional vectors corresponding to pattern models while maintaining the distance relationship, based on values of low dimensional elements;

region dividing means for automatically dividing the coordinate points of the plurality of low dimensional vectors corresponding to pattern models displayed in the low dimensional space by the low dimensional vector corresponding to pattern model display means into a plurality of regions in the low dimensional space;

regional pattern model generating means for generating regional pattern models for each region based on predetermined data corresponding to coordinate points of the low dimensional vectors corresponding to pattern models contained in the segment regions;

predetermined-data acquiring means for acquiring predetermined data on a new object; and regional pattern model searching means for calculating likelihood of regional pattern models for respective segment regions in relation to the acquired predetermined data and searching the regional pattern models generated by the regional pattern model generating means for a regional pattern model with recognition performance suitable for recognizing the predetermined data on the new object based on the calculated likelihood.

With this configuration, the data classification means can classify a plurality of predetermined data on a plurality of objects into a plurality of groups based on a plurality of specific conditions, the pattern model generating means can generate a plurality of pattern models which contain 4-dimensional or higher dimensional elements for each group of predetermined data based on the predetermined data classified by the data classification means, the mathematical distance calculating means can calculate mathematical distance among the pattern models generated by the pattern model generating means for the respective groups, the pattern model converting means can convert the plurality of pattern models into the same number of low dimensional vectors corresponding to pattern models while maintaining distance relationship among the pattern models based on the mathematical distance calculated by the mathematical distance calculating means, the low dimensional vector corresponding to pattern model display means can display the plurality of low dimensional vectors corresponding to pattern models as coordinate points in a low dimensional space of the same dimension as the low dimensional vectors corresponding to pattern models while maintaining the distance relationship based on values of low dimensional elements, the region dividing means can automatically divide the coordinate points of the plurality of low dimensional vectors corresponding to pattern models displayed in the low dimensional space by the low dimensional vector corresponding to pattern model display means into a plurality of regions in the low dimensional space, the regional pattern model generating means can generate pattern models for each region based on predetermined data corresponding to coordinate points of the low dimensional vectors corresponding to pattern models contained in the segment regions, the predetermined-data acquiring means can acquire predetermined data on a new object, and the regional pattern model searching means can calculate likelihood of regional pattern models for respective segment regions in relation to the acquired predetermined data and search for a regional pattern model with recognition performance suitable for recognizing the predetermined data on the new object based on the calculated likelihood.

This makes it easy to grasp the distance relationship (similarity) among the pattern models visually. Also, since the coordinate points of the plurality of low dimensional vectors corresponding to pattern models can be divided easily, it is easy to see visually to what region a particular pattern model belongs. Furthermore, it is possible to search for a regional pattern model with recognition performance suitable for recognizing predetermined data on a new object based on likelihood of regional pattern models for respective segment regions in relation to the predetermined data on the new object.

Claim 19 of the present invention sets forth the data process unit according to claim 18, wherein the mathematical distance calculating means uses the occurrence frequency of each pattern unit in the plurality of predetermined data on the plurality of objects when calculating the mathematical distance.

Since the occurrence frequency of each pattern unit is used to calculate the mathematical distance, if the mathematical distance is weighted using the occurrence frequency, it is possible to define the distance among the pattern models by taking into consideration all the pattern units in the pattern models, and thus to calculate distance relationship among the pattern models accurately.

Claim 20 of the present invention sets forth the data process unit according to claim 19, wherein the occurrence frequency of the pattern units is the occurrence frequency of pattern units whose recognition performance is lower than a predetermined threshold from among a plurality of pattern units related to the plurality of objects in pattern recognition of the plurality of predetermined data on the plurality of objects using the pattern models.

In this way, since the occurrence frequency of the pattern units whose recognition performance is lower than a predetermined threshold is used in the calculation of the mathematical distance, pattern models of objects with low recognition performance can be displayed in accurate distance relationship at a low dimensional level. This makes it easy to cluster pattern models of objects with low recognition performance.

Claim 21 of the present invention sets forth the data process unit according to any of claims 18 to 20, wherein the region dividing means divides the plurality of low dimensional vectors corresponding to pattern models by an outer circle and n inner circles (n is an integer equal to or larger than 1) and further divides ring-shaped regions formed by the concentric outer and inner circles therebetween into a plurality of regions by lines extending radially, where the outer circle is centered at the center of gravity of the coordinate points of all the low dimensional vectors corresponding to pattern models and has a radius equal to the distance between the center of gravity and the coordinate point of the low dimensional vector corresponding to pattern model farthest from the center of gravity while the inner circle is centered at the center of gravity and has a radius smaller than that of the outer circle.

Thus, the ring-shaped regions formed by the concentric outer and inner circles can be divided into a plurality of fan-shaped regions.

Claim 22 of the present invention sets forth the data process unit according to claim 21, wherein the region dividing means divides the low dimensional vectors corresponding to pattern models more finely with increasing radial distance from the innermost circle.

When pattern models are visualized two-dimensionally, since recognition performance (similarity to other models) of pattern models tend to lower with increasing radial distance from the center, by finely dividing regions containing pattern models with low recognition performance, it is possible to group data more accurately.

Claim 23 of the present invention sets forth the data process unit according to claim 21 or 22, wherein the region dividing means divides regions in such a way that there will be partial overlap between low dimensional vectors corresponding to pattern models in adjacent regions.

This makes it possible to easily deal with cases in which predetermined data on specified objects are located at boundaries between segment regions when generating pattern models of the specified objects.

Claim 24 of the present invention sets forth the data process unit according to any of claims 21 to 23, wherein the regional pattern model searching means can calculate likelihood of regional pattern models for respective segment regions in relation to the acquired predetermined data beginning with the innermost circle and moving to the outermost circle and search the regional pattern models generated by the regional pattern model generating means for a regional pattern model with recognition performance suitable for recognizing the predetermined data on the new object based on the calculated likelihood.

In this way, since the likelihood of regional pattern models of the predetermined data on the new object is calculated beginning with the innermost circle and moving to the outermost circle, it is possible to quickly search for the regional pattern model of the segment region suitable for the predetermined data on the new object.

Claim 25 of the present invention sets forth the data process unit according to claim 24, wherein the regional pattern model searching means calculates the likelihood of the regional pattern model corresponding to the region within the innermost circle in relation to the acquired predetermined data, calculates the likelihoods of regional pattern models corresponding to the segment regions in the ring-shaped region just outside the innermost circle, calculates the likelihoods of the regional pattern models corresponding to the regions just outside the region containing the regional pattern model with the highest likelihood among the next inner regions, and subsequently goes on to calculate likelihoods in this manner moving outward in sequence.

In this way, since the segment regions containing the regional pattern models with the highest likelihood (recognition performance) are searched for beginning with the innermost circle and moving to the outermost circle, it is possible to quickly search for the regional pattern model of the segment region suitable for the predetermined data on the new object.

Claim 26 of the present invention sets forth the data process unit according to claim 24, wherein the regional pattern model searching means calculates the likelihood of the regional pattern model corresponding to the region within the innermost circle in relation to the acquired predetermined data, calculates the likelihoods of regional pattern models corresponding to the segment regions in the ring-shaped region just outside the innermost circle, calculates the likelihoods of the regional pattern models corresponding to the regions just outside the regions containing the regional pattern models with the top m likelihoods (m is an integer larger than 1) among the next inner regions, and subsequently goes on to calculate likelihoods in this manner moving outward in sequence.

In this way, since the segment regions containing the regional pattern models with the top m likelihoods are searched for beginning with the innermost circle and moving to the outermost circle, it is possible to quickly search for the regional pattern model of the segment region suitable for the predetermined data on the new object.

Claim 27 of the present invention sets forth the data process unit according to any of claims 18 to 26, wherein:
the plurality of predetermined data on a plurality of objects are data on a plurality of speech sounds produced by a plurality of speakers; and
the plurality of specific conditions include at least, the type of speaker, speech lexicons, speech styles, and speech environment.

This makes it possible to generate pattern models of speech data taking into consideration at least the type of speaker including the name, sex (male/female), age (children/adults/the aged) of speakers; speech lexicons such as numerals, sentences, and words; speech styles such as the rate of speech, loudness of speech, and features due to dialects; and speech environment such as indoor, in-car, in-plant, or outdoor environment (classification by location).

Claim 28 of the present invention sets forth the data process unit according to any of claims 18 to 27, wherein the data classification means forms a group of predetermined data under each combination of specific conditions selected freely from the plurality of specific conditions.

Thus, for example, if the predetermined data are human voice data, a group can be formed under a desired combination of specific conditions, such as that an adult male (type of speaker) uttered words (speech lexicon) rapidly (speech style) indoors (speech environment). Of course, the data may be grouped under broader conditions, such as that an adult male (type of speaker) spoke indoors (speech environment).

Claim 29 of the present invention sets forth the data process unit according to any of claims 18 to 28, wherein the pattern models are generated using HMMs (Hidden Markov Models).

In this way, the pattern models are generated using HMMs (Hidden Markov Models).

For example, speech varies in time span with the speaking speed and has a characteristic shape (spectral envelope) in the frequency domain according to the content of an utterance. The shape fluctuates depending on the specific conditions. The HMMs, for example, are statistical models which can absorb the fluctuations.

The present invention sets forth the data process unit, wherein the mathematical distance calculating means calculates the mathematical distance using one of Euclidean distance determined based on a mean vector of normal distributions of the pattern models generated using the HMMs, Euclidean distance determined based on a mean vector of normal distributions of the pattern models normalized by the standard deviation of the normal distributions of the pattern models, and Bhattacharrya distance determined based on normal distributions of the pattern models.

Thus, by using any of the above-mentioned distances, it is possible to calculate more appropriate mathematical distance among the pattern models.

The present invention sets forth the data process unit, wherein the pattern model converting means converts the pattern models into the low dimensional vectors corresponding to pattern models using Sammon's method.

In this way, the pattern model converting means can convert the pattern models into the low dimensional vectors corresponding to the pattern models using Sammon's method.

Thus, the use of known Sammon's method makes it possible to convert the pattern models into the same number of low dimensional vectors corresponding to the pattern models while maintaining distance relationship among the pattern models.

The present invention sets forth the data process unit, comprising 10 division changing means for changing the results of divisions produced automatically by the region dividing means.

Thus, if results of divisions are inappropriate or new pattern models are added, the results of divisions can be changed appropriately. Also, since visualized results of divisions of pattern models are changed, the results of divisions can be changed easily.

The present invention sets forth the data process unit, comprising pattern model adapting means for adapting the regional pattern model found by the pattern model searching means to the new object based on the predetermined data on the new object.

With this configuration, the pattern model adapting means can adapt the regional pattern model found by the pattern model searching means to the new object based on the predetermined data on the new object.

Thus, appropriate pattern models can be generated for a new object. Also, since pattern models are generated using the predetermined data on a specific segment region, it is possible to reduce the scale of the pattern models and memory requirements of the pattern models. Here, an MLLR speaker adaptation technique may be used for the adaptation.

The present invention sets forth the data process unit, wherein:
the pattern model converting means can convert a high dimensional pattern model corresponding to the plurality of low dimensional vectors corresponding to pattern models contained in the region corresponding to the regional pattern model found by the pattern model searching means into the low dimensional vectors corresponding to pattern models;
the low dimensional vector corresponding to pattern model display means can display the plurality of low dimensional vectors corresponding to pattern models after the conversion as coordinate points in a low dimensional space of the same dimension as the low dimensional vectors corresponding to pattern models while maintaining the distance relationship based on values of low dimensional elements; and
the region dividing means can automatically divide the coordinate points of the plurality of low dimensional vectors corresponding to pattern models displayed in the low dimensional space into a plurality of regions in the low dimensional space.

In this way, since a high dimensional pattern model corresponding to the plurality of low dimensional vectors corresponding to pattern models contained in the region corresponding to the regional pattern model found by the pattern model searching means is converted again into the low dimensional vectors corresponding to the pattern models, which are then divided, by searching the segment regions for a regional pattern model suitable for a new object, it is possible to generate a specific pattern model more suitable for pattern recognition of predetermined data on the new object.

The present invention sets forth a data process unit control program which is a computer-executable program for controlling the data process unit according to claim 16, comprising:
a data classification step of classifying a plurality of predetermined data on a plurality of objects into a plurality of groups based on a plurality of specific conditions;
a pattern model generating step of generating a plurality of pattern models which have 4-dimensional or higher dimensional elements for each group of predetermined data based on the predetermined data classified in the data classification step;
a mathematical distance calculating step of calculating mathematical distance among the pattern models generated in the pattern model generating step of the respective groups;
a pattern model converting step of converting the plurality of pattern models into the same number of low dimensional vectors corresponding to the pattern models in the lower dimension while maintaining distance relationship among the pattern models, based on the mathematical distance calculated in the mathematical distance calculating step; and
a low dimensional vector corresponding to pattern model display step of displaying the plurality of low dimensional vectors corresponding to pattern models as coordinate points in a low dimensional space of the same dimension as the low dimensional vectors corresponding to pattern models while maintaining the distance relationship, based on values of low dimensional elements, wherein
the mathematical distance calculating step uses the occurrence frequency of each pattern unit in the plurality of predetermined data on the plurality of objects when calculating the mathematical distance.

Since this invention is a program for controlling the data process unit, description of its effect will be omitted to avoid redundancy.

The present invention sets forth a data process unit control program which is a computer-executable program for controlling the data process unit, comprising:
a data classification step of classifying a plurality of predetermined data on a plurality of objects into a plurality of groups based on a plurality of specific conditions;
a pattern model generating step of generating a plurality of pattern models which have 4-dimensional or higher dimensional elements for each group of predetermined data based on the predetermined data classified in the data classification step;

a mathematical distance calculating step of calculating mathematical distance among the pattern models generated in the pattern model generating step of the respective groups;

a pattern model converting step of converting the plurality of pattern models into the same number of low dimensional vectors corresponding to the pattern models while maintaining distance relationship among the pattern models, based on the mathematical distance calculated in the mathematical distance calculating step;

a low dimensional vector corresponding to pattern model display step of displaying the plurality of low dimensional vectors corresponding to pattern models as coordinate points in a low dimensional space of the same dimension as the low dimensional vectors corresponding to pattern models while maintaining the distance relationship, based on values of low dimensional elements;

a region dividing step of automatically dividing the coordinate points of the plurality of low dimensional vectors corresponding to pattern models displayed in the low dimensional space in the low dimensional vector corresponding to pattern model display step into a plurality of regions in the low dimensional space;

a regional pattern model generating step of generating pattern models for each region based on predetermined data corresponding to coordinate points of the low dimensional vectors corresponding to pattern models contained in the segment regions;

a predetermined-data acquiring step of acquiring predetermined data on a new object; and a regional pattern model searching step of calculating likelihood of regional pattern models for respective segment regions in relation to the acquired predetermined data and searching for a regional pattern model with recognition performance suitable for recognizing the predetermined data on the new object based on the calculated likelihood.

Since this invention is a program for controlling the data process unit, description of its effect will be omitted to avoid redundancy.

The present invention sets forth a specific pattern model providing system comprising:

an information processing terminal which is under the control of a system user; and a data process unit, wherein the information processing terminal and the data process unit are communicably connected with each other, in the data process unit, the plurality of predetermined data on a plurality of objects are data on a plurality of speech sounds produced by a plurality of speakers, the information processing terminal comprises speech data sending means for acquiring data on speech sounds produced by the system user and sending the acquired speech data to the data process unit, and specific pattern model acquiring means for acquiring the specific pattern models suitable for pattern recognition of the speech data of the system user from the data process unit, the data process unit makes the predetermined-data acquiring means acquire the speech data from the information processing terminal and generates the specific pattern models for the system user based on the acquired speech data, and the data process unit further comprises specific pattern model sending means for sending the generated specific pattern models to the information processing terminal.

With this configuration, the information processing terminal can acquire data on speech sounds produced by the speakers and send the acquired speech data to the data process unit via the speech data sending means and can acquire the specific pattern models suitable for pattern recognition of the speech data of the system user from the data process unit via the specific pattern model acquiring means.

Also, the data process unit can acquire the speech data from the information processing terminal via the predetermined-data acquiring means, generate the specific pattern models for the system user based on the acquired speech data, and send the generated specific pattern models to the information processing terminal via the specific pattern model sending means.

Thus, the system user can connect an information processing terminal such as a PC, cell phone, or PDA to the data process unit via the Internet or the like, send his/her speech data to the data process unit, and thereby easily acquire specific pattern models suitable for speech recognition of his/her speech data.

On the other hand, to achieve the above object, the present invention sets forth a data process unit comprising:

acoustic space storing means for storing an acoustic space composed of a plurality of pattern models generated from speech data of a plurality of speakers;

speech data acquiring means for acquiring speech data of a target speaker;

position calculating means for calculating position of the speech data of the target speaker in the acoustic space based on the speech data of the target speaker acquired by the speech data acquiring means and the plurality of pattern models in the acoustic space stored by the acoustic space storing means;

speech data evaluating means for evaluating value of the speech data of the target speaker based on the position calculated by the position calculating means;

evaluation result display means for displaying evaluation results produced by the speech data evaluating means; and positional relationship information display means for displaying information about positional relationship between the speech data and pattern models around the speech data in the acoustic space based on the calculated position.

With this configuration, the speech data acquiring means can acquire speech data of a target speaker, the position calculating means can calculate position of the speech data of the target speaker in the acoustic space based on the speech data acquired by the speech data acquiring means and the plurality of pattern models in the acoustic space stored by the acoustic space storing means, the speech data evaluating means can evaluate value of the speech data of the target speaker based on the position calculated by the position calculating means, the evaluation result display means can display evaluation results produced by the speech data evaluating means, and the positional relationship information display means can display information about positional relationship between the speech data and pattern models around the speech data in the acoustic space based on the calculated position.

Thus, it is possible to evaluate the value of the speech data of the target speaker based on the positional relationship between the speech data of the target speaker and other pattern models in the acoustic space and display the evaluation results as well as to display the positional relationship between the speech data and other pattern models. That is, the system makes it possible to visually determine whether the speech data produced by the target speaker has high value and makes it easy to visually see the position of the speech data of the target speaker in the acoustic space.

The pattern models are matched against the speech data and expressed as statistical models or the like.

Also, the speech data consist of, for example, a combination of data on speech sounds produced by a plurality of speakers, feature values extracted from the speech data, pattern models generated based on the feature values, and a text file describing the content of the utterance. Thus, the speech data acquiring means comprises various processing means for acquiring speech sounds produced by the speaker via a microphone or the like, converting the acquired speech sounds into data, and extracting feature values by analyzing the data as required.

The present invention sets forth the data process unit, wherein the speech data evaluating means evaluates the value of the speech data based on the number of pattern models existing within a predetermined distance from the position of the speech data of the target speaker calculated by the position calculating means.

In this way, the speech data evaluating means can evaluate the value of the speech data based on the number of pattern models existing within a predetermined distance from the position of the speech data of the speaker calculated by the position calculating means.

Thus, it is possible, for example, to determine that the value of the speech data is high if there are not many pattern models of other speakers around the speech data of the target speaker and determine that the value of the speech data is low if there are many pattern models around the speech data.

The present invention sets forth the data process unit, wherein:

the predetermined distance is set stepwise according to the value of the speech data; and the speech data evaluating means evaluates the value of the speech data based on the number of pattern models existing within each distance range set stepwise.

In this way, the predetermined distance is set stepwise according to the value of the speech data and the speech data evaluating means can evaluate the value of the speech data based on the number of pattern models existing within each distance range set stepwise.

This makes it possible to evaluate the value of the speech data of the target speaker stepwise according to the number of pattern models in each distance range.

The present invention sets forth the data process unit, wherein the speech data evaluating means uses a pattern model similar in features to the speech data of the target speaker out of the plurality of pattern models as the pattern model of the target speaker for the evaluation based on the position calculated by the position calculating means.

In this way, the speech data evaluating means can use a pattern model similar in features to the speech data of the target speaker out of the plurality of pattern models as the pattern model of the target speaker for the evaluation based on the position calculated by the position calculating means.

Since this invention uses the position of a similar pattern model as the position of the speech data produced by the target speaker in the acoustic space instead of generating a pattern model of the speech sounds produced by the target speaker, it can reduce computing work and use a configuration suitable for real-time processing and the like.

The present invention sets forth the data process unit, wherein the speech data evaluating means uses the top few pattern models similar in features to the speech data of the target speaker as the pattern models of the target speaker for the evaluation out of the plurality of pattern models.

In this way, the speech data evaluating means can use the top few pattern models similar in features to the speech data of the target speaker as the pattern models of the target speaker for the evaluation.

Thus, by selecting the top few pattern models in descending order of similarity and using the average value of these pattern models for evaluation, it is possible to reduce the impact of any wrong selection in which a pattern model thought to be similar actually turns out to be dissimilar, compared to when selecting a single pattern model.

The present invention sets forth the data process unit, wherein the position calculating means converts the speech data acquired by the speech data acquiring means into high dimensional feature data, calculates likelihood between the feature data and each of the plurality of the pattern models of the plurality of speakers, selects a specific pattern model from the plurality of pattern models of the plurality of speakers based on the calculated likelihood, calculates mathematical distance between the selected specific pattern model and other pattern models, and calculates the position of the acquired speech data in the acoustic space based on the calculated mathematical distance.

In this way, it is possible to determine similarity by calculating the likelihood of match between the speech data of the target speaker and the plurality of pattern models of the plurality of speakers. This makes it easy to select pattern models similar in features to the speech data of the target speaker.

Here the mathematical distance represents similarity between an acoustic model generated from the speech data of the target speaker and acoustic models of a plurality of speakers. There can be various mathematical distances depending on measures of similarity. These measures correspond, for example, to distances such as Euclidean distance which can be measured with an ordinary ruler or distances such as Mahalanobis' generalized distance which cannot be measured with an ordinary ruler, where the Mahalanobis' generalized distance expresses distance corresponding to similarity as the inner product of two vectors and uses the angle between the two vectors as a measure of the similarity. According to the present invention, other possible mathematical distances include Bhattacharrya distance, squared Euclidean distance, cosine distance, Pearson correlation, Chebyshev distance, city-block distance (or Manhattan distance), Minkowski sums, Kullback information, and Chernov distance. In short, although called a distance, the mathematical distance according to the present invention may be anything as long as it represents similarity. This also applies to subsequent claims.

The present invention sets forth the data process unit, wherein the position calculating means converts the speech data acquired by the speech data acquiring means into high dimensional feature data, generates a pattern model of the target speaker based on the feature data, calculates mathematical distance between the generated pattern model and the plurality of pattern models of the plurality of speakers, and calculates the position of the acquired speech data in the acoustic space based on the calculated mathematical distance.

In this way, the position calculating means can convert the speech data acquired by the speech data acquiring means into high dimensional feature data, generate a pattern model of the target speaker based on the feature data, calculate mathematical distance between the generated pattern model and the plurality of pattern models of the plurality of speakers, and calculate the position of the acquired speech data in the acoustic space based on the calculated mathematical distance.

This makes it possible to evaluate the value of the speech data of the target speaker more accurately.

The present invention sets forth the data process unit, wherein:
the pattern models consist of 4-dimensional or higher dimensional elements; and
the positional relationship information display means converts a plurality of pattern models in the acoustic space including a plurality of pattern models corresponding to speech data of the target speaker into lower dimensional pattern models while maintaining the distance relationship and displays the pattern models after the conversion as coordinate points in a low dimensional space.

In this way, the positional relationship information display means can convert a plurality of pattern models in the acoustic space including a plurality of pattern models corresponding to speech data of the target speaker into lower dimensional pattern models while maintaining the positional relationship and display the pattern models after the conversion as coordinate points in a low dimensional space.

This makes it easy to see the position of the speech data of the target speaker in the acoustic space visually.

Here, if the speech data and pattern models contain multi-dimensional (4-dimensional or higher dimensional) information, positional information about them is also multi-dimensional. In that case, the positional relationship information display means can convert the multi-dimensional information about the speech data and pattern models into 2-dimensional or lower dimensional information, using, for example, projection or the like, and display them as coordinate points in the low dimensional space. Known projection methods include Sammon's method.

The present invention sets forth the data process unit, wherein the pattern models are generated using HMMs (Hidden Markov Models).

In this way, the pattern models are generated using HMMs, a known technology.

Here speech varies in time span with the speaking speed and has a characteristic shape (spectral envelope) in the frequency domain according to the content of an utterance. The shape fluctuates depending on speakers, environment, content, etc. The HMMs, for example, are statistical models which can absorb the fluctuations.

The present invention sets forth the data process unit, wherein:
the speech data evaluating means evaluates value of speech data of the target speaker on a phoneme-by-phoneme basis; and
the evaluation result display means displays evaluation results of the speech data of the target speaker on a phoneme-by-phoneme basis.

In this way, since the speech data of the target speaker is evaluated on a phoneme-by-phoneme basis rather than on a word-by-word or sentence-by-sentence basis and the evaluation results are displayed on a phoneme-by-phoneme basis, it is easy to determine the value of each phoneme.

The present invention sets forth the data process unit, wherein the evaluation result display means displays supplementary information of the speech data when the speech data evaluating means evaluates the speech data of the target speaker as having low value.

In this way, by displaying supplementary information prompting for such information as the manner of pronunciation, rate of speech, or other speech data desired to be evaluated (or acquired), it is possible to acquire and evaluate various speech data of the same target speaker. This allows for the fact that the speech data of the same speaker may rise in value depending on the manner of pronunciation and the like.

The present invention sets forth the data process unit, comprising:
negotiating means for negotiating with the target speaker on whether the speech data can be provided; and
speech data storing means for storing the speech data over which negotiations are completed successfully by the negotiating means.

In this way, the negotiating means can negotiate with the target speaker on whether the speech data can be provided and the speech data storing means can store the speech data over which negotiations are completed successfully by the negotiating means.

This makes it possible to negotiate with the target speaker over acquisition of any speech data produced by the target speaker and evaluated, for example, as having high value.

The present invention sets forth a data process system comprising:
an information processing terminal which is under the control of a target speaker; and
the data process unit consistent with the present invention, wherein:
the information processing terminal and the data process unit are communicably connected with each other,
the information processing terminal comprises speech data sending means for acquiring speech data of the target speaker and sending the acquired speech data to the data process unit, and evaluation information display means for displaying information about evaluation results of the speech data of the target speaker acquired from the data process unit, and
the data process unit comprises evaluation information sending means for sending the information about the evaluation results to the information processing terminal.

In this way, the information processing terminal can acquire speech data of the target speaker and send the acquired speech data to the data process unit via the speech data sending means. Also, it can display, via the evaluation information display means, information about evaluation results of speech data of the target speaker acquired from the data process unit. On the other hand, the data process unit can send the information about the evaluation results to the information processing terminal via the evaluation information sending means.

Thus, if the information processing terminal is connected to the data process unit via the Internet or the like, it is possible to evaluate speech data of many target speakers via the Internet, making it easy to acquire speech data high in value.

The present invention sets forth a data process method comprising the steps of:
preparing an acoustic space composed of a plurality of pattern models generated from speech data of a plurality of speakers;
acquiring speech data of a target speaker;
calculating position of the speech data of the target speaker in the acoustic space based on the acquired speech data and the plurality of pattern models in the acoustic space;
evaluating value of the speech data of the target speaker based on the calculated position; and displaying the evaluation results.

Since this invention is implemented by the data process unit, as discussed elsewhere in the specification, the description of its effect will be omitted to avoid redundancy.

The present invention sets forth a data process unit control program which is a computer-executable program for controlling the data process unit, comprising:

- an acoustic space storing step of storing an acoustic space composed of a plurality of pattern models generated from speech data of a plurality of speakers;
- a speech data acquiring step of acquiring speech data of a target speaker;
- a position calculating step of calculating position of the speech data of the target speaker in the acoustic space based on the speech data acquired in the speech data acquiring step and the plurality of pattern models in the acoustic space stored in the acoustic space storing step;
- a speech data evaluating step of evaluating value of the speech data of the target speaker based on the position calculated in the position calculating step; and
- an evaluation result display step of displaying evaluation results produced in the speech data evaluating step.

Since this invention is a program for controlling the data process unit, as discussed elsewhere in the specification, the description of its effect will be omitted to avoid redundancy.

The present invention sets forth the data process unit applicable to the data process system, comprising:

- acoustic space storing means for storing an acoustic space composed of a plurality of pattern models generated from speech data of a plurality of speakers;
- speech data acquiring means for acquiring speech data of a target speaker;
- position calculating means for calculating position of the speech data of the target speaker in the acoustic space based on the speech data acquired by the speech data acquiring means and the plurality of pattern models in the acoustic space stored by the acoustic space storing means;
- speech data evaluating means for evaluating value of the speech data of the target speaker based on the position calculated by the position calculating means;
- evaluation result display means for displaying evaluation results produced by the speech data evaluating means;
- positional relationship information display means for displaying information about positional relationship between the speech data and pattern models around the speech data in the acoustic space based on the calculated position; and
- evaluation information sending means for sending the information about the evaluation results to the information processing terminal.

Since this invention offers the same effect as the data process unit in the data process system, as discussed elsewhere in the specification, the description thereof will be omitted to avoid redundancy.

The present invention sets forth an information processing terminal applicable to the data process system, comprising:

- speech data sending means for acquiring speech data of the target speaker and sending the acquired speech data to the data process unit; and
- evaluation information display means for displaying information about evaluation results of the speech data of the target speaker acquired from the data process unit.

Since this invention offers the same effect as the information processing unit in the data process system as discussed elsewhere in the specification, the description thereof will be omitted to avoid redundancy.

The present invention sets forth a data process unit control program which is a computer-executable program for controlling the data process unit, comprising:

- an acoustic space storing step of storing an acoustic space composed of a plurality of pattern models generated from speech data of a plurality of speakers;
- a speech data acquiring step of acquiring speech data of a target speaker;
- a position calculating step of calculating position of the speech data of the target speaker in the acoustic space based on the speech data acquired in the speech data acquiring step and the plurality of pattern models in the acoustic space stored in the acoustic space storing step;
- a speech data evaluating step of evaluating value of the speech data of the target speaker based on the position calculated in the position calculating step;
- an evaluation result display step of displaying evaluation results produced in the speech data evaluating step;
- a positional relationship information display step of displaying information about positional relationship between the speech data and pattern models around the speech data in the acoustic space based on the calculated position; and
- an evaluation information sending step of sending the information about the evaluation results to the information processing terminal.

Since this invention is a program for controlling the data process unit, as discussed elsewhere in the specification, the description of its effect will be omitted to avoid redundancy.

The present invention sets forth an information processing terminal control program which is a computer-executable program for controlling the information processing terminal, comprising:

- a speech data sending step of acquiring speech data of the target speaker and sending the acquired speech data to the data process unit; and
- an evaluation information display step of displaying information about evaluation results of speech data of the target speaker acquired from the data process unit.

Since this invention is a program for controlling the information processing terminal, as discussed elsewhere in the specification, description of its effect will be omitted to avoid redundancy.

On the other hand, to achieve the above object, the present invention sets forth a data process unit comprising:

- acoustic space storing means for storing an acoustic space composed of a plurality of pattern models generated from speech data of a plurality of speakers;
- speech data acquiring means for acquiring speech data of a target speaker;
- position calculating means for calculating position of the speech data of the target speaker in the acoustic space based on the speech data of the target speaker and the plurality of pattern models in the acoustic space;
- similar-speaker detecting means for detecting similar speakers who resemble the target speaker in speech out of the plurality of speakers based on the position of the speech data and the plurality of pattern models; and
- positional relationship information display means for displaying information about positional relationship between the speech data of the target speaker and pattern models of the similar speakers in the acoustic space based on the position of the speech data and the pattern models of the similar speakers.

With this configuration, the acoustic space storing means can store an acoustic space composed of a plurality of pattern models generated from speech data of a plurality of speakers, the speech data acquiring means can acquire speech data of a target speaker, the position calculating means can calculate position of the speech data of the target speaker in the acoustic space based on the speech data of the target speaker and the plurality of pattern models in the acoustic space, the similar-speaker detecting means can detect similar speakers who resemble the target speaker in speech out of the plurality of speakers based on the position of the speech data and the plurality of pattern models, and the positional relationship information display means can display information about positional relationship between the speech data of the target speaker and pattern models of the similar speakers in the acoustic space based on the position of the speech data and the pattern models of the similar speakers.

This makes it easy to see visually which of the plurality of speakers resembles the target speaker in speech.

The present invention sets forth the data process unit, comprising:

specific speaker specifying means for specifying a specific speaker among the plurality of speakers;
  similarity evaluating means for evaluating similarity in speech between the specific speaker and the target speaker based on the position of the speech data and the pattern model of the specific speaker in the acoustic space; and
  evaluation result display means for displaying evaluation results produced by the similarity evaluating means, wherein
  the positional relationship information display means displays information about positional relationship between the speech data of the target speaker and pattern model of the specific speaker in the acoustic space based on the position of the speech data and the pattern model of the specific speaker.

In this way, the specific speaker specifying means can specify a specific speaker among the plurality of speakers, the similarity evaluating means can evaluate similarity in speech between the specific speaker and the target speaker based on the position of the speech data and the pattern model of the specific speaker in the acoustic space, the evaluation result display means can display evaluation results produced by the similarity evaluating means, and the positional relationship information display means can display information about positional relationship between the speech data of the target speaker and pattern model of the specific speaker in the acoustic space based on the position of the speech data and the pattern model of the specific speaker.

This makes it easy to visually see similarity in speech between the specified specific speaker and the target speaker as well as positional relationship between the speech data of the target speaker and pattern model of the specific speaker.

The present invention sets forth a data process unit comprising:

acoustic space storing means for storing an acoustic space composed of a plurality of pattern models generated from speech data of a plurality of speakers;
  specific speaker specifying means for specifying a specific speaker among the plurality of speakers;
  speech data acquiring means for acquiring speech data of a target speaker;
  position calculating means for calculating position of the speech data of the target speaker based on the speech data of the target speaker and the plurality of pattern models in the acoustic space;
  similarity evaluating means for evaluating similarity in speech between the specific speaker and the target speaker based on the position of the speech data and the pattern model of the specific speaker;
  evaluation result display means for displaying evaluation results produced by the similarity evaluating means; and
  positional relationship information display means for displaying information about positional relationship between the speech data of the target speaker and pattern model of the specific speaker in the acoustic space based on the position of the speech data and the pattern model of the specific speaker.

With this configuration, the acoustic space storing means can store an acoustic space composed of a plurality of pattern models generated from speech data of a plurality of speakers, the speech data acquiring means can acquire speech data of a target speaker, the position calculating means can calculate position of the speech data of the target speaker based on the speech data of the target speaker and the plurality of pattern models in the acoustic space, the similarity evaluating means can evaluate similarity in speech between the specific speaker and the target speaker based on the position of the speech data and the pattern model of the specific speaker, the evaluation result display means can display evaluation results produced by the similarity evaluating means, the positional relationship information display means can display information about positional relationship between the speech data of the target speaker and pattern model of the specific speaker in the acoustic space based on the position of the speech data and the pattern model of the specific speaker.

This makes it easy to visually see similarity in speech between the specified specific speaker and the target speaker as well as positional relationship between the speech data of the target speaker and pattern model of the specific speaker.

The present invention sets forth the data process unit, comprising:

correction information generating means for generating correction information which indicates corrections to be made to the speech of the target speaker in order to enhance similarity in speech between the target speaker and the specific speaker based on the evaluation results produced by the similarity evaluating means; and
  correction information display means for displaying the correction information.

In this way, the correction information generating means can generate correction information which indicates corrections to be made to the speech of the target speaker in order to enhance similarity in speech between the target speaker and the specific speaker based on the evaluation results produced by the similarity evaluating means and the correction information display means can display the correction information.

This allows the target speaker to correct his/her manner of speaking by looking at the correction information.

The present invention sets forth the data process unit, wherein:

the similar-speaker detecting means uses a pattern model which is similar in features to the speech data of the target speaker out of the plurality of pattern models as the pattern model of the target speaker based on the position of the speech data; and
  the similarity evaluating means uses a pattern model which is similar in features to the speech data of the target speaker out of the plurality of pattern models as the pattern model of the target speaker based on the position of the speech data.

In this way, the similar-speaker detecting means can use a pattern model which is similar in features to the speech data of the target speaker out of the plurality of pattern models as the pattern model of the target speaker based on the position of the speech data and the similarity evaluating means can use a pattern model which is similar in features to the speech data of the target speaker out of the plurality of pattern models as the pattern model of the target speaker based on the position of the speech data.

Since the similar-speaker detecting means uses the position of a similar pattern model as the position of the speech data produced by the target speaker in the acoustic space instead of generating a pattern model of the speech sounds produced by the target speaker, this invention can reduce computing work. Also, since the similarity evaluating means uses the position of a similar pattern model as the position of the speech data produced by the target speaker in the acoustic space instead of generating a pattern model of the speech sounds produced by the target speaker, this invention can further reduce computing work. Thus, this invention is suitable for real-time processing and the like.

The present invention sets forth the data process unit, wherein:
the similar-speaker detecting means uses the top few pattern models which are similar in features to the speech data of the target speaker out of the plurality of pattern models as the pattern model of the target speaker based on the position of the speech data; and
the similarity evaluating means uses the top few pattern models which are similar in features to the speech data of the target speaker out of the plurality of pattern models as the pattern model of the target speaker based on the position of the speech data.

In this way, the similar-speaker detecting means can use the top few pattern models which are similar in features to the speech data of the target speaker out of the plurality of pattern models as the pattern model of the target speaker based on the position of the speech data and the similarity evaluating means can use the top few pattern models which are similar in features to the speech data of the target speaker out of the plurality of pattern models as the pattern model of the target speaker based on the position of the speech data.

Thus, by selecting the top few pattern models in descending order of similarity and using the average value of these pattern models for a detection process, evaluation process, or the like, it is possible to reduce the impact of any wrong selection in which a pattern model thought to be similar actually turns out to be dissimilar, compared to when selecting a single pattern model.

The present invention sets forth the data process unit, wherein the position calculating means converts the speech data acquired by the speech data acquiring means into high dimensional feature data, calculates likelihood between the feature data and each of the plurality of the pattern models of the plurality of speakers, selects a specific pattern model from the pattern models of the plurality of speakers based on the calculated likelihood, calculates mathematical distance between the selected specific pattern model and other pattern models, and calculates the position of the acquired speech data in the acoustic space based on the calculated mathematical distance.

In this way, it is possible to determine similarity by calculating the likelihood of match between the speech data of the target speaker and the plurality of pattern models of the plurality of speakers. This makes it easy to select pattern models similar in features to the speech data of the target speaker.

Here the mathematical distance represents similarity between an acoustic model generated from the speech data of the target speaker and acoustic models of a plurality of speakers. There can be various mathematical distances depending on measures of similarity. These measures correspond, for example, to distances such as Euclidean distance which can be measured with an ordinary ruler or distances such as Mahalanobis' generalized distance which cannot be measured with an ordinary ruler, where the Mahalanobis' generalized distance expresses distance corresponding to similarity as the inner product of two vectors and uses the angle between the two vectors as a measure of the similarity. According to the present invention, other possible mathematical distances include Bhattacharrya distance, squared Euclidean distance, cosine distance, Pearson correlation, Chebyshev distance, city-block distance (or Manhattan distance), Minkowski sums, Kullback information, and Chernov distance. In short, although called a distance, the mathematical distance according to the present invention may be anything as long as it represents similarity.

The present invention sets forth the data process unit, wherein the position calculating means converts the speech data acquired by the speech data acquiring means into high dimensional feature data, generates a pattern model of the target speaker based on the feature data, calculates mathematical distance between the generated pattern model and the plurality of pattern models of the plurality of speakers, and calculates the position of the acquired speech data in the acoustic space based on the calculated mathematical distance.

In this way, the position calculating means can convert the speech data acquired by the speech data acquiring means into high dimensional feature data, generate a pattern model of the target speaker based on the feature data, calculate mathematical distance between the generated pattern model and the plurality of pattern models of the plurality of speakers, and calculate the position of the acquired speech data in the acoustic space based on the calculated mathematical distance.

This makes it possible to perform a detection process or evaluation process directly on the speech data of the target speaker.

The present invention sets forth the data process unit, wherein:
the pattern models consist of 4-dimensional or higher dimensional elements; and
the positional relationship information display means converts a plurality of pattern models in the acoustic space including a plurality of pattern models corresponding to speech data of the target speaker into lower dimensional pattern models while maintaining the distance relationship and displays the pattern models after the conversion as coordinate points in a low dimensional space.

In this way, the positional relationship information display means can convert a plurality of pattern models in the acoustic space including a plurality of pattern models corresponding to speech data of the target speaker into lower dimensional pattern models while maintaining the positional relationship and display the pattern models after the conversion as coordinate points in a low dimensional space.

This makes it easy to see the position of the speech data in the acoustic space visually.

Here, if the speech data and pattern models contain multi-dimensional (4-dimensional or higher dimensional) information, positional information about them is also multi-dimensional. In that case, the positional relationship information display means can convert the multi-dimensional information about the speech data and pattern models into 2-dimensional or lower dimensional information, using, for example, projection or the like, and display them as coordinate points in the low dimensional space. Known projection methods include Sammon's method.

The present invention sets forth the data process unit, wherein the similarity evaluating means evaluates the similarity of the speech data of the target speaker on a phoneme-by-phoneme basis.

In this way, since the similarity evaluating means can evaluate the similarity of the speech data of the target speaker on a phoneme-by-phoneme basis, the similarity of the speech data of the target speaker is evaluated on a phoneme-by-phoneme basis rather than on a word-by-word or sentence-by-sentence basis and the evaluation results are displayed on a phoneme-by-phoneme basis. This makes it easy to see the similarity evaluation results on a phoneme-by-phoneme basis.

The present invention sets forth the data process unit, wherein:
the acoustic space is composed of a plurality of pattern models generated from speech data of the plurality of speakers in a plurality of speech styles; and
the similarity evaluating means evaluates the similarity in each of the plurality of speech styles.

In this way, the acoustic space is composed of a plurality of pattern models generated from speech data of the plurality of speakers in a plurality of speech styles and the similarity evaluating means can evaluate the similarity in each of the plurality of speech styles.

Thus, it is possible to evaluate the similarity of speech uttered by the target speaker to speech uttered by a specific speaker in various speech styles such as in a high voice, in a low voice, rapidly, and slowly. This allows the target speaker, for example, to imitate speech uttered by the specific speaker in a speech style which suits him/her.

The present invention sets forth the data process unit, wherein the positional relationship display means establishes a coordinate axis of the low dimensional space based on the speech styles for the plurality of pattern models.

Specifically, by establishing the axis of the low dimensional space according to the rate of speech, pitch of sound, or the like, it is possible to easily grasp features of speech data of the target speaker as well as features of speech data of speakers around him/her or of a specific speaker.

The present invention sets forth the data process unit, wherein the pattern models are generated using HMMs (Hidden Markov Models).

In this way, the pattern models are generated using HMMs, a known technology.

Here speech varies in time span with the speaking speed and has a characteristic shape (spectral envelope) in the frequency domain according to the content of an utterance. The shape fluctuates depending on speakers, environment, content, etc. The HMMs, for example, are statistical models which can absorb the fluctuations.

The present invention sets forth a data process system comprising:
an information processing terminal which is under the control of a target speaker; and
the data process unit, wherein:
the information processing terminal and the data process unit are communicably connected with each other,
the information processing terminal comprises speech data sending means for acquiring speech data of the target speaker and sending the acquired speech data to the data process unit, and information display means for displaying information about processing results of speech data acquired from the data process unit, and
the data process unit comprises information sending means for sending the information about the processing results of the speech data to the information processing terminal.

In this way, the information processing terminal can acquire speech data of the target speaker and send the acquired speech data to the data process unit via the speech data sending means. Also, it can display, via the information display means, information about processing results of speech data of the target speaker acquired from the data process unit.

On the other hand, the data process unit can send the information about the processing results of the speech data to the information processing terminal via the information sending means.

Thus, if the information processing terminal is connected to the data process unit via the Internet or the like, it is possible to perform the detection process, evaluation process, or the like on the speech data of the target speaker via the Internet, making it easy for the target speaker to perform the detection process or evaluation process on his/her speech at home or the like.

The present invention sets forth a data process method comprising the steps of:
preparing an acoustic space composed of a plurality of pattern models generated from speech data of a plurality of speakers;
acquiring speech data of a target speaker;
calculating position of the speech data of the target speaker in the acoustic space based on the speech data of the target speaker and the plurality of pattern models in the acoustic space;
detecting similar speakers who resemble the target speaker in speech out of the plurality of speakers based on the position of the speech data and the plurality of pattern models; and
displaying information about positional relationship between the speech data of the target speaker and pattern models of the similar speakers in the acoustic space based on the position of the speech data and the pattern models of the similar speakers.

Since this invention is implemented by the data process unit discussed elsewhere in the specification, description of its effect will be omitted to avoid redundancy.

The present invention sets forth the data process method, comprising the steps of:
specifying a specific speaker among the plurality of speakers;
evaluating similarity in speech between the specific speaker and the target speaker based on the position of the speech data and the pattern model of the specific speaker in the acoustic space; and
displaying the evaluation results.

Since this invention is implemented by the data process unit discussed elsewhere in the specification, description of its effect will be omitted to avoid redundancy.

The present invention sets forth a data process method comprising the steps of:
preparing an acoustic space composed of a plurality of pattern models generated from speech data of a plurality of speakers;
specifying a specific speaker among the plurality of speakers;
acquiring speech data of a target speaker;
calculating position of the speech data of the target speaker based on the speech data of the target speaker and the plurality of pattern models in the acoustic space;

evaluating similarity in speech between the specific speaker and the target speaker based on the position of the speech data and the pattern model of the specific speaker;

displaying the evaluation results; and displaying information about positional relationship between the speech data of the target speaker and pattern model of the specific speaker in the acoustic space based on the position of the speech data and the pattern model of the specific speaker.

Since this invention is implemented by the data process unit discussed elsewhere in the specification, description of its effect will be omitted to avoid redundancy.

The present invention sets forth a data process unit control program comprising:

an acoustic space storing step of storing an acoustic space composed of a plurality of pattern models generated from speech data of a plurality of speakers;

a speech data acquiring step of acquiring speech data of a target speaker;

a position calculating step of calculating position of the speech data of the target speaker in the acoustic space based on the speech data of the target speaker and the plurality of pattern models in the acoustic space;

a similar-speaker detecting step of detecting similar speakers who resemble the target speaker in speech out of the plurality of speakers based on the position of the speech data and the plurality of pattern models;

a positional relationship information display step of displaying information about positional relationship between the speech data of the target speaker and pattern models of the similar speakers in the acoustic space based on the position of the speech data and the pattern models of the similar speakers;

a speaker specifying step of specifying a specific speaker;

a similarity evaluating step of evaluating similarity in speech between the specific speaker and the target speaker based on the position of the speech data and the pattern model of the specific speaker in the acoustic space; and an evaluation result display step of displaying evaluation results produced by the similarity evaluating step, wherein the positional relationship information display step displays information about positional relationship between the speech data of the target speaker and pattern model of the specific speaker in the acoustic space based on the position of the speech data and the pattern model of the specific speaker.

Since this invention is a program for controlling the data process unit as discussed elsewhere in the specification, description of its effect will be omitted to avoid redundancy.

The present invention sets forth a data process unit control program comprising:

Claim 75 of the present invention sets forth a data process unit control program comprising:

an acoustic space storing step of storing an acoustic space composed of a plurality of pattern models generated from speech data of a plurality of speakers;

a speaker specifying step of specifying a specific speaker among the plurality of speakers;

a speech data acquiring step of acquiring speech data of a target speaker;

a position calculating step of calculating position of the speech data of the target speaker based on the speech data of the target speaker and the plurality of pattern models in the acoustic space;

a similarity evaluating step of evaluating similarity in speech between the specific speaker and the target speaker based on the position of the speech data and the pattern model of the specific speaker;

an evaluation result display step of displaying evaluation results produced by the similarity evaluating step; and a positional relationship information display step of displaying information about positional relationship between the speech data of the target speaker and pattern model of the specific speaker in the acoustic space based on the position of the speech data and the pattern model of the specific speaker.

Since this invention is a program for controlling the data process unit further discussed herein, description of its effect will be omitted to avoid redundancy.

As described above, the data process unit discussed herein displays the plurality of low dimensional vectors corresponding to pattern models as coordinate points in a low dimensional space of the same dimension as the low dimensional vectors corresponding to pattern models while maintaining the distance relationship based on values of low dimensional elements. This makes it easy to grasp the distance relationship (similarity) among the pattern models visually. Also, since 4-dimensional or higher-dimensional pattern models can be converted into 3-dimensional or lower dimensional pattern models, clustering and various other processes can be performed more easily.

The data process unit discussed herein may automatically divide the coordinate points of the plurality of low dimensional vectors corresponding to pattern models displayed in the low dimensional space by the low dimensional vector corresponding to pattern model display means into a plurality of regions in the low dimensional space. Thus, the coordinate points of the plurality of low dimensional vectors corresponding to pattern models can be divided easily, making it easy to see visually to what region a particular pattern model belongs.

The data process unit set can change the results of divisions produced automatically by the region dividing means. Thus, if results of divisions are inappropriate or new pattern models are added, the results of divisions can be changed appropriately.

The data process unit discussed herein may generate generates specific pattern models based on the predetermined data on an object corresponding to a low dimensional vectors corresponding to pattern models selected for each segment region. Thus, it is possible to generate appropriate pattern models for the specified object by, for example, generating pattern models using the predetermined data on the object corresponding to a low dimensional vector corresponding to pattern model in the segment region that contains pattern models on an specific object. Also, since pattern models are generated using the predetermined data on a specific segment region, it is possible to reduce the memory requirements of the pattern models.

The data process unit control program is intended to control the data process unit discussed herein, and thus description of its effect will be omitted to avoid redundancy.

The data process unit control program is intended to control the data process unit discussed herein, and thus description of its effect will be omitted to avoid redundancy.

The pattern model search unit can search for a regional pattern model with recognition performance suitable for recognizing predetermined data on a new object based on likelihood of regional pattern models for respective segment regions in relation to the predetermined data on the new object.

The pattern model search unit control program is intended to control the pattern model search unit, both of which are discussed herein, and thus description of its effect will be omitted to avoid redundancy.

The data process unit discussed herein makes it easy to grasp the distance relationship (similarity) among the pattern models visually. Also, since 4-dimensional or higher dimensional pattern models can be converted into 3-dimensional or lower dimensional pattern models, clustering and various other processes can be performed more easily. Furthermore, since the occurrence frequency of predetermined data is used to calculate the mathematical distance, if the mathematical distance is weighted using the occurrence frequency, it is possible to define the distance among the pattern models by, for example, taking into consideration all the predetermined data, and thus to calculate distance relationship among the pattern models accurately.

In addition, the data process unit discussed herein offers the following effect: since the occurrence frequency of the pattern units whose recognition performance is lower than a predetermined threshold is used in the calculation of the mathematical distance, pattern models of objects with low recognition performance can be displayed in accurate distance relationship at a low dimensional level. This makes it easy to cluster pattern models of objects with low recognition performance.

The data process unit sot forth in claim 18 makes it easy to grasp the distance relationship (similarity) among the pattern models visually. Also, since the coordinate points of the plurality of low dimensional vectors corresponding to pattern models can be divided easily, it is easy to see visually to what region a particular pattern model belongs. Furthermore, it is possible to search for a regional pattern model with recognition performance suitable for recognizing predetermined data on a new object based on likelihood of regional pattern models for respective segment regions in relation to the predetermined data on the new object.

In addition, the data process unit discussed herein offers the following effect: since the occurrence frequency of speech data is used to calculate the mathematical distance, if the mathematical distance is weighted using the occurrence frequency, it is possible to define the distance among the pattern models by, for example, taking into consideration all the predetermined data on the pattern models, and thus to calculate distance relationship among the pattern models accurately.

In addition, the data process unit discussed herein offers the following effect: since the occurrence frequency of the pattern units whose recognition performance is lower than a predetermined threshold is used in the calculation of the mathematical distance, pattern models of objects with low recognition performance can be displayed in accurate distance relationship at a low dimensional level. This makes it easy to cluster pattern models of objects with low recognition performance.

In addition, the data process unit discussed herein offers the following effect: the ring-shaped regions formed by the concentric outer and inner circles can be divided into a plurality of fan-shaped regions.

In addition, the data process unit discussed herein offers the following effect: when pattern models are visualized two-dimensionally, since recognition performance (similarity to other models) of pattern models tend to lower with increasing radial distance from the center, by finely dividing regions containing pattern models with low recognition performance, it is possible to group data more accurately.

In addition, the data process unit discussed herein offers the following effect: it is possible to easily deal with cases in which predetermined data on specified objects are located at boundaries between segment regions when generating pattern models of the specified objects.

In addition, the data process unit discussed herein offers the following effect: since the likelihood of regional pattern models of the predetermined data on the new object is calculated beginning with the innermost circle and moving to the outermost circle, it is possible to quickly search for the regional pattern model of the segment region suitable for the predetermined data on the new object.

In addition, the data process unit discussed herein offers the following effect: since the segment regions containing the regional pattern models with the highest likelihood (recognition performance) are searched for beginning with the innermost circle and moving to the outermost circle, it is possible to quickly search for the regional pattern model of the segment region suitable for the predetermined data on the new object.

In addition, the data process unit discussed herein offers the following effect: since the segment regions containing the regional pattern models with the top m likelihoods are searched for beginning with the innermost circle and moving to the outermost circle, it is possible to quickly search for the regional pattern model of the segment region suitable for the predetermined data on the new object.

In addition, the data process unit discussed herein offers the following effect: it is possible to generate pattern models of speech data taking into consideration at least the type of speaker including the name, sex (male/female), age (children/adults/the aged) of speakers; speech lexicons such as numerals, sentences, and words; speech styles such as the rate of speech, loudness of speech, and features due to dialects; and speech environment such as indoor, in-car, in-plant, or outdoor environment (classification by location).

In addition, the data process unit discussed herein offers the following effect: for example, if the predetermined data are human voice data, a group can be formed under a desired combination of specific conditions, such as that an adult male (type of speaker) uttered words (speech lexicon) rapidly (speech style) indoors (speech environment). Of course, the data may be grouped under broader conditions, such as that an adult male (type of speaker) spoke indoors (speech environment).

The data process unit discussed herein makes it possible to calculate more appropriate mathematical distance among the pattern models.

In addition, the data process unit discussed herein offers the following effect: it is possible to convert the pattern models into the same number of low dimensional vectors corresponding to pattern models while maintaining distance relationship among the pattern models.

In addition, the data process unit discussed herein offers the following effect: if results of divisions are inappropriate or new pattern models are added, the results of divisions can be changed appropriately. Also, since visualized results of divisions of pattern models are changed, the results of divisions can be changed easily.

In addition, the data process unit discussed herein offers the following effect: since the regional pattern model in a specific segment region can be adapted to the new object, it is possible to reduce the memory requirements of the pattern models.

In addition, the data process unit discussed herein offers the following effect: since a high-dimensional pattern model corresponding to the plurality of low dimensional vectors corresponding to pattern models contained in the region corresponding to the regional pattern model found by the regional pattern model searching means is converted again into the low dimensional vectors corresponding to pattern models, which are then divided, by searching the segment regions for a regional pattern model suitable for a new object, it is possible to generate a specific pattern model more suitable for pattern recognition of predetermined data on the new object.

The data process unit control program discussed herein is intended to control the data process unit, and thus description of its effect will be omitted to avoid redundancy.

The data process unit control program may also control the data process unit, as discussed herein, and thus description of its effect will be omitted to avoid redundancy.

A specific embodiment of the pattern model providing system discussed herein allows the system user to connect an information processing terminal such as a PC, cell phone, or PDA to the data process unit via the Internet or the like, send his/her speech data to the data process unit, and thereby easily acquire specific pattern models suitable for speech recognition of his/her speech data.

Yet another data process unit consistent with the present invention evaluates the value of the speech data of the target speaker based on the positional relationship between the speech data of the target speaker and other pattern models in the acoustic space and displays the evaluation results as well as displays the positional relationship between the speech data and other pattern models. This makes it possible to visually determine whether the speech data produced by the target speaker has high value and makes it easy to visually see the position of the speech data of the target speaker in the acoustic space.

Yet another data process unit consistent with the present invention offers the following effect: since the value of the speech data is evaluated based on the number of pattern models existing within a predetermined distance from the position of the speech data of the speaker in the acoustic space, it is possible, for example, to determine that the value of the speech data is high if there are not many pattern models of other speakers around the speech data of the target speaker and determine that the value of the speech data is low if there are many pattern models around the speech data.

Yet another data process unit consistent with the present invention offers the following effect: since the predetermined distance is set stepwise according to the value of the speech data, the value of the speech data can be evaluated based on the number of pattern models existing within each distance range set stepwise. This makes it possible to evaluate the value of the speech data of the target speaker stepwise according to the number of pattern models in each distance range.

Yet another data process unit consistent with the present invention offers the following effect: since the data process unit uses a pattern model similar in features to the speech data of the target speaker out of the plurality of pattern models as the pattern model of the target speaker for the evaluation, consequently using the position of a similar pattern model as the position of the speech data produced by the target speaker in the acoustic space instead of generating a pattern model of the speech sounds produced by the target speaker, it can reduce computing work and use a configuration suitable for real-time processing and the like.

Yet another data process unit consistent with the present invention data process unit offers the following effect: since the top few pattern models similar in features to the speech data of the target speaker are used as the pattern models of the target speaker for the evaluation, by selecting the top few pattern models in descending order of similarity and using the average value of these pattern models for evaluation, it is possible to reduce the impact of any wrong selection in which a pattern model thought to be similar actually turns out to be dissimilar, compared to when selecting a single pattern model.

Yet another data process unit consistent with the present invention offers the following effect: the data process unit determines similarity by calculating the likelihood of match between the speech data of the target speaker and the plurality of pattern models of the plurality of speakers, making it easy to select pattern models similar in features to the speech data of the target speaker.

Yet another data process unit consistent with the present invention offers the following effect: the data process unit converts the speech data acquired by the speech data acquiring means into high dimensional feature data, generates a pattern model of the target speaker based on the feature data, calculates mathematical distance between the generated pattern model and the plurality of pattern models of the plurality of speakers, and calculates the position of the acquired speech data in the acoustic space based on the calculated mathematical distance, making it possible to evaluate the value of the speech data of the target speaker more accurately.

Yet another data process unit consistent with the present invention offers the following effect: since the data process unit converts a plurality of pattern models in the acoustic space including a plurality of pattern models corresponding to speech data of the target speaker into lower dimensional pattern models while maintaining the positional relationship and displays the pattern models after the conversion as coordinate points in a low dimensional space, it is easy to see the position of the speech data in the acoustic space visually.

Yet another data process unit consistent with the present invention offers the following effect: since, the pattern models are generated using HMMs (Hidden Markov Models), a known technology, speech data can be modeled appropriately.

Yet another data process unit consistent with the present invention offers the following effect: since the speech data of the target speaker is evaluated on a phoneme-by-phoneme basis rather than on a word-by-word or sentence-by-sentence basis and the evaluation results are displayed on a phoneme-by-phoneme basis, it is easy to determine the value of each phoneme.

Yet another data process unit consistent with the present invention offers the following effect: by displaying supplementary information prompting for such information as the manner of pronunciation, rate of speech, or other speech data desired to be evaluated (or acquired), it is possible to acquire and evaluate various speech data of the same target speaker.

Yet another data process unit consistent with the present invention offers the following effect: since the data process unit negotiates with the target speaker on whether the speech data can be provided and stores the speech data over which negotiations are completed successfully, it is possible to negotiate with the target speaker over acquisition of any speech data produced by the target speaker and evaluated, for example, as having high value.

At least one embodiment consistent with the present invention includes a data process unit set that offers the following effect: by connecting the information processing terminal to the data process unit via the Internet or the like, it is possible to evaluate speech data of many target speakers via the Internet, making it easy to acquire speech data high in value.

In yet another embodiment of the present invention, the data process method is implemented by the data process unit, as discussed herein.

In yet another embodiment of the present invention, the data process unit control program is intended to control the data process unit, as discussed herein.

In yet another embodiment of the present invention, the data process unit offers the same effect as the data process unit in the data process system, as discussed herein.

In yet another embodiment of the present invention, the information processing terminal offers the same effect as the information processing terminal in the data process system, as discussed herein.

In yet another embodiment of the present invention, the data process unit control program is intended to control the data process unit, as discussed herein.

In yet another embodiment of the present invention, the information processing terminal control program is intended to control the information processing terminal, as discussed herein.

In yet another embodiment of the present invention, the data process unit offers the following effect: it is easy to see visually which of the plurality of speakers resembles the target speaker in speech.

In yet another embodiment of the present invention, the data process unit offers the following effect: it is easy to visually see similarity in speech between the specified specific speaker and the target speaker as well as positional relationship between the speech data of the target speaker and pattern model of the specific speaker.

In yet another embodiment of the present invention, the data process unit offers the following effect: it is easy to visually see similarity in speech between the specified specific speaker and the target speaker as well as positional relationship between the speech data of the target speaker and pattern model of the specific speaker.

In yet another embodiment of the present invention, the data process unit offers the following effect: the target speaker can correct his/her manner of speaking by looking at the correction information.

In yet another embodiment of the present invention, the data process unit offers the following effect: since both similar-speaker detecting means and similarity evaluating means use the position of a similar pattern model as the position of the speech data produced by the target speaker in the acoustic space instead of generating a pattern model of the speech sounds produced by the target speaker, it is possible to further reduce computing work, and thus this invention is suitable for real-time processing and the like.

In yet another embodiment of the present invention, the data process unit offers the following effect: by selecting the top few pattern models in descending order of similarity and using the average value of these pattern models for a detection process, evaluation process, or the like, it is possible to reduce the impact of any wrong selection in which a pattern model thought to be similar actually turns out to be dissimilar, compared to when selecting a single pattern model.

In yet another embodiment of the present invention, the data process unit offers the following effect: since the data process unit determines similarity by calculating the likelihood between the speech data of the target speaker and the plurality of pattern models of the plurality of speakers, it is easy to select pattern models similar in features to the speech data of the target speaker.

In yet another embodiment of the present invention, the data process unit offers the following effect: it is possible to perform a detection process or evaluation process directly on the speech data of the target speaker.

In yet another embodiment of the present invention, the data process unit offers the following effect: it is easy to see the position of the speech data in the acoustic space visually.

In yet another embodiment of the present invention, the data process unit set forth in claim 66 offers the following effect: since the value of the speech data of the target speaker is evaluated on a phoneme-by-phoneme basis rather than on a word-by-word or sentence-by-sentence basis and the evaluation results are displayed on a phoneme-by-phoneme basis, it is easy to see the similarity evaluation results on a phoneme-by-phoneme basis.

In yet another embodiment of the present invention, the data process unit offers the following effect: since the data process unit evaluates the similarity of speech uttered by the target speaker to speech uttered by a specific speaker in various speech styles such as in a high voice, in a low voice, rapidly, and slowly, the target speaker can imitate speech uttered by the specific speaker in a speech style which suits him/her.

In yet another embodiment of the present invention, the data process unit offers the following effect: by establishing the axis of the low dimensional space according to the rate of speech, pitch of sound, or the like, it is possible to easily grasp features of speech data of the target speaker as well as features of speech data of speakers around him/her or of a specific speaker.

In yet another embodiment of the present invention, the data process unit offers the following effect: since the pattern models are generated using HMMs, a known technology, it is possible to absorb fluctuations in waveforms of acquired speech data.

In yet another embodiment of the present invention, the data process unit offers the following effect and the like: if the information processing terminal is connected to the data process unit via the Internet or the like, it is possible to perform the detection process, evaluation process, or the like on the speech data of the target speaker via the Internet, making it easy for the target speaker to perform the detection process or evaluation process on his/her speech at home or the like.

In yet another embodiment of the present invention, the data process method is implemented by the data process unit.

In yet another embodiment of the present invention, yet another data process method is implemented by the data process unit.

In yet another embodiment of the present invention, yet another data process method is implemented by yet another embodiment of the data process unit as further discussed herein.

In yet another embodiment of the present invention, the data process unit control program is intended to control the data process unit.

In yet another embodiment of the present invention, yet another data process unit control program is intended to control yet another embodiment of the data process unit as further discussed herein.

BRIEF DESCRIPTION OF THE DRAWINGS

FIG. 14 is a diagram showing recognition rates of regional acoustic models generated for different segment regions and acoustic models generated for a whole region;

FIG. 15 is a diagram showing speech styles;

FIG. 17 is a diagram showing an example in which acoustic models created using data on daily life noise, cries of wild birds, and human voice are projected two-dimensionally;

FIG. 18 is a diagram showing an example in which pattern models created using image data of human lips are projected two-dimensionally;

FIG. 19 is a diagram showing an example in which pattern models created using output data of an infrared sensor are projected two-dimensionally;

FIG. 20 is a diagram showing an example in which pattern models created using output data of an acceleration sensor are projected two-dimensionally;

FIG. 23 is a diagram showing distribution of speakers marked by a high recognition rate and speakers marked by a low recognition rate in the case where a high dimensional acoustic model is displayed in two-dimensional coordinates;

FIG. 24 is a diagram showing structures of different segment regions;

FIG. 29A is a diagram showing types of speech style used to generate acoustic models while FIG. 29B is a diagram showing acoustic-model-compatible low dimensional vectors displayed in a two-dimensional plane by the data process unit 21 according to the present invention;

FIG. 34A is a diagram showing an acoustic space map generated using the occurrence frequency of simple diphones while

FIG. 43 is a block diagram showing a configuration of a data process system 7 according to the present invention;

FIG. 45 is a diagram showing a detailed configuration of a data process unit 3;

FIG. 48 is a flowchart showing operations and processes performed by the information processing terminal 2;

FIG. 50 is a flowchart showing processes performed by a second information display section 3f to display coordinate information through two-dimensional projection;

FIGS. 54A and 54B are diagrams showing flows of an initial-database construction process and data evaluation process on a data process system 8;

FIG. 55A shows coordinates of HMMs as points when the HMMs are treated on a word-by-word basis and FIG. 55B shows coordinates of HMMs as points when the HMMs are treated on a phoneme-by-phoneme basis ("a," "i," "u," "e," and "o" in the figure);

FIG. 59 is a flowchart showing processes performed by a second information display section 10g to display coordinate information through two-dimensional projection.

DETAILED DESCRIPTION OF THE PREFERRED EMBODIMENTS

First Embodiment

A first embodiment of the present invention will be described below with reference to drawings. FIGS. 1 to 14 are diagrams showing a data process unit according to the first embodiment of the present invention.

Figure 1:
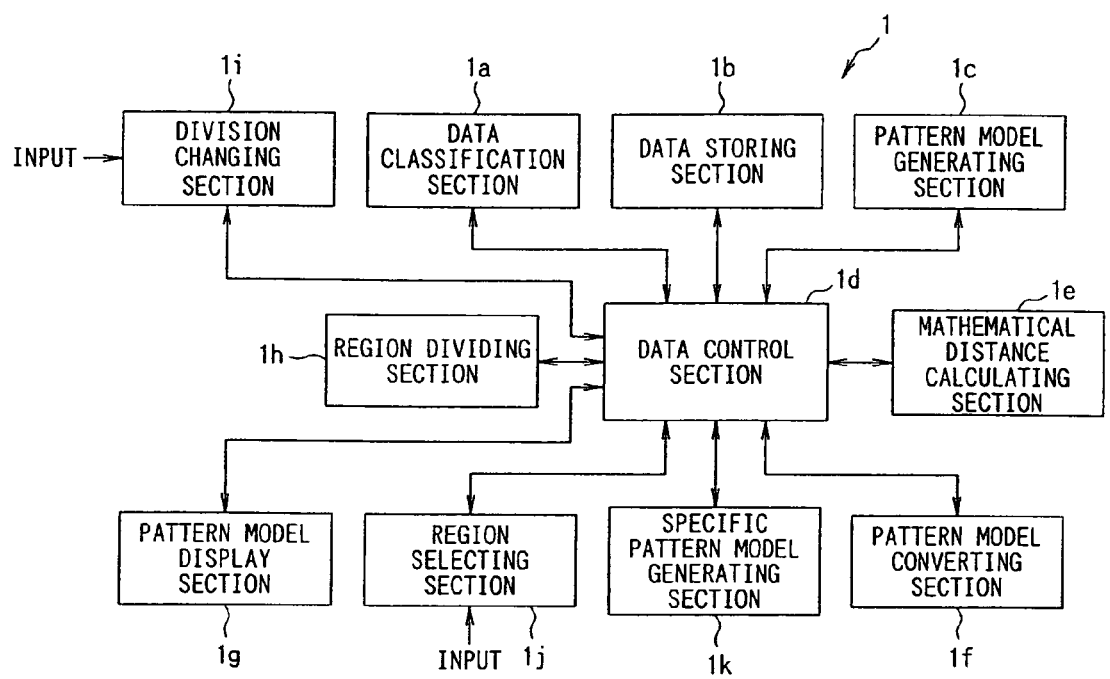
FIG. 1 is a block diagram showing a configuration of a data process unit 1 according to the present invention.

First, a configuration of a data process unit according to the present invention will be described with reference to FIG. 1. FIG. 1 is a block diagram showing a configuration of a data process unit 1 according to the present invention.

The data process unit 1 comprises a data classification section 1a, data storing section 1b, pattern model generating section 1c, data control section 1d, mathematical distance calculating section 1e, pattern model converting section 1f, pattern model display section 1g, region dividing section 1h, division changing section 1i, region selecting section 1j, and specific pattern model generating section 1k.

The data classification section 1a classifies an unspecified number of data on a plurality of objects into groups based on a plurality of specific conditions. According to this embodiment, it classifies an unspecified number of speech data acquired from a plurality of speakers into groups according to four specific conditions: the type of speaker including the name, sex (male/female), age (children/adults/the aged) of speakers; speech lexicons such as numerals, sentences, and words; speech styles such as the rate of speech, loudness of speech, and features due to dialects; and speech environment such as indoor, in-car, in-plant, or outdoor environment (classification by location) The specific conditions can be combined freely by the user (by combining elements of the specific conditions or combining specific conditions).

The data storing section 1b stores data on a plurality of objects as well as data related to data processing of pattern models and the like generated from the data on a plurality of objects. According to this embodiment, the data stored include the speech data, pattern models (hereinafter referred to as acoustic models) generated from the speech data, and other data related to speech data processing.

The pattern model generating section 1c generates 4-dimensional or higher dimensional pattern models for each group based on the data classified by the data classification section 1a. According to this embodiment, it generates 4-dimensional or higher dimensional acoustic models (hereinafter referred to as high-dimensional acoustic models) for each group based on the speech data classified by the data classification section 1a.

The data control section 1d controls the flow of data among components of the data process unit 1 as well as the flow of operation among the components.

The mathematical distance calculating section 1e calculates mathematical distance among the pattern models generated by the pattern model generating section 1c. According to this embodiment, it calculates the mathematical distance among high dimensional acoustic models.

The pattern model converting section 1f converts the pattern models generated by the pattern model generating section 1c into lower dimensional models (hereinafter referred to as low dimensional vectors corresponding to pattern models) based on the mathematical distance calculated by the mathematical distance calculating section 1e. According to this embodiment, it converts high dimensional pattern models generated by the pattern model generating section 1c into lower dimensional models (hereinafter referred to as acoustic-model-compatible low dimensional vectors) based on the mathematical distance calculated by the mathematical distance calculating section 1e.

The pattern model display section 1g displays the low dimensional vectors corresponding to the pattern models converted from the pattern models by the pattern model converting section 1f, as coordinate points in a low dimensional space of the same dimension as the low dimensional vectors corresponding to pattern models. According to this embodiment, it displays the acoustic-model-compatible low dimensional vectors converted from acoustic models by the pattern model converting section 1f, as coordinate points in a low dimensional space of the same dimension as the acoustic-model-compatible low dimensional vectors.

The region dividing section 1h automatically divides the coordinate points of the low dimensional vectors corresponding to pattern models displayed as coordinate points in the low dimensional space by the pattern model display section 1g into a plurality of regions in the low dimensional space. According to this embodiment, it automatically divides the acoustic-model-compatible low dimensional vectors displayed as coordinate points in the low dimensional space by the pattern model display section 1g into a plurality of regions in the low dimensional space. Also, according to this embodiment, the plurality of regions resulting from the division are referred to as segment regions.

Based on information from an input device (not shown) of the data process unit 1, the division changing section 1i changes the results of divisions produced by the region dividing section 1h.

Based on information from the input device (not shown) of the data process unit 1, the region selecting section 1j selects a specific segment region from among the plurality of segment regions produced by the region dividing section 1h.

The specific pattern model generating section 1k generates high dimensional pattern models based on the data related to the pattern models corresponding to the low dimensional vectors corresponding to pattern models located in the specific region selected by the region selecting section 1j. According to this embodiment, it generates high dimensional acoustic models based on the data related to the high dimensional acoustic models corresponding to the acoustic-model-compatible low dimensional vectors located in the specific region selected by the region selecting section 1j. Also, according to this embodiment, the high dimensional acoustic models generated by the specific pattern model generating section 1k are referred to as specific pattern models (specific acoustic models according to this embodiment).

Incidentally, although they are not shown, the data process unit 1 is equipped with a processor, RAM (Random Access Memory), and ROM (Read Only Memory) storing dedicated programs. The above components perform their functions as the processor executes the dedicated programs: some of them perform their functions solely through the execution of dedicated programs, and the others perform their functions as dedicated programs control hardware.

Now, concrete operation of the data process unit 1 will be described with reference to FIGS. 2 to 9.

Figure 2:
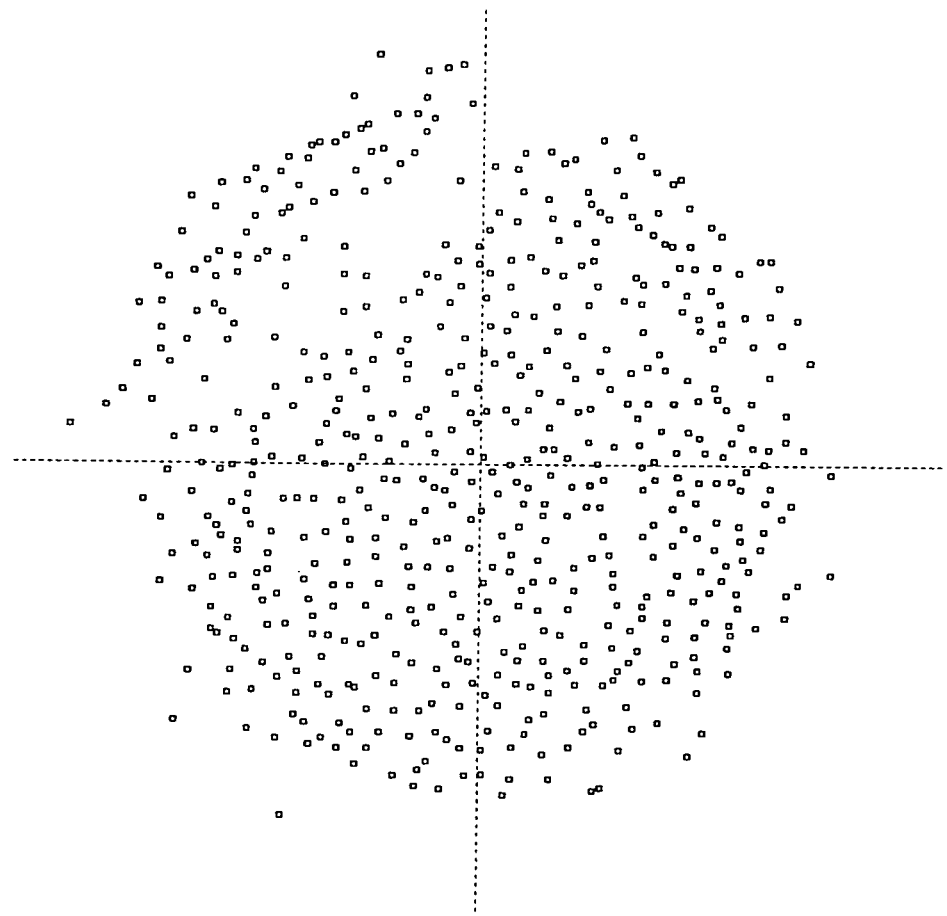
FIG. 2 is a diagram showing an example in which acoustic-model-compatible low-dimensional vectors of two dimension are displayed in a two-dimensional space.
Figure 3:
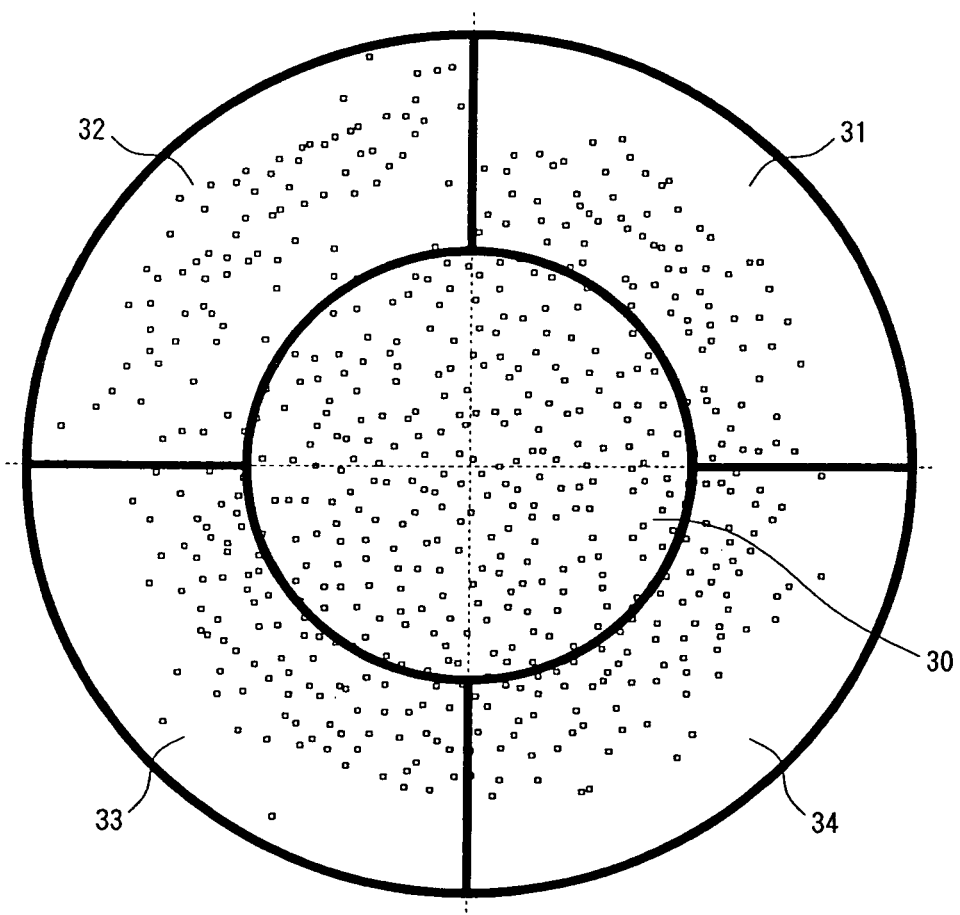
FIG. 3 is a diagram showing an example of how displayed coordinate points are divided into regions in a two-dimensional space.
Figure 4:
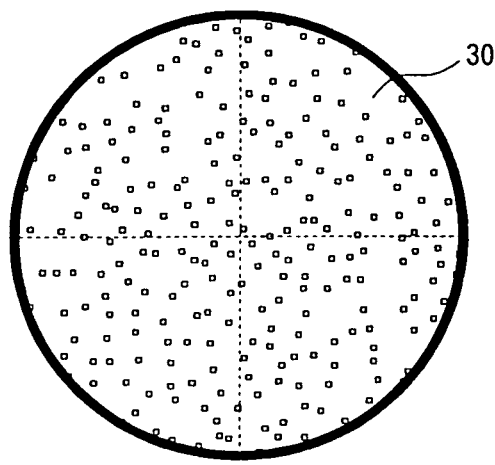
FIG. 4 is a diagram showing a first segment region.
Figure 5:
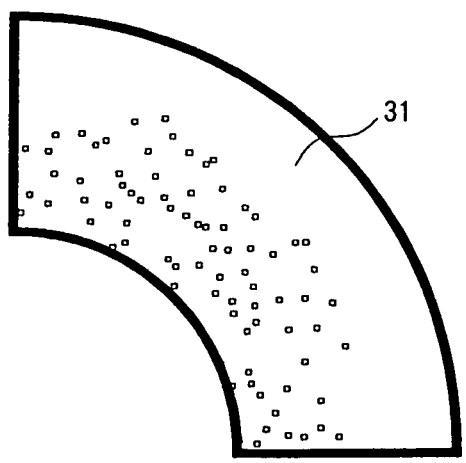
FIG. 5 is a diagram showing a second segment region.
Figure 6:
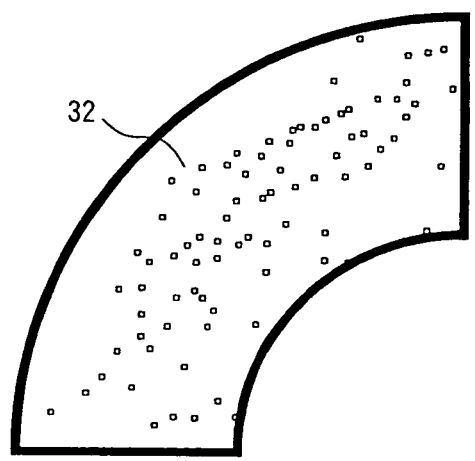
FIG. 6 is a diagram showing a third segment region.
Figure 7:
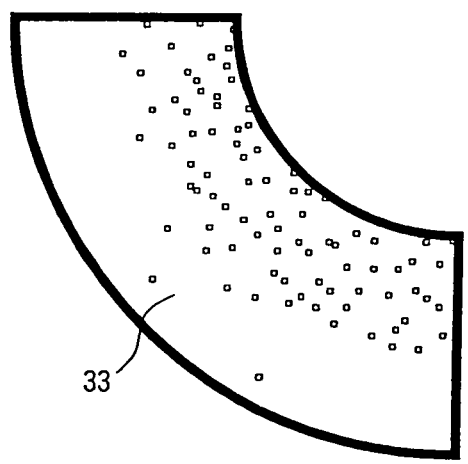
FIG. 7 is a diagram showing a fourth segment region.
Figure 8:
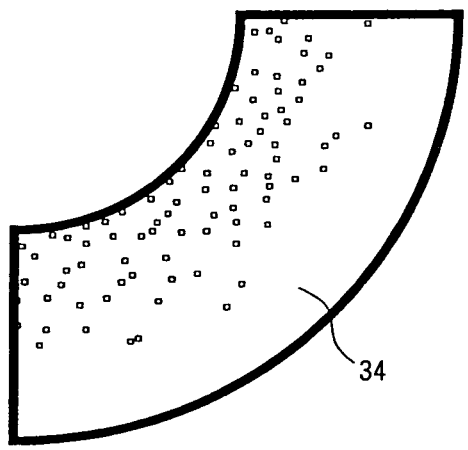
FIG. 8 is a diagram showing a fifth segment region.
Figure 9:
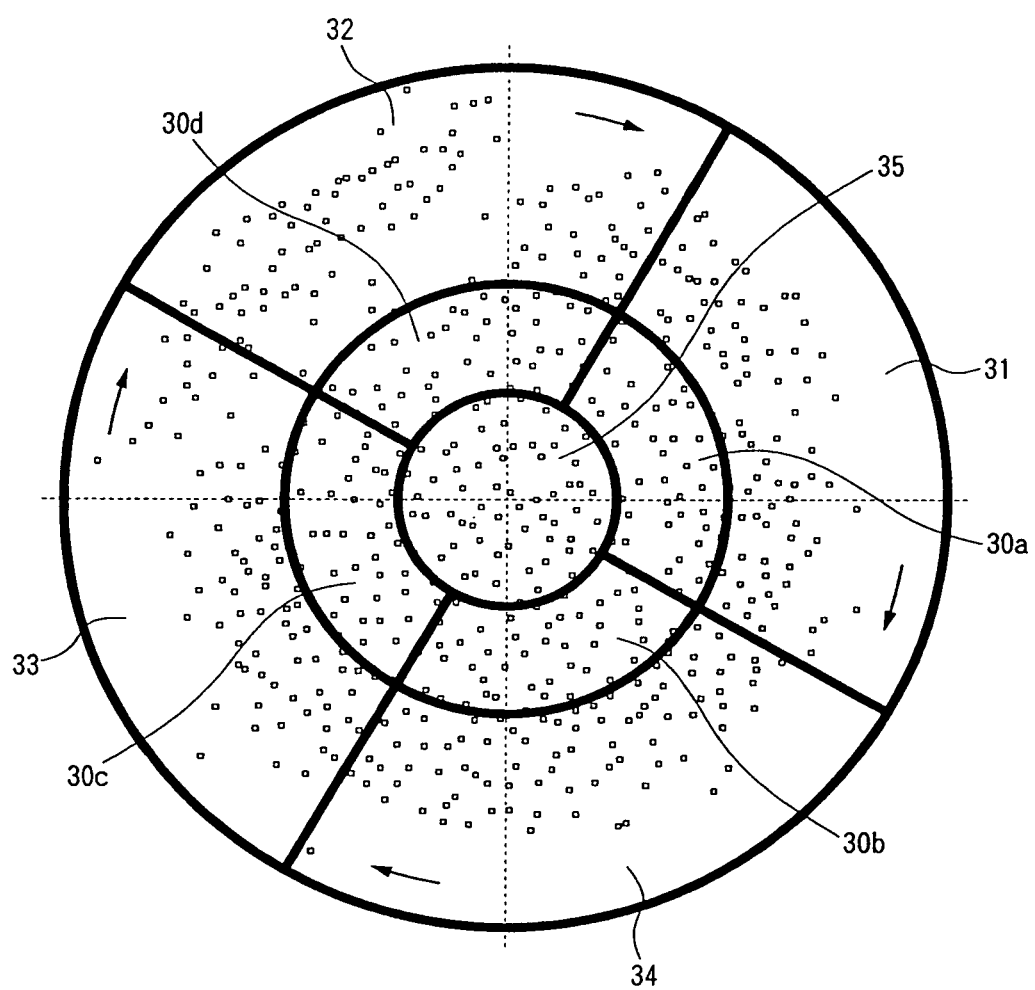
FIG. 9 is a diagram showing a modified version of results of divisions shown in FIG. 3.

FIG. 2 is a diagram showing an example in which acoustic-model-compatible low-dimensional vectors are displayed in a two-dimensional space, FIG. 3 is a diagram showing an example of how displayed coordinate points are divided into regions in a two-dimensional space, FIGS. 4 to 8 are diagrams showing segment regions created in FIG. 3, and FIG. 9 is a diagram showing a modified version of results of divisions shown in FIG. 3.

First, the data classification section 1a classifies the speech data of a plurality of speakers stored in the data storing section 1b into groups according to four specific conditions described above: the type of speaker, speech lexicons, speech styles, and speech environment. Groups are organized according to combinations of all four specific conditions: for example, a group is identified by the name of a speaker, words, rapid speech, and indoor environment, another group is identified by the name of a speaker, words, loud speech, and indoor environment, still another group is identified by the name of a speaker, words, rapid speech, and outdoor environment, and so on. Here information about the grouping is attached to the speech data.

Next, the pattern model generating section 1c generates a high dimensional acoustic model for each group of speech data. The acoustic models are generated using a known technology such as HMMs. The high-dimensional acoustic models generated are stored in the data storing section 1b, being associated with the corresponding speech data.

Then, the mathematical distance calculating section 1e calculates mathematical distance among the generated high dimensional acoustic models. Generally, a high dimensional acoustic model consists of a set of HMMs of phonetic units. The distance between a high dimensional acoustic models i and j is defined by Equation (1) below.

(Formula 1)

$$d_{ij}^* \equiv \sum_{k=0}^{K-1} d(i, j, k) * w(k) / \sum_{k=0}^{K-1} w(k) \quad (1)$$

In Equation (1) above, $d^*_{ij}$ is the distance between the high dimensional acoustic models i and j, d(i, j, k) is the distance between a model of a phonetic unit k contained in the high-dimensional acoustic model i and a model of the phonetic unit k contained in the high dimensional acoustic model j, w(k) is the occurrence frequency of the phonetic unit k and can be set freely according to its application, and K is the number of phonetic units used to calculate the mathematical distance.

Regarding the phonetic units used to calculate the mathematical distance, all phonetic units, a set of acoustically similar phonetic units, or a particular phonetic unit may be selected according to purpose.

As to d(i, j, k), a known measure for distance such as Euclidean distance determined based on a mean vector of normal distributions, Bhattacharrya distance, or Kullback information may be used. However, since Euclidean distance determined based on a mean vector normalized by the product of standard deviations of normal distributions is known to be as effective on recognition performance as Kullback information, it will be used here. It is assumed that HMMs of the phonetic units k of all high dimensional acoustic models follow a contaminated normal distribution. It is also assumed that state alignment of the acoustic models is 1:1. Then, d(i, j, k) can be defined by Equations (2) to (5) below.

(Formula 2)

$$d(i, j, k) \equiv \frac{1}{S(k)} \sum_{s=0}^{S(k)-1} \frac{1}{L} \sum_{l=0}^{L-1} \frac{dd(i, j, k, s, l)}{pp(i, j, k, s, l)} \quad (2)$$

$$dd(i, j, k, s, l) \equiv \quad (3)$$
$$\sum_{m_i=0}^{M_i} \sum_{m_j=0}^{M_j} p(i, k, s, l, m_i) \cdot p(j, k, s, l, m_j) \cdot c(i, j, k, s, l, m_i, m_j)$$

$$c(i, j, k, s, l, m_i, m_j) \equiv \frac{\{\mu(i, k, s, l, m_i) - \mu(j, k, s, l, m_j)\}^2}{\sigma(i, k, s, l, m_i) * \sigma(j, k, s, l, m_j)} \quad (4)$$

$$pp(i, j, k, s, l) \equiv \sum_{m_i=0}^{M_i} \sum_{m_j=0}^{M_j} p(i, k, s, l, m_i) \cdot p(j, k, s, l, m_j) \quad (5)$$

Where μ(i, k, s, l, m), δ(i, k, s, l, m), and p(i, k, s, l, m) are the average value, standard deviation, and weight of the m-th normal distribution, respectively, with i denoting a high dimensional acoustic model, k denoting a phonetic unit, s denoting a state, and l denoting a dimension. Also, S(k) is the number of states of the phonetic unit k, L is the number of dimensions, and Mi and Mj are the numbers of contaminations of the normal distributions of high-dimensional acoustic models i and j. As to acoustic parameters, a 10-dimensional mel-frequency cepstrum coefficient (MFCC), its first-order difference (ΔMFCC), and the first-order difference of power (Δ log-Power) are used, for example, for a total of 21 dimensions. From the standpoint of model size, if distance between simple normal distributions is used for distance calculation assuming high dimensional acoustic models based on the simple normal distributions, Equations (2) to (5) above can be simplified as Equation (6) below.

(Formula 3)

$$d(i, j, k) \equiv \frac{1}{S(k)} \sum_{s=0}^{S(k)-1} \frac{1}{L} \sum_{l=0}^{L-1} \frac{\{\mu(i, k, s, l) - \mu(j, k, s, l)\}^2}{\sigma(i, k, s, l) * \sigma(j, k, s, l)} \quad (6)$$

Then, the pattern model converting section 1f converts the plurality of high dimensional acoustic models into the same number of acoustic-model-compatible low dimensional vectors using the calculated mathematical distance. It converts all the high dimensional acoustic models into the acoustic-model-compatible low dimensional vectors (two-dimensional or three-dimensional) while maintaining distance relationship among them so that two high dimensional acoustic models with a small mathematical distance between them will be placed close to each other and that two high dimensional acoustic models with a large mathematical distance between them will be placed away from each other. According to this embodiment, it is assumed that the pattern model converting section 1f converts the high dimensional acoustic models into acoustic-model-compatible low-dimensional vectors in two dimension.

Sammon's method known to those skilled in the art is available as a conversion method for converting high dimensional acoustic models into acoustic-model-compatible low-dimensional vectors in two dimension while maintaining the distance relationship.

Sammon's method is a non-linear mapping technique which involves optimizing mapping position coordinates in a low dimensional space using a steepest-descent method so as to minimize the difference between the sum total of distances among high dimensional information in a high dimensional space and the sum total of Euclidean distances among the mapping position coordinates in the low dimensional space. All the high dimensional information is projected to the low dimensional space in such a way that two pieces of high dimensional information with a small distance between them will also be placed close to each other in the low dimensional space and that two pieces of high dimensional information with a large mathematical distance between them will also be placed away from each other in the low dimensional space. An error function E(t) to be minimized in Sammon's method is given by Equation (7) below.

(Formula 4)

$$E(t) = \frac{1}{\sum\limits_{i<j}^{N} (d_{ij}^*)} \sum_{i<j}^{N} \frac{(d_{ij}^* - d_{ij})^2}{d_{ij}^*} \quad (7)$$

According to this embodiment, the pattern model converting section 1f converts the high dimensional acoustic models into acoustic-model-compatible low-dimensional vectors in two dimension using Sammon's method. Thus, the conversion process here involves projecting the plurality of high dimensional acoustic models to the low dimensional space by assigning coordinates in the low dimensional space to the high dimensional acoustic models.

Thus, if acoustic-model-compatible low dimensional vectors are close to each other in mathematical distance (e.g., Euclidean distance) in the low dimensional space of the same dimension as the acoustic-model-compatible low dimensional vectors, the corresponding high dimensional acoustic models are presumed to be similar to each other, therefore their specific conditions are presumed to be similar. Also, closer to the center the high dimensional acoustic models are located, the more typical the corresponding specific conditions are presumed to be.

According to this embodiment, the coordinate information constitutes values of elements of the acoustic-model-compatible low dimensional vectors. The coordinate information attached is stored in the data storing section 1b, being associated with the corresponding acoustic-model-compatible low dimensional vectors.

Then, based on the values of the elements of the plurality of acoustic-model-compatible low dimensional vectors (coordinate information), the pattern model display section 1g displays the plurality of acoustic-model-compatible low dimensional vectors as coordinate points in a two-dimensional space with its center (origin) at the center of gravity of the coordinate information as shown in FIG. 2. Hereinafter a drawing created in this way will be referred to as an acoustic space map.

Then, the region dividing section 1h divides a region existing in the two-dimensional space and containing the coordinate points into five segment regions—first to fifth segment regions 30 to 34—as shown in FIG. 3.

Specifically, the region dividing section 1h divides the region existing in the two-dimensional space and containing the coordinate points by an outer circle and inner circle and further divides a ring-shaped region formed by the outer and inner circles into four regions (the second to fifth segment regions 31 to 34), where the outer circle has a radius equal to the distance between the center and the point farthest from the center while the inner circle encloses the first segment region 30 located inside the outer circle.

Thus, the pattern model display section 1g displays coordinate points in the results of divisions produced by the region dividing section 1h as shown in FIG. 3. Consequently, the plurality of acoustic-model-compatible low dimensional vectors inside the outer circle are divided into groups in the first to fifth segment regions 30 to 34 shown in FIGS. 4 to 8.

Then, the region selecting section 1j selects one of the first to fifth segment regions 30 to 34 based on input information from an input device such as a mouse or keyboard. Once a particular segment region is selected, the specific pattern model generating section 1k generates a specific acoustic model based on the speech data used to generate the high dimensional acoustic models which correspond to the acoustic-model-compatible low dimensional vectors in the selected segment region. The specific acoustic model is generated using a known technology such as HMMs as is the above case with the high dimensional acoustic models. The specific acoustic model generated is stored in the data storing section 1b.

Besides, according to this embodiment, the division changing section 1i can change the results of division produced automatically by the region dividing section 1h. Possible changes involve, for example, rotating the whole region in the direction of the arrows in FIG. 9 while maintaining the results of divisions produced by the region dividing section 1h, adding an inner circle 35, or forming new segment regions 30a to 30d based on input information from an input device such as a mouse or keyboard. The division changing section 1i corresponds to the division changing means set forth in claim 10.

Figure 10:
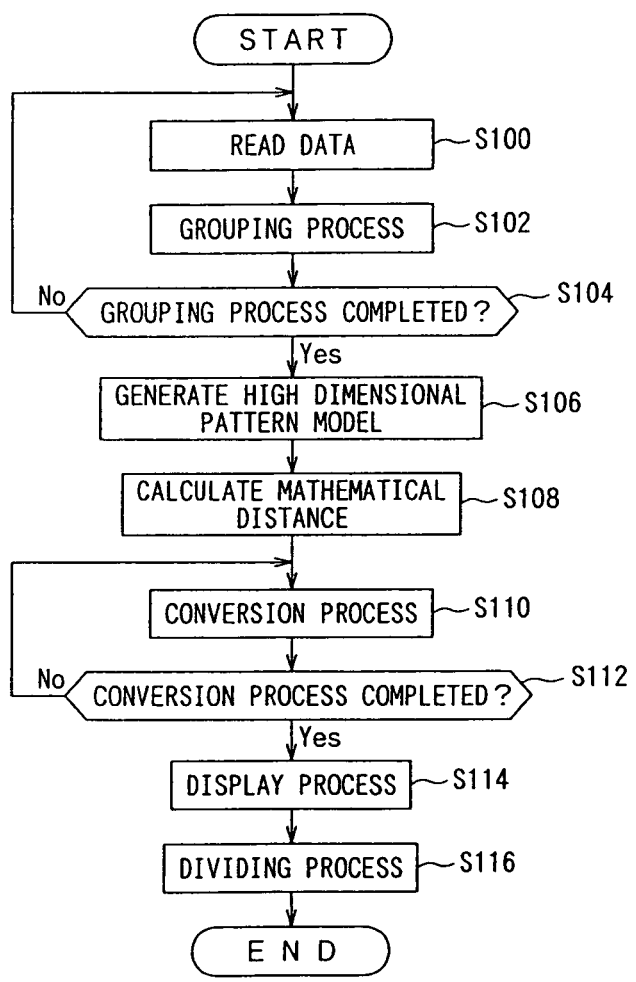
FIG. 10 is a flowchart showing operations and processes performed by the data process unit 1.

Now, flow of operations and processes performed by the data process unit 1 will be described with reference to FIG. 10. FIG. 10 is a flowchart showing the operations and processes performed by the data process unit 1. Incidentally, although in the flowchart shown in FIG. 10, the data handled are speech data and the pattern models generated are acoustic models in accordance with the embodiment, this is not restrictive, and various data and pattern models may be used according to application.

As shown in FIG. 10, first in Step S100, the data process unit 1 makes the data classification section 1a read speech data of a plurality of speakers out of the data storing section 1b via the data control section 1d. Then, it goes to Step S102.

In Step S102, the data process unit 1 makes the data classification section 1a classify the speech data into groups according to combinations of specific conditions (described above). Then, it goes to Step S104.

In Step S104, the data process unit 1 makes the data control section 1d judge whether the data classification section 1a has completed the grouping process. If it is found that the grouping process has been completed (Yes), the data process unit 1 goes to Step S106. Otherwise (No), it goes to Step S100.

In Step S106, the data process unit 1 makes the pattern model generating section 1c read out speech data of each group and generate a high dimensional acoustic model for each group. Then, it goes to Step S108.

In Step S108, the data process unit 1 makes the mathematical distance calculating section 1e calculate mathematical distance among the high dimensional acoustic models of respective groups using Equation (1) above. Then, it goes to Step S110.

In Step S110, the data process unit 1 makes the pattern model converting section 1f convert the high dimensional acoustic models into acoustic-model-compatible low dimensional vectors using Sammon's method based on the mathematical distance among the high dimensional acoustic models. Then, it goes to Step S112.

In Step S112, the data process unit 1 makes the data control section 1d judge whether the pattern model converting section if has finished the conversion process. If it is found that the conversion process has been finished (Yes), the data process unit 1 goes to Step S114. Otherwise (No), it goes to Step S110 to continue the conversion process.

In Step S114, the data process unit 1 makes the pattern model display section 1g display the plurality of acoustic-model-compatible low dimensional vectors in a low dimensional space. Then, it goes to Step S116.

In Step S116, the data process unit 1 makes the region dividing section 1h divide a region existing in the low dimensional space and containing the acoustic-model-compatible low dimensional vectors into a plurality of segment regions, and then it finishes processing.

Figure 11:
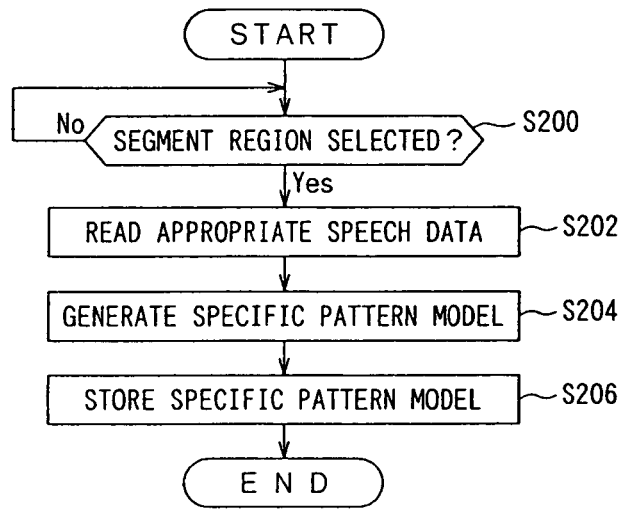
FIG. 11 is a flowchart showing processes performed by the data process unit 1 to generate a specific pattern model.

Now, flow of processes performed by the data process unit 1 to generate a specific pattern model will be described with reference to FIG. 11. FIG. 11 is a flowchart showing the processes performed by the data process unit 1 to generate a specific pattern model. Incidentally, although in the flowchart shown in FIG. 11, the data handled are speech data and the specific pattern model generated is a specific acoustic model in accordance with the embodiment, this is not restrictive, and various data and pattern models may be used according to application.

As shown in FIG. 11, first in Step S200, the data process unit 1 makes the data control section 1d judge whether the region selecting section 1j has selected a segment region. If it is found that a segment region has been selected (Yes), the data process unit 1 goes to Step S202. Otherwise (No), it waits until a segment region is selected.

In Step S202, the data process unit 1 makes the specific pattern model generating section 1k read the speech data related to the high dimensional acoustic models corresponding to the acoustic-model-compatible low dimensional vectors located in the segment region selected by the region selecting section 1j out of the data storing section 1b via the data control section 1d. Then, it goes to Step S204.

In Step S204, the data process unit 1 makes the specific pattern model generating section 1k generate a specific acoustic model from the speech data read out above. Then, it goes to Step S206.

In Step S206, the data process unit 1 makes the specific pattern model generating section 1k store the generated specific acoustic model in the data storing section 1b via the data control section 1d, and then it finishes processing.

Figure 12:
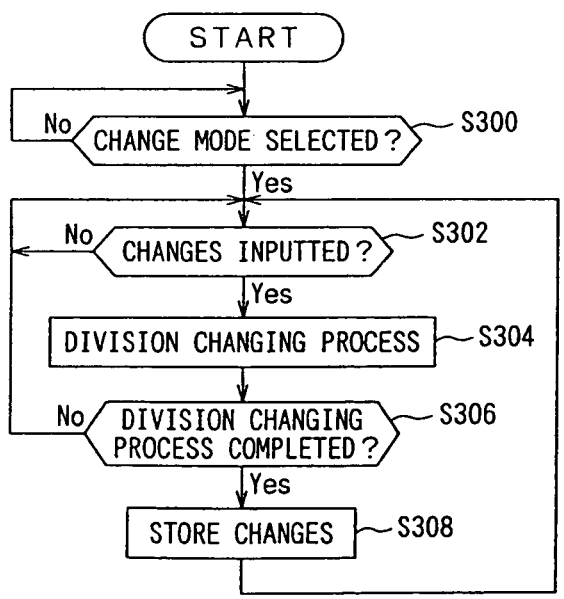
FIG. 12 is a flowchart showing processes performed by the data process unit 1 to change results of divisions.

Now, flow of processes performed by the data process unit 1 to change results of divisions will be described with reference to FIG. 12. FIG. 12 is a flowchart showing the processes performed by the data process unit 1 to change results of divisions.

As shown in FIG. 12, first in Step S300, the division changing section 1i judges whether change mode has been selected. If it is found that the change mode has been selected (Yes), the division changing section 1i goes to Step S302. Otherwise (No), it waits until the change mode is selected. According to this embodiment, selecting the change mode enables a results of division change process.

In Step S302, the division changing section 1i judges whether changes have been inputted. If it is found that changes have been inputted (Yes), the division changing section 1i goes to Step S304. Otherwise (No), it waits until changes are inputted.

In Step S304, the division changing section 1i changes results of divisions according to the inputted changes. Then, it goes to Step S306.

In Step S306, the division changing section 1i judges whether the change process has been finished according to an input from an input device. If it is found that the change process has been finished (Yes), the division changing section 1i goes to Step S308. Otherwise (No), it goes to Step S302.

In Step S308, the division changing section 1i stores information about the changed results of divisions in the data storing section 1b via the data control section 1d. Then, it goes to Step S302. According to this embodiment, if a command to finish the change mode is received from an input device, the data process unit 1 finishes the change mode itself.

Thus, the data classification section 1a can classify predetermined data on a plurality of objects (speech data of a plurality of speakers) into groups according to the specific conditions.

The pattern model generating section 1c can generate pattern models (high dimensional acoustic models, according to the above embodiment) for each group from the grouped predetermined data (speech data, according to the above embodiment).

The mathematical distance calculating section 1e can calculate mathematical distance among a plurality of pattern models (high dimensional acoustic models, according to the above embodiment).

The pattern model converting section 1f can convert a plurality of pattern models (high-dimensional acoustic models, according to the above embodiment) into the same number of low dimensional vectors corresponding to pattern models (acoustic-model-compatible low dimensional vectors, according to the above embodiment) based on the plurality of pattern models (high dimensional acoustic models, according to the above embodiment) and the mathematical distance among the pattern models (high dimensional acoustic models, according to the above embodiment).

The pattern model display section 1g can display a plurality of low dimensional vectors corresponding to pattern models (acoustic-model-compatible low dimensional vectors, according to the above embodiment) as coordinate points in a low dimensional space (two-dimensional space, according to the above embodiment) of the same dimension as the low dimensional vectors corresponding to pattern models. A drawing created in this way will be referred to as an acoustic space map.

The region dividing section 1h can automatically divide a region existing in the low dimensional space and containing coordinate points in such a way as to divide the ring-shaped regions containing the low dimensional vectors corresponding to pattern models (acoustic-model-compatible low dimensional vectors, according to the above embodiment) more finely with increasing radial distance from the innermost circle.

The division changing section 1i can change the results of divisions produced automatically by the region dividing section 1h, based on input information.

The region selecting section 1j can select a segment region from displayed segment regions based on input information.

The specific pattern model generating section 1k can generate a specific pattern model (specific acoustic model, according to the above embodiment) based on the data (speech data, according to the above embodiment) related to the pattern models (high dimensional acoustic models, according to the above embodiment) corresponding to the plurality of low dimensional vectors corresponding to pattern models (acoustic-model-compatible low dimensional vectors, according to the above embodiment) located in the region selected by the region selecting section Ij.

First Example

Figure 13:
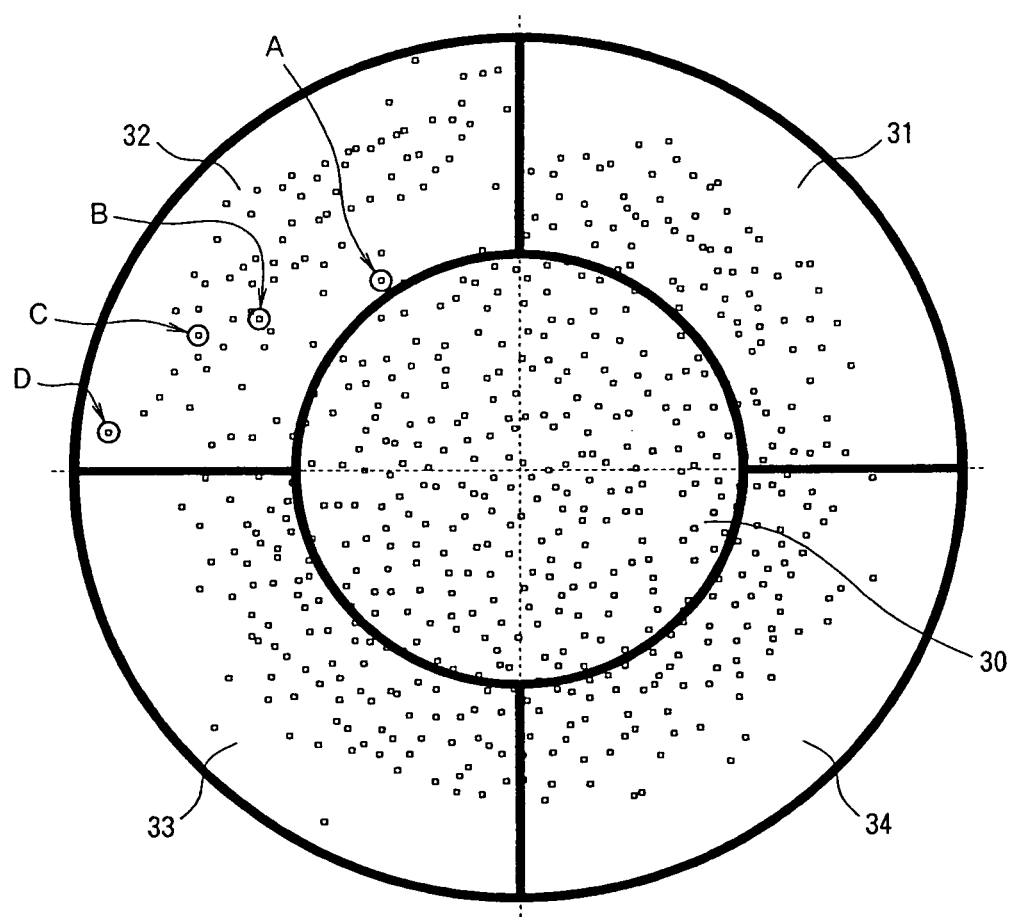
FIG. 13 is a diagram showing a display of acoustic-model-compatible low dimensional vectors according to an example.

Now, an example of how the data process unit 1 generated specific acoustic models will be described with reference to drawings. FIGS. 13 and 14 are diagrams showing this example. FIG. 13 is a diagram showing a display of acoustic-model-compatible low dimensional vectors according to this example while FIG. 14 is a diagram showing recognition rates of specific acoustic models generated for different segment regions and acoustic models generated for a whole region.

According to this example, a plurality of speakers were presented with five speech styles—"normally (in the usual tone of the target speaker)," "rapidly," "in a loud voice," "distinctly (pronounce each kana distinctly)," and "in a small voice"—and asked to utter the same Japanese words. Since the speakers were not forced to utter sounds faithfully according to the presented speech styles, the actual speech styles did not necessarily agree with the presented speech styles. Under such circumstances, there is no guarantee that maximum performance can be achieved if acoustic models are created only according to the presented speech styles based on the assumption that anticipatory information such as the presented speech styles are absolutely correct. Thus, description will be given below of an example in which the present invention was carried out in such a way as to achieve maximum performance.

First, a plurality of speakers were presented with five speech styles—"normally," "rapidly," "in a loud voice," "distinctly," and "in a small voice"—and asked to utter the same Japanese words. The resulting speech data were stored in the data storing section 1b.

The data classification section 1a classified the speech data into groups using combinations of a presented speech style and a speaker (name, etc.) as combinations of specific conditions. Then, the pattern model generating section 1c generated a HMM-based high-dimensional acoustic model for each group, and thereby obtained a large number of high dimensional acoustic models.

According to this embodiment, the phonetic unit used was the biphone, the number of HMM states was three, and each state had one normal distribution.

Then, the mathematical distance calculating section 1e calculated mathematical distance among the high dimensional acoustic models using Equation (1) above. Euclidean distance determined based on a mean vector of normal distributions of the pattern models normalized by the standard deviation of the normal distributions of the pattern models was used as the mathematical distance among the normal distributions. The occurrence frequency w(k) of the biphones in the words were also used in the calculation process based on Equation (1) above.

Then, the pattern model converting section 1f converted the high dimensional acoustic models into acoustic-model-compatible low dimensional vectors using Sammon's method based on the mathematical distance. The pattern model display section 1g displayed the results as coordinate points in the two-dimensional space as shown in FIG. 13. These points represents distance relationship among the high dimensional acoustic models which have the combination of the speakers and speech styles.

Then, as shown in FIG. 13, the region dividing section 1h divided a region existing in the two-dimensional space and containing the coordinate points into five segment regions—the first to fifth segment regions 30 to 34—as is the case with the above embodiment.

In this example, four specific acoustic models A to D were generated corresponding to the respective specific conditions of acoustic-model-compatible low dimensional vectors in FIG. 13. Since A to D existed in the third segment region 32, the region selecting section 1j selected the third segment region 32.

Once the third segment region 32 was selected, the specific pattern model generating section 1k generated one regional acoustic model from the speech data related to the high dimensional acoustic models corresponding to the respective acoustic-model-compatible low dimensional vectors located in the third segment region 32.

For purposes of comparison, a regional acoustic model each was generated for the first, second, fourth, and fifth segment regions 30, 31, 33, and 34 using the speech data related to the high dimensional acoustic models corresponding to the respective acoustic-model-compatible low dimensional vectors located in each of the segment regions.

Then, for purposes of comparison with conventional acoustic models, a regional acoustic model was generated from the speech data related to the high-dimensional acoustic models corresponding to all the acoustic-model-compatible low dimensional vectors located in the whole region.

Then, speech recognition rates of the four specific acoustic models A to D with respect to all the speech data were measured using the six regional acoustic models and the results are shown in FIG. 14. Vocabulary size was 176 words.

The following can be seen from the measurement results shown in FIG. 14.

(1) Under all the four specific conditions (A, B, C, and D), the regional acoustic model belonging to the third segment region 32 gives the highest recognition rates. The next highest recognition rates are provided by the regional acoustic model of the whole region.

(2) With the regional acoustic model of the whole region, when the recognition rates of all the speech data are compared among the four specific acoustic models A to D, it can be seen that the recognition rate has a linear relationship with the Euclidean distance (of points A to D) from the center point in FIG. 13. That is, the more distant from the center point, the lower the recognition rate.

Based on the above example, the effect of the present invention is summarized as follows.

(1) By dividing a region containing coordinate points into segment regions and creating a regional acoustic model for each segment region, it is possible to give a higher recognition rate than the acoustic model created based on all the speech data over the whole region.

(2) The use of distance from the center point makes it possible to predict the recognition rate under each specific condition. Acoustic-model-compatible low dimensional vectors distant from the center give low recognition rates under each specific condition. Conversely, acoustic-model-compatible low dimensional vectors closer to the center give higher recognition rates under each specific condition.

Second Example

Figure 16:
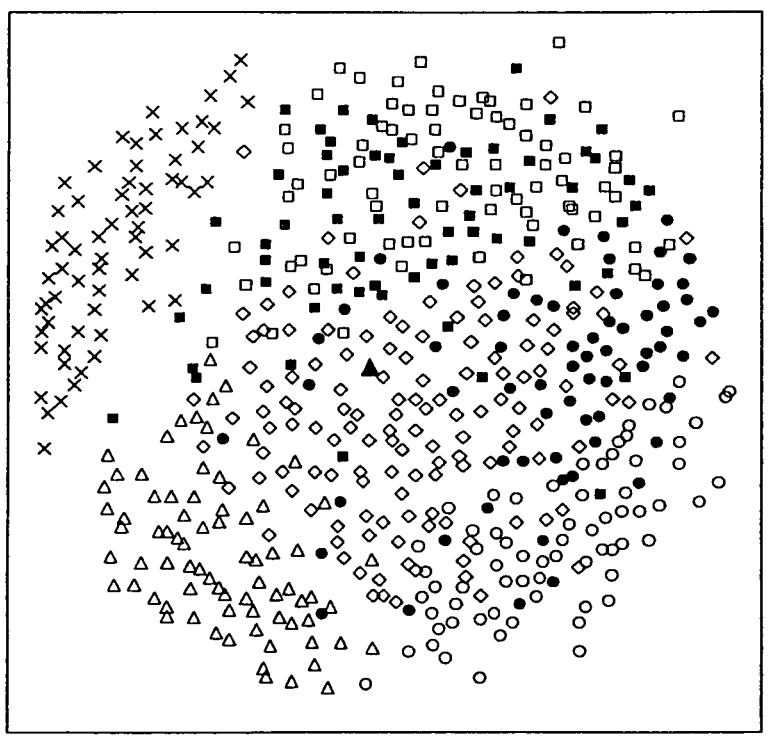
FIG. 16 is a diagram showing an example in which acoustic models created for different combinations of speech styles shown in FIG. 15 are projected two-dimensionally.

Now, with reference to FIGS. 15 and 16, description will be given of an example in which an acoustic model created for each combination of speech styles was projected two-dimensionally according to the present invention. FIG. 15 is a diagram showing speech styles while FIG. 16 is a diagram showing an example in which an acoustic model created for each combination of speech styles in FIG. 15 is projected two-dimensionally.

In this example, some of speech styles shown in FIG. 15 were specified and 145 male speakers were asked to utter lists of 176 words out of 5240 words.

Seven speech styles shown in FIG. 15 were used when recording speech data, including normally (read the word list at a usual speed), rapidly (read the word list faster than usual), in a high voice (read the word list in a higher than normal voice), in a small voice (read the word list in such a way as not to be heard even by people nearby), in a loud voice (read the word list loudly so that it can be heard even by people far way), Lombard (read the word list while hearing car noise), and distinctly (read the word list by pronouncing each kana distinctly). The instructions in the parentheses above were given to the speakers before recording.

First, an acoustic model of unspecified male speakers was created using all the recorded data. Then, using this model as an initial model, an acoustic model was created for each combination of a speaker and the speech style specified before recording (hereinafter such a model will be referred to as a speaker-speech style acoustic model) through connection learning. The speaker-speech style acoustic models thus created were projected two-dimensionally using Sammon's method and coordinate points were displayed as shown in FIG. 16. The occurrence frequency of phonetic units in 5240 words were used as w(k) in Equation (1) above. The symbol "▲" near the center represents the coordinate point of the acoustic model of unspecified male speakers used as the initial model.

The following can be seen from FIG. 16.

1) Even if the same speech style is specified, the actual speech style varies with the speaker. This points out the disadvantage of creating an acoustic model of unspecified speakers for each speech style by accepting predetermined speech styles without question.

2) Speech styles opposite in speaking rate and voice volume (e.g., distinctly vs. rapidly, in an undertone vs. in a loud voice/Lombard) are located symmetrically around the origin.

It was found that when the coordinate points shown in FIG. 16 were divided into concentric regions by the region dividing section 1*h* and acoustic models were rebuilt for respective segment regions by the specific pattern model generating section 1*k*, performance was improved significantly with respect to speakers located on the periphery compared to the acoustic model of unspecified speakers created from the data of the whole region.

Incidentally, although human voice has been cited in the first embodiment and first and second examples above, it is not that the present invention is applicable only to human voice. The present invention can solve similar problems and offer similar effect when it is applied to data other than human voice.

The data other than human voice include, for example, audio data such as household noise, plant noise, traffic noise, and the like; animal sound data of wildlife such as wild birds, insects, frogs, bats, and other animals; image data; infrared sensor data, acceleration sensor data, azimuth sensor data, pressure sensor data, vibration sensor data from piezoelectric elements or vibration meters, and any other sensor data; physical data on charge status of batteries such as lithium-ion secondary batteries or fuel batteries; biomedical signals such as electrocardiograms, electromyograms, blood pressure, and weight; microarray data for gene analysis; meteorological data such as temperature, humidity, and atmospheric pressure; environmental data such as oxygen concentration and nitrogen oxide concentration; economic trend data, such as stock prices and commodity prices, and other time series data; and the like.

Third Example

Now, with reference to FIG. 17, description will be given of an example in which acoustic models were created using data on daily life noise, cries of wild birds, and human voice and were projected two-dimensionally using the data process unit 1. FIG. 17 is a diagram showing an example in which pattern models created using data on daily life noise, cries of wild birds, and human voice are projected two-dimensionally.

In this example, HMM-based pattern models were created from spectrum data of 33 types of household noise including sounds of slippers, sounds of storm doors, and sounds of a pen dropped on a wooden floor; cries of 40 wild birds including, crows, bulbuls, and turtledoves; 25 Japanese phonemes (5 vowels, 2 semivowels, and 18 consonants) uttered by the Japanese. The generated pattern models were converted into low dimensional vectors corresponding to pattern models in two dimension by the pattern model converting section 1*f* and the resulting vectors were displayed as coordinate points in a two-dimensional space shown in FIG. 17.

In FIG. 17, the pattern models of daily life noise, pattern models of cries of wild birds, pattern models of Japanese phonemes uttered by Japanese men, pattern models of Japanese phonemes uttered by Japanese women are indicated by ▲, x, ■, and □, respectively.

It can be seen from the displayed results that the daily life noise, cries of wild birds, and human voice are roughly divided into three regions, and thus it will be easy to distinguish among daily life noise, cries of wild birds, and human voice.

Thus, when determining whether various sounds such as audio data, cries of wild animals, and human voice can be identified, it is very useful to display pattern models in a low dimensional space (two-dimensional space, in this case) as is the case with the present invention.

Fourth Example

Now, with reference to FIG. 18, description will be given of an example in which pattern models were created using image data of human lips and were projected two-dimensionally using the data process unit 1. FIG. 18 is a diagram showing an example in which pattern models created using image data of human lips are projected two-dimensionally.

In this example, moving-image data of lips extracted from face images of nine males were classified into four still image groups according to opening and closing of the lips resulting from speech utterances: closed state, transitional state from closed to open, open state, and transitional state from open to closed. HMM-based pattern models were created using two-dimensional cepstrum and differences as feature vectors. Then, the generated pattern models were converted into low dimensional vectors corresponding to pattern models by the pattern model converting section 1f and the resulting vectors were displayed as coordinate points in a two-dimensional space shown in FIG. 18.

In FIG. 18, nine pattern models in closed state, nine pattern models in transitional state from closed to open, nine pattern models in open state, and nine pattern models in transitional state from open to closed are indicated by ■, ▲, □, and Δ, respectively.

It can be seen from the displayed results that the four still image groups in closed state, in transitional state from closed to open, in open state, and in transitional state from open to closed are clustered being separated from each other clearly, and thus it will be easy to distinguish among the four states of the lips.

Thus, when determining whether images which represent various states such as open and closed states of lip images can be identified, it is very useful to display pattern models in a low dimensional space (two-dimensional space, in this case) as is the case with the present invention.

Fifth Example

Now, with reference to FIG. 19, description will be given of an example in which pattern models were created using infrared sensor data and were projected two-dimensionally. FIG. 19 is a diagram showing an example in which pattern models created using output data of an infrared sensor are projected two-dimensionally.

In this example, a person walked 3144 times and a dog walked 632 times just under an analog output infrared sensor (pyroelectric sensor, in this example) installed on a 2.4-m high ceiling, output data of the infrared sensor were subjected to FFT (Fast Fourie Transform), and HMM-based pattern models were created based on the FFT results. Then, the generated pattern models were converted into low dimensional vectors corresponding to pattern models by the pattern model converting section 1f and the resulting vectors were displayed as coordinate points in a two-dimensional space shown in FIG. 19.

In FIG. 19, the pattern models of the person and pattern models of the dog are indicated by x and ▲, respectively.

It can be seen from the displayed results that the dog and person form different clusters, and thus it is easy to distinguish between the person and dog with an infrared sensor.

Thus, when determining whether objects can be identified using output data on conditions of objects (e.g., working conditions, etc.) from an infrared sensor, such as output data on behavior of a person and dog from an infrared sensor, it is very useful to display pattern models in a low dimensional space (two-dimensional space, in this case) as is the case with the present invention.

Sixth Example

Now, with reference to FIG. 20, description will be given of an example in which pattern models were created using output data of an acceleration sensor and were projected two-dimensionally. FIG. 20 is a diagram showing an example in which pattern models created using output data of an acceleration sensor are projected two-dimensionally.

In this example, one male subject was asked to go down the stairs, group the stairs, and walk straight along a corridor with an acceleration sensor in his trouser pocket, time series data of three axes (X-axis, Y-axis, and Z-axis) of the acceleration sensor were subjected to FFT, and HMM-based pattern models were created based on the FFT results. The numbers of pattern models generated were 29, 28, and 24, respectively, when the male subject went down the stairs, went up the stairs, and walked straight along the corridor. Then, the generated pattern models were converted into low dimensional vectors corresponding to pattern models by the pattern model converting section 1f and the resulting vectors were displayed as coordinate points in a two-dimensional space shown in FIG. 20.

In FIG. 20, the pattern models created with the male subject going down the stairs, the pattern models created with the male subject going up the stairs, and the pattern models created with the male subject walking straight along the corridor are indicated by ■, ▲, and x respectively.

As can be seen from the displayed results, most of the pattern models created with the male subject going down the stairs are clustered in the area enclosed by an ellipse at the top of the display area of coordinate points, but some of them are seen scattered in the area enclosed by an ellipse at the bottom of the display area. This indicates that the male subject going down the stairs reached a landing, causing changes in the acceleration pattern of the three axes and resulting in walking conditions close to straight walking.

Thus, when determining whether behavior of an object can be identified using output data on behavior of a person from an acceleration sensor, such as output data on a walking pattern of a person from an acceleration sensor, it is very useful to display pattern models in a low dimensional space (two-dimensional space, in this case) as is the case with the present invention.

In FIG. 1, the data classification section 1a corresponds to the data classification means; the pattern model generating section 1c corresponds to the pattern model generating means; the mathematical distance calculating section 1e corresponds to the mathematical distance calculating means; the pattern model converting section 1f corresponds to the pattern model converting means; the pattern model display section 1g corresponds to the low dimensional vector corresponding to pattern model display means; the region dividing section 1h corresponds to the region dividing means; the division changing section 1i corresponds to the division changing means; the region selecting section 1j corresponds to the region selecting means; and the specific pattern model generating section 1k corresponds to the regional pattern model generating means.

Incidentally, although it has been stated in the first embodiment described above that the acoustic-model-compatible low dimensional vectors produced by the pattern model converting section 1f are two-dimensional, this is not restrictive and one-dimensional or three-dimensional vectors may also be used.

Also, although in the above embodiment, the region dividing section 1h divides regions in such a way that there will be no overlap between acoustic-model-compatible low dimensional vectors in different segment regions, this is not restrictive and acoustic-model-compatible low dimensional vectors may overlap among different segment regions.

Furthermore, in the first embodiment above, it goes without saying that by converting only the high dimensional acoustic models corresponding to acoustic-model-compatible low dimensional vectors into new acoustic-model-compatible low dimensional vectors by the application of the present invention, displaying them again in a new low dimensional space, and generating regional acoustic models with smaller segment regions, it is possible to achieve higher recognition performance.

Second Embodiment

Furthermore, a second embodiment of the present invention will be described with reference to drawings. FIGS. 21 to 39 are diagrams showing a data process unit according to the second embodiment of the present invention.

Figure 21:
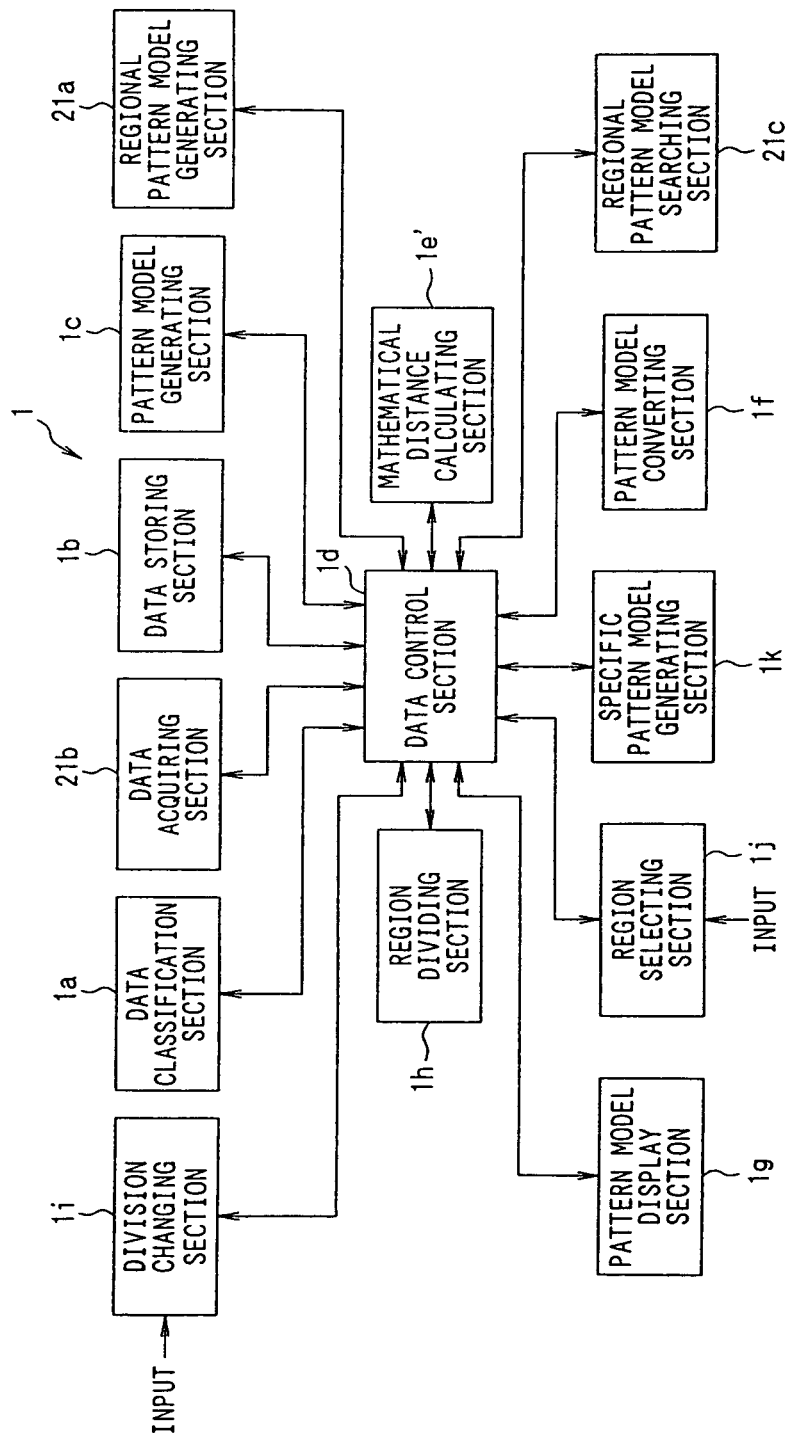
FIG. 21 is a block diagram showing a configuration of a data process unit 21 according to the present invention.

First, a configuration of a data process unit according to the present invention will be described with reference to FIG. 21. FIG. 21 is a block diagram showing a configuration of a data process unit 21 according to the present invention. Incidentally, functional components similar to those of the data process unit 1 in the first embodiment will be denoted by the same reference numerals as those in the first embodiment and description of the same functions as those of the data process unit 1 will be omitted.

The data process unit 21 comprises a data classification section 1a, data storing section 1b, pattern model generating section 1c, data control section 1d, mathematical distance calculating section 1e', pattern model converting section 1f, pattern model display section 1g, region dividing section 1h, division changing section 1i, region selecting section 1j, specific pattern model generating section 1k, regional pattern model generating section 21a, data acquiring section 21b, and regional pattern model searching section 21c.

The mathematical distance calculating section 1e' calculates mathematical distance among the pattern models generated by the pattern model generating section 1c. According to this embodiment, it calculates the mathematical distance among high dimensional acoustic models. It differs from the mathematical distance calculating section 1e according to the first embodiment in that the occurrence frequency w(k) of the phonetic unit k in Equation (1) used in the calculation of the mathematical distance is the occurrence frequency of the phonetic units whose recognition performance in relation to the pattern models generated by the pattern model generating section 1c is lower than a predetermined threshold. According to the first embodiment, a simple occurrence frequency (e.g., the occurrence frequency of a phoneme "a" in speech data) is used as w(k).

The regional pattern model generating section 21a has a function to generate regional pattern models, which are pattern models of respective segment regions, based on data related to generation of pattern models corresponding to low dimensional vectors corresponding to the pattern models of segment regions produced automatically by the region dividing section 1h. According to this embodiment, it generates regional acoustic models, which are high dimensional acoustic models of respective segment regions, based on data related to generation of high dimensional acoustic models corresponding to acoustic-model-compatible low dimensional vectors of segment regions produced automatically by the region dividing section 1h.

The data acquiring section 21b has a function to acquire predetermined data on objects for which pattern models will be generated. This makes it possible to acquire predetermined data on a new object (unknown object). According to this embodiment, the data acquiring section 21b comprises means such as a microphone for acquiring speech (analog data) uttered by the speaker and means such as an A/D converter for converting the analog data (speech) into digital data.

The regional pattern model searching section 21c has a function to calculate likelihood of regional pattern models for respective segment regions in relation to the predetermined data on the new object acquired by the data acquiring section 21b and search for a regional pattern model with recognition performance suitable for recognizing the predetermined data on the new object based on the calculated likelihood. According to this embodiment, it calculates likelihood of regional acoustic models corresponding to respective segment regions in relation to the speech data of a new speaker acquired by the data acquiring section 21b and searches for a regional acoustic model with recognition performance suitable for recognizing the predetermined data on the new speaker based on the calculated likelihood.

Now, concrete operation of the data process unit 21 will be described with reference to FIGS. 22 to 26.

Figure 25:
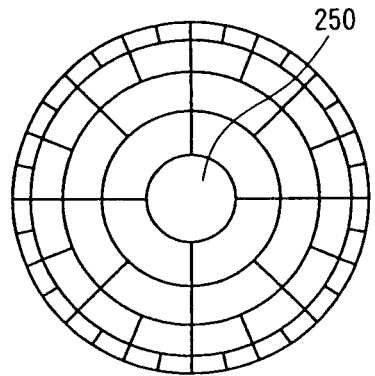
FIG. 25 is a diagram showing a first search method for a regional pattern model.
Figure 25:
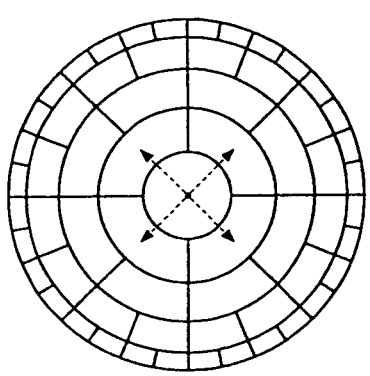
Figure 25:
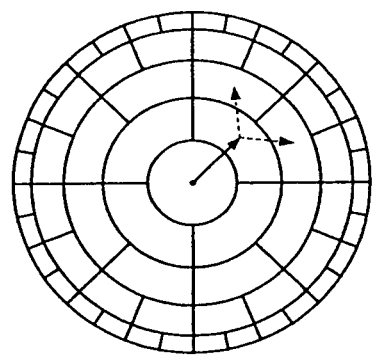
Figure 25:
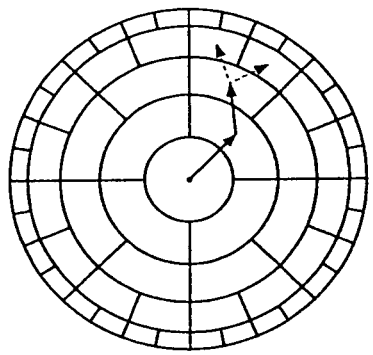
Figure 25:
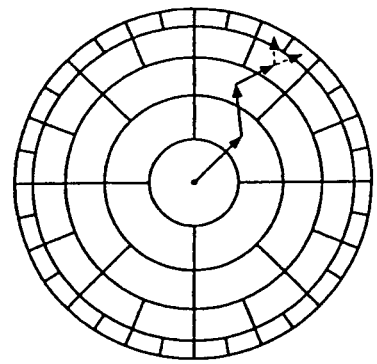
Figure 25:
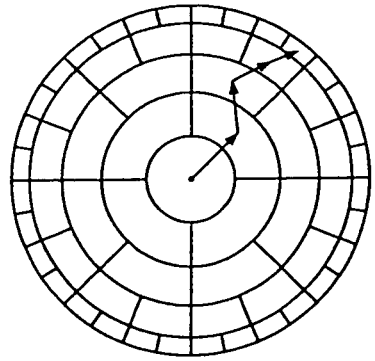
Figure 26:
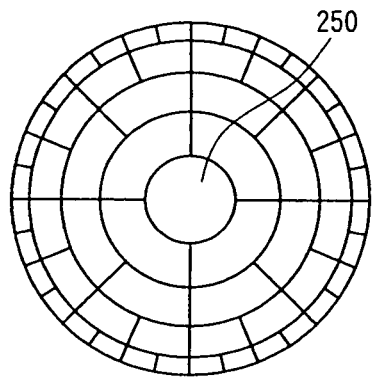
FIG. 26 is a diagram showing a second search method for a regional pattern model.
Figure 26:
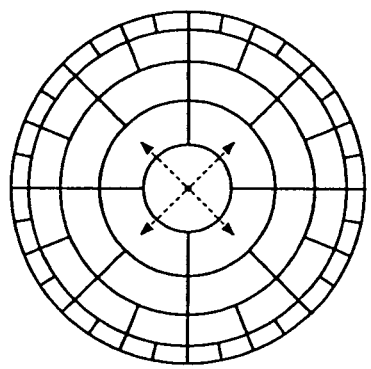
Figure 26:
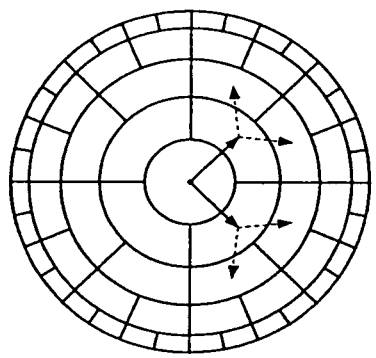
Figure 26:
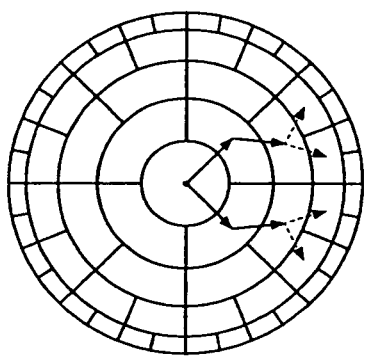
Figure 26:
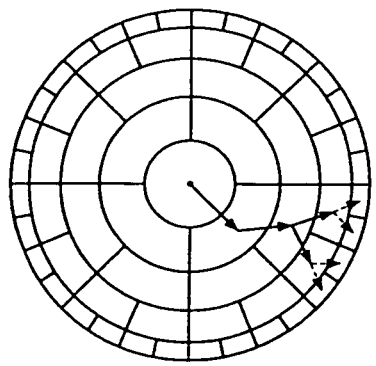
Figure 26:
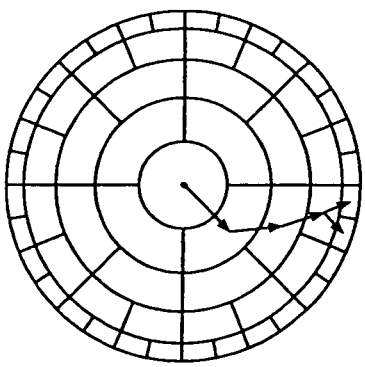

FIG. 22 is a diagram showing difference between the data process unit 1 and data process unit 21 in the method of regional division. FIG. 23 is a diagram showing distribution of speakers marked by a high recognition rate and speakers marked by a low recognition rate in the case where a high dimensional acoustic model is displayed in two-dimensional coordinates. FIG. 24 is a diagram showing structures of different segment regions. FIG. 25 is a diagram showing a first search method for a regional pattern model while FIG. 26 is a diagram showing a second search method for a regional pattern model.

First, the data classification section 1a classifies the speech data of a plurality of speakers stored in the data storing section 1b into groups according to four specific conditions: the type of speaker, speech lexicons, speech styles, and speech environment. Groups are organized according to combinations of all four specific conditions: for example, a group is identified by the name of a speaker, words, rapid speech, and indoor environment, another group is identified by the name of a speaker, words, loud speech, and indoor environment, still another group is identified by the name of a speaker, words, rapid speech, and outdoor environment, and so on. Here information about the grouping is attached to the speech data.

Next, the pattern model generating section 1c generates a high dimensional acoustic model for each group of speech data as described above. The acoustic models are generated using a known technology such as HMMs. The high dimensional acoustic models generated are stored in the data storing section 1b, being associated with the corresponding speech data.

Then, the mathematical distance calculating section 1e calculates mathematical distance among the generated high dimensional acoustic models using, for example, Equation (1) above.

In Equation (1) above, the occurrence frequency of the phonetic units whose likelihood (recognition performance) is lower than a predetermined threshold is used as the occurrence frequency w(k) of the phonetic unit k by calculating the likelihood between the high dimensional acoustic models generated by the pattern model generating section 1c and the speech data of a plurality of speakers stored in the data storing section 1b.

Generally, acoustic distance between speakers varies with the phoneme. There is no problem if distance is determined on a phoneme-by-phoneme basis, but when defining distance between speakers by taking all phonemes into consideration, some type of weighting is necessary. It is important to employ weights which contribute to recognition performance. The occurrence frequency of phonetic units (phonemes, etc.) is used as weights in the first embodiment. This is because phonetic units with a high occurrence frequency are assumed to be important for recognition, and thus a phoneme with an occurrence frequency of "0," for example, is not necessary for recognition and is considered to be unnecessary for distance calculation either.

This embodiment uses the occurrence frequency of phonetic units whose recognition performance is lower than a predetermined threshold. This is because even phonetic units with a high occurrence frequency do not need special consideration and are considered to be unnecessary for distance calculation if they are recognized with a high probability when spoken by any speaker as well as because this embodiment is intended to perform clustering with emphasis on speakers marked by low recognition performance by employing phonetic units with low recognition performance in distance calculation and thereby taking into consideration both trends in misrecognition and acoustic characteristics.

Regarding the phonetic units used to calculate the mathematical distance, all phonetic units, a set of acoustically similar phonetic units, or a particular phonetic unit may be selected according to purpose.

Then, the pattern model converting section 1$f$ converts the plurality of high dimensional acoustic models into the same number of acoustic-model-compatible low dimensional vectors using the calculated mathematical distance. It converts all the high dimensional acoustic models into the acoustic-model-compatible low dimensional vectors (two-dimensional or three-dimensional) while maintaining distance relationship among them so that two high dimensional acoustic models with a small mathematical distance between them will be placed close to each other and that two high dimensional acoustic models with a large mathematical distance between them will be placed away from each other. According to this embodiment, it is assumed that the pattern model converting section 1$f$ converts the high dimensional acoustic models into acoustic-model-compatible low-dimensional vectors in two dimension. As in the case of the first embodiment, Sammon's method known to those skilled in the art is available as a conversion method for converting high dimensional acoustic models into acoustic-model-compatible two-dimensional vectors while maintaining the distance relationship.

That is, as in the case of the first embodiment, the pattern model converting section 1$f$ converts the high dimensional acoustic models into acoustic-model-compatible low-dimensional vectors in two dimension using Sammon's method. Thus, the conversion process here involves projecting the plurality of high dimensional acoustic models to the low dimensional space by assigning coordinates in the low dimensional space to the high dimensional acoustic models.

As in the case of the first embodiment, if acoustic-model-compatible low dimensional vectors are close to each other in mathematical distance (e.g., Euclidean distance) in the low dimensional space of the same dimension as the acoustic-model-compatible low dimensional vectors, the corresponding high dimensional acoustic models are presumed to be similar to each other as is the case with their specific conditions. Also, closer to the center the high dimensional acoustic models are located, the more typical the corresponding specific conditions are presumed to be.

According to this embodiment, the coordinate information constitutes values of elements of the acoustic-model-compatible low dimensional vectors. The coordinate information attached is stored in the data storing section 1$b$, being associated with the corresponding acoustic-model-compatible low dimensional vectors.

Then, based on the values of the elements of the plurality of acoustic-model-compatible low dimensional vectors (coordinate information), the pattern model display section 1$g$ displays the plurality of acoustic-model-compatible low dimensional vectors as coordinate points in a two-dimensional space with its center (origin) at the center of gravity as shown in FIG. 2.

Figure 22A:
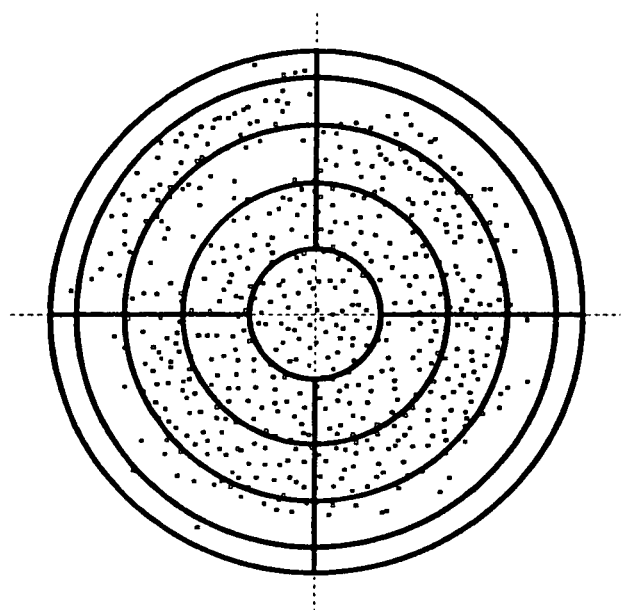
FIG. 22 is a diagram showing difference between the data process unit 1 and data process unit 21 in the method of regional division.
Figure 22B:
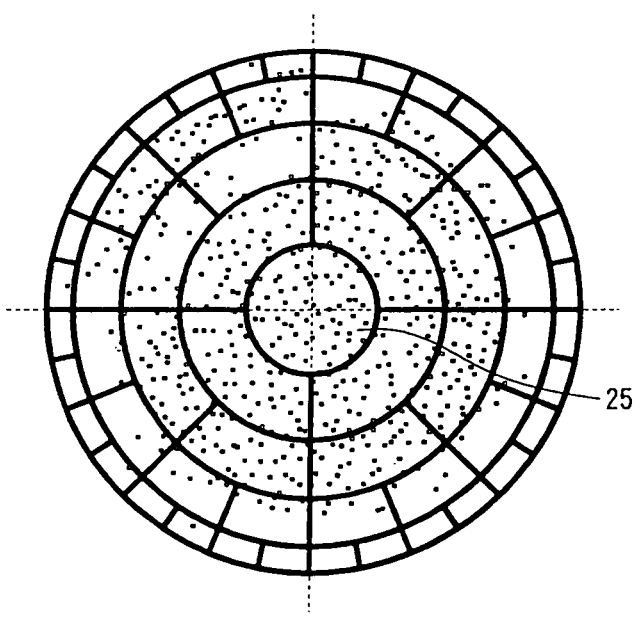

Then, the region dividing section 1$h$ divides a region existing in the two-dimensional space and containing the coordinate points into a plurality of segment regions. Unlike the method used by the data process unit 1 according to the first embodiment (see FIG. 22A), a region dividing method according to this embodiment divides ring-shaped regions formed by the outer and inner circles more finely with increasing radial distance from the innermost circle 220, as shown in FIG. 22B. That is, in a so-called polar coordinate system in which a coordinate point P(x,y) in a two-dimensional space formed by a horizontal axis x and vertical axis y and having its origin O at the center of the innermost circle 220 is expressed using r representing the radius and θ representing an angle formed by the x-axis and P, the larger the radius r of a coordinate point contained in a region, the more finely the region is divided.

The benefits of dividing coordinate point distribution more finely with increasing distance from the center will be described with reference to FIG. 23. FIG. 23 shows results of speech recognition performed with respect to a plurality of speakers including evaluation speakers using speaker independent acoustic models created from all speech data acquired from the plurality of speakers. In a high-dimensional acoustic model displayed two-dimensionally, coordinate points of speakers marked by a recognition performance of 80% or lower are represented by "x" and coordinate points of other speakers are represented by "○".

As shown in FIG. 23, speakers marked by low recognition performance (represented by "x" in FIG. 23) become increasingly noticeable near the edge of the coordinate point distribution. Thus, to improve the recognition performance of the acoustic models with respect to speakers located on the periphery, it is necessary to create more accurate (specialized) acoustic models. Specifically, it is possible to reduce variations in the characteristics of the acoustic models among different segment regions by dividing regions more finely with decreasing distance to the periphery where speakers marked by low recognition performance are located and it is possible to improve recognition performance by creating speaker independent acoustic models from the speech data contained in the segment regions.

The region dividing section 1$h$ divides regions in such a way that each segment region will partially overlap adjacent segment regions as indicated by dotted lines in FIG. 24 rather than original dividing lines of segment regions. This makes it possible to deal with coordinate points located at boundaries of segment regions, which otherwise would cause a problem when creating regional acoustic models.

Once the region is divided as described above, the pattern model display section 1$g$ displays coordinate points in the results of divisions produced by the region dividing section 1$h$ as shown in FIG. 22B. Consequently, the plurality of acoustic-model-compatible low dimensional vectors in the region are grouped into acoustic-model-compatible low dimensional vectors in different segment regions.

Then, the region selecting section 1$j$ selects a particular one of the segment regions based on input information from an input device such as a mouse or keyboard. Then, the specific pattern model generating section 1$k$ can generate a regional acoustic model based on the speech data used to generate the high dimensional acoustic models which correspond to the acoustic-model-compatible low dimensional vectors in the selected segment region. The regional acoustic model is generated using a known technology such as HMMs as is the case with the high dimensional acoustic models. The specific acoustic model generated is stored in the data storing section 1$b$.

Once the region selecting section 1$j$ selects a particular one of the segment regions, the pattern model converting section 1*f* can convert the plurality of high dimensional acoustic models corresponding to acoustic-model-compatible low dimensional vectors in the selected segment region again into acoustic-model-compatible low-dimensional vectors in two dimension using Sammon's method. As a conversion is performed again in this way, the distribution of coordinate points is changed, and if the distribution is divided again by the region dividing section 1*h*, it is possible to generate more specialized speaker independent acoustic models.

Incidentally, the user of this data process unit is free to select either the process of generating regional acoustic model of a selected segment region or the process of converting high dimensional acoustic models again into acoustic-model-compatible low dimensional vectors.

Besides, according to this embodiment, the division changing section 1*i* can change the results of divisions produced automatically by the region dividing section 1*h*. Possible changes involve, for example, rotating all the dividing lines while maintaining the results of divisions produced by the region dividing section 1*h*, adding an inner circle 35, forming new segment regions 30*a* to 30*d*, or changing the number of results of divisions based on input information from an input device such as a mouse or keyboard as in the case of the first embodiment above.

Now, with reference to FIGS. 25 and 26, description will be given of processes performed by the regional pattern model generating section 21*a*, data acquiring section 21*b*, and regional pattern model searching section 21*c* to search for a regional pattern model (regional acoustic model, according to this embodiment) suitable for recognizing the speech data on a new speaker (the same as an evaluation speaker).

According to this embodiment, mode setting in relation to whether to search for a regional pattern model can be left up to the user of the data process unit 21. If a mode of searching for a regional pattern model is enabled, after the region dividing process is performed by the region dividing section 1*h*, the regional pattern model generating section 21*a* generates a regional acoustic model of each segment region using the speech data corresponding to the acoustic-model-compatible low dimensional vectors contained in each region. Then, when speech data of a new speaker are acquired by the data acquiring section 21*b*, the regional pattern model searching section 21*c* searches for a regional acoustic model suitable for speech recognition of the speech data of the new speaker based on the acquired speech data and the regional acoustic model of each segment region. According to this embodiment, first and second search methods are available and it is up to the user of the data process unit 21 to select which one to use (it is also possible to use both methods at a time).

First, a search process by means of the first search method will be described with reference to FIG. 25. As shown in FIG. 25(1), the regional pattern model searching section 21*c* calculates the likelihood of match between a regional acoustic model corresponding to the region in the innermost circle 250 and the speech data of the new speaker and stores the calculated likelihood in a RAM by associating it with the regional acoustic model.

Then, as shown in FIG. 25(2), in relation to four segment regions in the ring-shaped region formed by the innermost circle 250 and the next outer circle, the regional pattern model searching section 21*c* calculates the likelihoods of matches between the regional acoustic models corresponding to the four segment regions and the speech data of the new speaker, compares the four calculated likelihoods, and stores the highest of the calculated likelihoods in a RAM by associating it with the regional acoustic model. Also, the regional pattern model searching section 21*c* determines the next search direction by selecting the segment regions adjacent to and outside of the segment region corresponding to the regional acoustic model.

Specifically, according to this embodiment, the regional acoustic model corresponding to the upper right one of the four fan-shaped segment regions in the ring-shaped region shown in FIG. 25(3) has the highest likelihood and the two segment regions adjacent to and outside of this segment region are selected to determine the next search direction. Then, the regional pattern model searching section 21*c* calculates the likelihoods of matches between the regional acoustic models corresponding to the two segment regions and the speech data of the new speaker. Then, as in the case of FIG. 25(2) above, the regional pattern model searching section 21*c* compares the two likelihoods, and stores the higher of the calculated likelihoods in the RAM by associating it with the regional acoustic model. Also, the regional pattern model searching section 21*c* determines the next search direction by selecting the segment regions adjacent to and outside of the segment region corresponding to the regional acoustic model.

Specifically, according to this embodiment, the regional acoustic model corresponding to the left one of the two fan-shaped segment regions shown in FIG. 25(4) has the higher likelihood and the two segment regions adjacent to and outside of this segment region are selected to determine the next search direction. Then, the regional pattern model searching section 21*c* calculates the likelihoods of matches between the regional acoustic models corresponding to the two segment regions and the speech data of the new speaker. Then, as in the case of FIG. 25(3) above, the regional pattern model searching section 21*c* compares the two likelihoods, and stores the higher of the calculated likelihoods in the RAM by associating it with the regional acoustic model. Also, the regional pattern model searching section 21*c* determines the next search direction by selecting the segment regions adjacent to and outside of the segment region corresponding to the regional acoustic model.

Specifically, according to this embodiment, as shown in FIG. 25(5), the regional acoustic model corresponding to the right one of the two fan-shaped segment regions selected in FIG. 25(4) to determine the search direction has the higher likelihood and the two segment regions adjacent to and outside of this segment region are selected to determine the next search direction. Then, the regional pattern model searching section 21*c* calculates the likelihoods of matches between the regional acoustic models corresponding to the two segment regions and the speech data of the new speaker. Then, the regional pattern model searching section 21*c* compares the two likelihoods, and stores the higher of the calculated likelihoods in the RAM by associating it with the regional acoustic model. According to this embodiment, the segment region shown in FIG. 25(6) has the higher likelihood. Also, since the search has reached the outermost ring-shaped region at this time, the search process is finished.

Finally, the regional pattern model searching section 21*c* compares the likelihoods stored in the RAM and selects the regional acoustic model with the highest likelihood as the acoustic model suitable for speech recognition of the speech data of the new speaker.

In this way, when calculating likelihoods going from the innermost circle to outer circles, the regional pattern model searching section 21*c* determines the next search direction by selecting the segment regions adjacent to the segment region with the highest likelihood, compares the calculated likelihoods of the segment regions with each other in each ring-shaped region, and stores the highest likelihood based on the results of comparison. This process is repeated until the outermost ring-shaped region is reached and finally, the regional acoustic model with the maximum likelihood is selected as the acoustic model suitable for the new speaker from among the stored likelihoods.

Incidentally, although the first search method calculates likelihoods in sequence until the outermost ring-shaped region is reached, then selects the highest likelihood from among the maximum likelihoods of the segment regions which have been searched, and thereby selects the regional acoustic model suitable for the new speaker, this is not restrictive. It is also possible to compare the likelihoods of given segment regions with the likelihoods of the next inner segment regions, continue searches in the outward direction as with the first search method if the likelihood of any of the given segment regions is larger than the maximum likelihood of the next inner segment regions, or stop the search and select the maximum likelihood of the next inner segment regions as the likelihood of the regional acoustic model suitable for the new speaker if any likelihood of the next inner segment regions is larger.

Next, a search process by means of the second search method will be described with reference to FIG. 26. As shown in FIG. 26(1), the regional pattern model searching section 21c calculates the likelihood of match between a regional acoustic model corresponding to the region in the innermost circle 250 and the speech data of the new speaker and stores the calculated likelihood in a RAM by associating it with the regional acoustic model. Then, as shown in FIG. 26(2), in relation to four segment regions in the ring-shaped region formed by the innermost circle 250 and the next outer circle, the regional pattern model searching section 21c calculates the likelihoods of matches between the regional acoustic models corresponding to the four segment regions and the speech data of the new speaker, compares the four calculated likelihoods, and stores the highest of the calculated likelihoods in a RAM by associating it with the regional acoustic model. Also, the regional pattern model searching section 21c determines the next search direction by selecting the segment regions adjacent to and outside of the segment region corresponding to the regional acoustic model.

Specifically, according to this embodiment, the regional acoustic models corresponding to the upper right and lower right two segment regions out of the four fan-shaped segment regions in the ring-shaped region shown in FIG. 26(3) have the highest and next highest likelihoods and the four segment regions adjacent to and outside of this segment region are selected to determine the next search directions. Then, the regional pattern model searching section 21c calculates the likelihoods of matches between the regional acoustic models corresponding to the four segment regions and the speech data of the new speaker. Then, as in the case of FIG. 26(2) above, the regional pattern model searching section 21c compares the four likelihoods, and stores the highest and next highest of the calculated likelihoods in the RAM by associating them with the respective regional acoustic models. Also, the regional pattern model searching section 21c determines the next search directions by selecting the segment regions adjacent to and outside of the segment regions corresponding to the regional acoustic models.

Specifically, according to this embodiment, the regional acoustic models corresponding to the right one of the upper right two fan-shaped segment regions and the left one of the lower right two segment regions shown in FIG. 26(4) have the highest and next highest likelihoods and the four segment regions adjacent to and outside of the two segment regions are selected to determine the next search directions. Then, the regional pattern model searching section 21c calculates the likelihoods of matches between the regional acoustic models corresponding to the four segment regions and the speech data of the new speaker. Then, as in the case of FIG. 26(3) above, the regional pattern model searching section 21c compares the four likelihoods, and stores the highest and next highest of the calculated likelihoods in the RAM by associating them with the respective regional acoustic models. Also, the regional pattern model searching section 21c determines the next search directions by selecting the segment regions adjacent to and outside of the segment regions corresponding to the regional acoustic models.

Specifically, according to this embodiment, as shown in FIG. 26(5), the two regional acoustic models corresponding to the lower one of the two fan-shaped regions containing the four segment regions selected in FIG. 26(4) to determine the search directions have the highest and next highest likelihoods and the four segment regions adjacent to and outside of the two segment regions are selected to determine the next search directions. Then, the regional pattern model searching section 21c calculates the likelihoods of matches between the regional acoustic models corresponding to the four segment regions and the speech data of the new speaker. Then, the regional pattern model searching section 21c compares the four likelihoods, and stores the highest and next highest of the calculated likelihoods in the RAM by associating them with the respective regional acoustic models. According to this embodiment, the segment regions shown in FIG. 26(6) have the highest and next highest likelihoods. Also, since the search has reached the outermost ring-shaped region at this time, the search process is finished.

Finally, the regional pattern model searching section 21c compares the likelihoods stored in the RAM and selects the regional acoustic model with the highest likelihood as the acoustic model suitable for speech recognition of the speech data of the new speaker.

In this way, when calculating likelihoods going from the innermost circle to outer circles, the regional pattern model searching section 21c determines the next search directions by selecting the segment regions adjacent to the segment regions with the highest or next highest likelihood, compares the calculated likelihoods of the segment regions with each other in each ring-shaped region, and stores the highest and next highest likelihoods based on the results of comparison. This process is repeated until the outermost ring-shaped region is reached and finally, the regional acoustic model with the maximum likelihood is selected as the acoustic model suitable for the new speaker from among the stored likelihoods.

Incidentally, although the second search method determines next search directions by selecting the segment regions adjacent to and outside of the segment regions corresponding to the top two likelihoods and stores the top two likelihoods per segment region, this is not restrictive. It is also possible to determine next search directions by selecting the segment regions adjacent to and outside of the segment regions corresponding to the top n (n is an integer smaller than the number of results of divisions of the given ring-shaped region) likelihoods and store the top n likelihoods per segment region.

Also, the acoustic models selected by the first and second search methods may be transmitted to an information processing terminal such as a cell phone or PDA of the new speaker via a cable or the like.

Also, although the searches for regional acoustic models according to the first and second search methods are carried out with respect to a search space projected two-dimensionally using as W(k), the occurrence frequency of phonetic units whose recognition performance is lower than a predetermined threshold, this is not restrictive. It is also possible to generate separate search spaces using the occurrence frequency of phonetic units whose recognition performance is lower than a predetermined threshold and a simple occurrence frequency, search for regional acoustic models in each search space using the first or second search method, compare likelihoods of the regional acoustic models between the search spaces, and select the regional pattern model in the search space with the higher likelihood.

Figure 27:
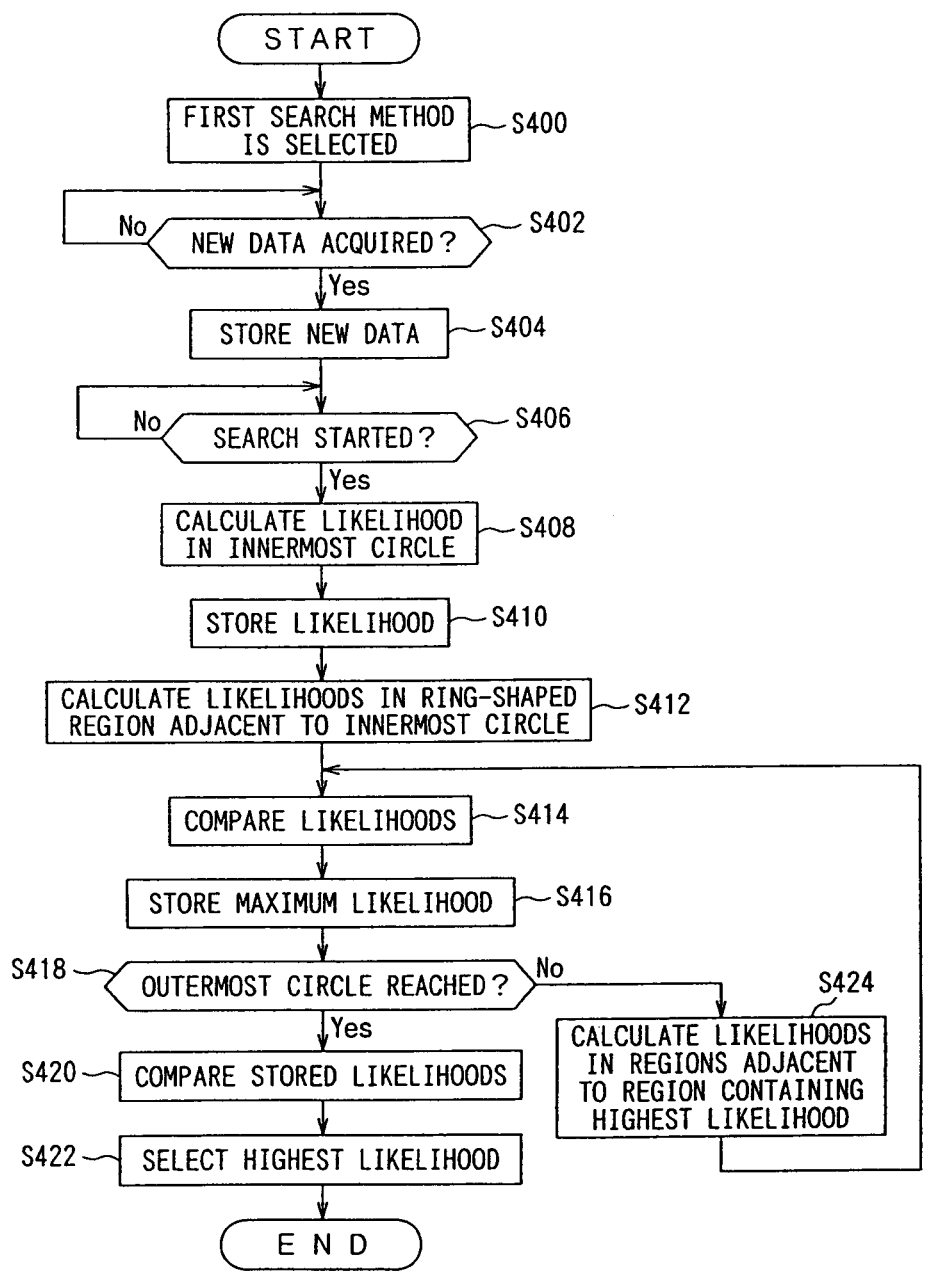
FIG. 27 is a flowchart showing a search process performed by a regional pattern model searching section 21c using the first search method.

Now, flow of a search process performed by the regional pattern model searching section 21c of the data process unit 21 using the first search method will be described with reference to FIG. 27. FIG. 27 is a flowchart showing the search process performed by the regional pattern model searching section 21c using the first search method.

As shown in FIG. 27, when the user of the data process unit 21 selects the first search method using an input device in Step S400, the regional pattern model searching section 21c goes to Step S402.

In Step S402, the regional pattern model searching section 21c judges whether the data acquiring section 21b has acquired new data. If it is found that new data has been acquired (Yes), the regional pattern model searching section 21c goes to Step S404. Otherwise (No), it continues the judging process until new data is acquired. The new data here means data on a new object such as a new speaker. Such data may be, for example, speech data of a new speaker.

In Step S404, the regional pattern model searching section 21c stores the acquired new data in the data storing section 1b. Then, it goes to Step S406.

In Step S406, the regional pattern model searching section 21c judges whether the data control section 1d has accepted a search start command from the user of the data process unit 21 via an input device. If it is found that a search start command has been acquired (Yes), the regional pattern model searching section 21c goes to Step S408. Otherwise (No), it continues the judging process until a search start command is accepted.

In Step S408, the regional pattern model searching section 21c reads the stored new data out of the data storing section 1b and calculates the likelihood of match between the new data and the regional pattern model corresponding to the region in the innermost circle out of the regions produced by the region dividing section 1h. Then, it goes to Step S410.

In Step S410, the regional pattern model searching section 21c stores the likelihood calculated in Step S408 in the RAM. Then, it goes to Step S412.

In S412, the regional pattern model searching section 21c calculates the likelihoods of matches between the new data and the regional pattern models corresponding to the segment regions in the ring-shaped region adjacent to the innermost circle. Then, it goes to Step S414.

In Step S414, the regional pattern model searching section 21c compares the calculated likelihoods of the segment regions. Then, it goes to Step S416.

In Step S416, the regional pattern model searching section 21c stores the highest likelihood in a RAM, based on the results of comparison in Step S414, by associating it with the regional pattern model. Then, it goes to Step S418.

In Step S418, the regional pattern model searching section 21c judges whether the likelihood calculation has reached the outermost ring-shaped region. If it is found that the outermost ring-shaped region has been reached (Yes), the regional pattern model searching section 21c goes to Step S420. Otherwise (No), it goes to Step S424.

In Step S420, the regional pattern model searching section 21c compares all the likelihoods stored in the RAM. Then, it goes to Step S422.

In Step S422, the regional pattern model searching section 21c selects the regional pattern model which corresponds to the highest likelihood, based on the results of comparison in Step S420 and then it finishes processing.

On the other hand, if the regional pattern model searching section 21c goes to Step S424 because it is found in Step S418 that the outermost ring-shaped region has not been reached yet, it calculates the likelihoods of the regional pattern models corresponding to the regions adjacent to and outside of the region containing the regional pattern model with the highest likelihood based on the results of comparison in Step S414. Then, it goes to Step S414.

Figure 28:
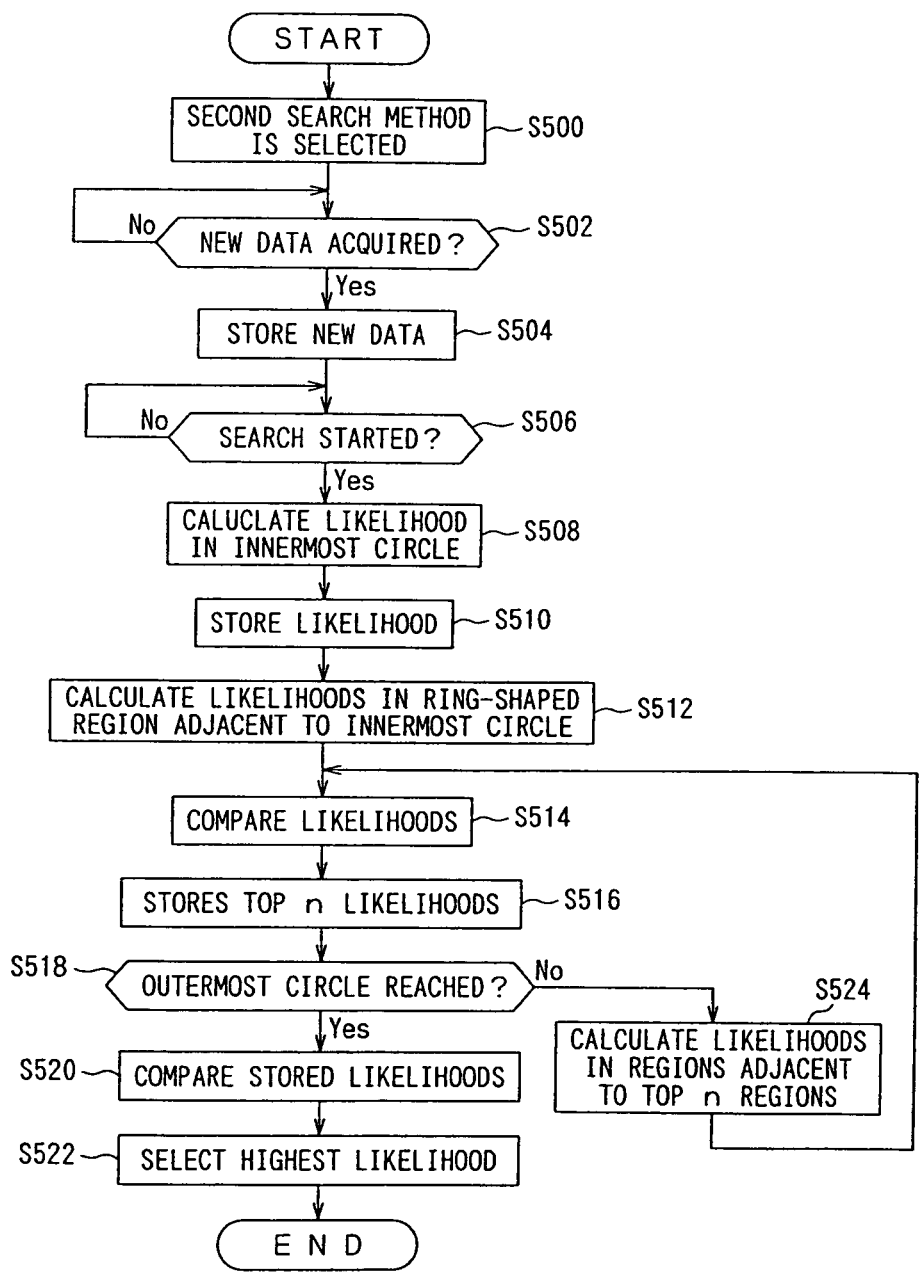
FIG. 28 is a flowchart showing a search process performed by the regional pattern model searching section 21c using the second search method.

Now, flow of a search process performed by the regional pattern model searching section 21c of the data process unit 21 using the second search method will be described with reference to FIG. 28. FIG. 28 is a flowchart showing the search process performed by the regional pattern model searching section 21c using the second search method.

As shown in FIG. 28, when the user of the data process unit 21 selects the second search method using an input device in Step S500, the regional pattern model searching section 21c goes to Step S502.

In Step S502, the regional pattern model searching section 21c judges whether the data acquiring section 21b has acquired new data. If it is found that new data has been acquired (Yes), the regional pattern model searching section 21c goes to Step S504. Otherwise (No), it continues the judging process until new data is acquired. The new data here means data on a new object such as a new speaker. Such data may be, for example, speech data of a new speaker.

In Step S504, the regional pattern model searching section 21c stores the acquired new data in the data storing section 1b. Then, it goes to Step S506.

In Step S506, the regional pattern model searching section 21c judges whether the data control section 1d has accepted a search start command from the user of the data process unit 21 via an input device. If it is found that a search start command has been acquired (Yes), the regional pattern model searching section 21c goes to Step S508. Otherwise (No), it continues the judging process until a search start command is accepted.

In Step S508, the regional pattern model searching section 21c reads the stored new data out of the data storing section 1b and calculates the likelihood of match between the new data and the regional pattern model corresponding to the region in the innermost circle out of the regions produced by the region dividing section 1h. Then, it goes to Step S510.

In Step S510, the regional pattern model searching section 21c stores the likelihood calculated in Step S508 in the RAM. Then, it goes to Step S512.

In Step S512, the regional pattern model searching section 21c calculates the likelihoods of matches between the new data and the regional pattern models corresponding to the segment regions in the ring-shaped region adjacent to the innermost circle. Then, it goes to Step S514.

In Step S514, the regional pattern model searching section 21c compares the calculated likelihoods of the segment regions. Then, it goes to Step S516.

In Step S516, the regional pattern model searching section 21c stores the top n likelihoods in a RAM, based on the results of comparison in Step S514, by associating them with the regional pattern model. Then, it goes to Step S518.

In Step S518, the regional pattern model searching section 21c judges whether the likelihood calculation has reached the outermost ring-shaped region. If it is found that the outermost ring-shaped region has been reached (Yes), the regional pattern model searching section 21c goes to Step S520. Otherwise (No), it goes to Step S524.

In Step S520, the regional pattern model searching section 21c compares all the likelihoods stored in the RAM. Then, it goes to Step S522.

In Step S522, the regional pattern model searching section 21c selects the regional pattern model which corresponds to the highest likelihood, based on the results of comparison in Step S520 and then it finishes processing.

On the other hand, if the regional pattern model searching section 21c goes to Step S524 because it is found in Step S518 that the outermost ring-shaped region has not been reached yet, it calculates the likelihoods of the regional pattern models corresponding to the regions adjacent to and outside of the regions containing the regional pattern models corresponding to the top n likelihoods based on the results of comparison in Step S514. Then, it goes to Step S514.

The data classification section 1a can classify predetermined data on a plurality of objects (speech data of a plurality of speakers) into groups according to the specific conditions.

The pattern model generating section 1c can generate pattern models (high dimensional acoustic models, according to the above embodiment) for each group from the grouped predetermined data (speech data, according to the above embodiment).

The mathematical distance calculating section 1e' can calculate mathematical distance among a plurality of pattern models (high dimensional acoustic models, according to the above embodiment) using the occurrence frequency of the pattern units (phonetic units, according to the above embodiment) whose recognition performance is lower than a predetermined threshold as w(k) in Equation (1) above.

The pattern model converting section 1f can convert a plurality of pattern models (high-dimensional acoustic models, according to the above embodiment) into the same number of low dimensional vectors corresponding to pattern models (acoustic-model-compatible low dimensional vectors, according to the above embodiment) based on the mathematical distance among the pattern models (high dimensional acoustic models, according to the above embodiment).

The pattern model display section 1g can display a plurality of low dimensional vectors corresponding to pattern models (acoustic-model-compatible low dimensional vectors, according to the above embodiment) as coordinate points in a low dimensional space (two-dimensional space, according to the above embodiment) of the same dimension as the low dimensional vectors corresponding to pattern models.

The region dividing section 1h can automatically divide a region existing in the low dimensional space and containing coordinate points in such a way as to divide the ring-shaped regions containing the low dimensional vectors corresponding to pattern models (acoustic-model-compatible low dimensional vectors, according to the above embodiment) more finely with increasing radial distance from the innermost circle.

The division changing section 1i can change the results of divisions produced automatically by the region dividing section 1h, based on input information.

The region selecting section 1j can select a segment region from displayed segment regions based on input information.

The specific pattern model generating section 1k can generate a specific pattern model (specific acoustic model, according to the above embodiment) based on the data (speech data, according to the above embodiment) related to the pattern models (high dimensional acoustic models, according to the above embodiment) corresponding to the plurality of low dimensional vectors corresponding to pattern models (acoustic-model-compatible low dimensional vectors, according to the above embodiment) located in the region selected by the region selecting section 1i.

The regional pattern model generating section 21a can generate a regional pattern model (regional acoustic model, according to this embodiment) of each segment region produced by the region dividing section 1h.

The data acquiring section 21b can acquire predetermined data on a new object (speech data of a new speaker, according to the above embodiment).

The regional pattern model searching section 21c can search regional pattern models (regional acoustic models, according to the above embodiment) corresponding to segment regions produced by the region dividing section 1h for a regional pattern model suitable for recognizing the predetermined data (speech data, according to the above embodiment) acquired by the data acquiring section 21b, using the first or second search method.

Seventh Example

Figure 30:
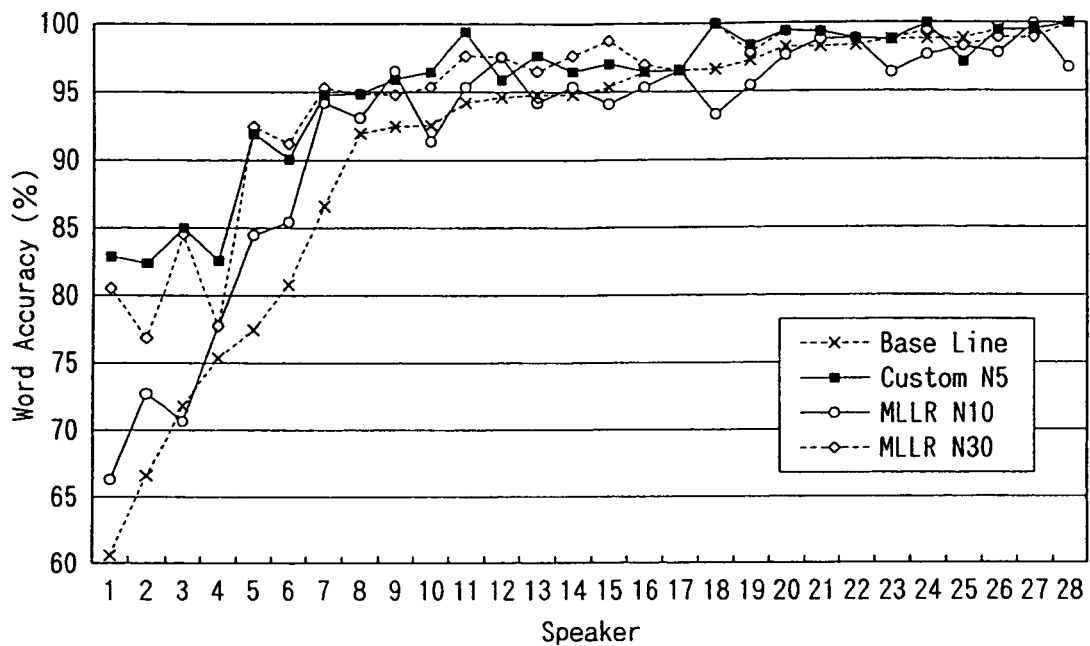
FIG. 30 is a diagram showing relationship between recognition performance and speakers using an acoustic model selected by a search method according to the data process unit 21 of the present invention and an acoustic model selected by a conventional MLLR speaker adaptation technique.
Figure 31:
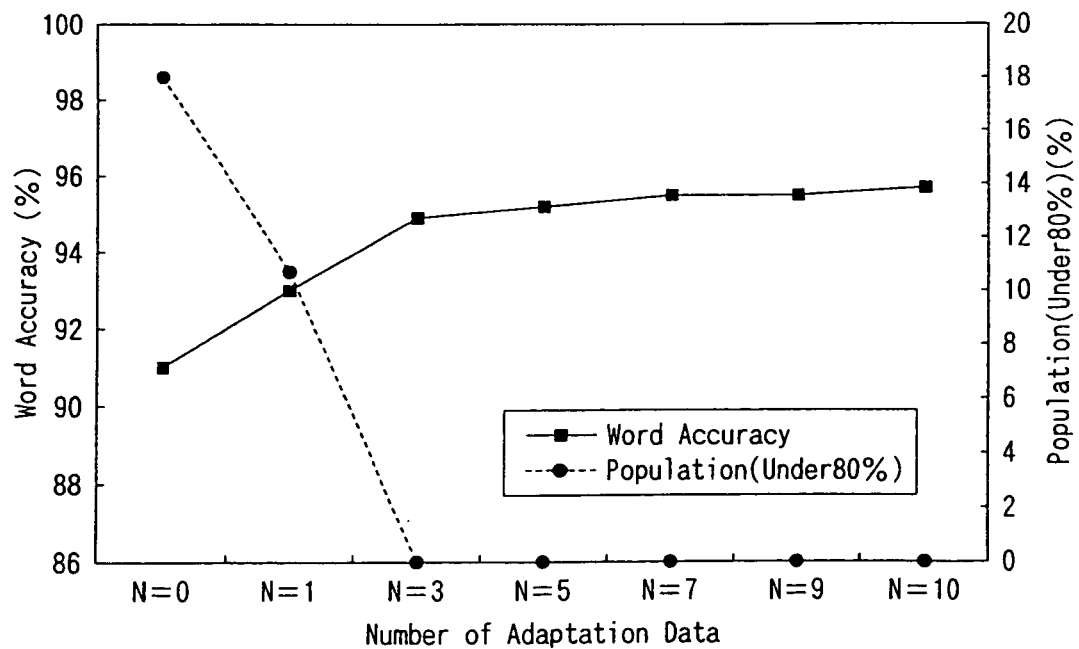
FIG. 31 is a diagram showing relationship between the number of utterances produced during a search for an acoustic model and recognition performance of acoustic models selected according to the number of utterances.

With reference to FIGS. 29 to 31, description will be given of an example in which the data process unit 21 according to the second embodiment projected a plurality of high dimensional acoustic models (hereinafter referred to as an acoustic model library) for each speech style two-dimensionally, divided them into a plurality of segment regions, generated a plurality of regional acoustic models for the respective segment regions, selected a regional acoustic model from the plurality of regional acoustic models using the first search method, and compared performance between the regional acoustic model thus obtained and an acoustic model obtained by a conventional MLLR (Maximum Likelihood Linear Regression).

FIG. 29A is a diagram showing types of speech style used to generate acoustic models while FIG. 29B is a diagram showing acoustic-model-compatible low dimensional vectors displayed in a two-dimensional plane by the data process unit 21 according to the present invention. FIG. 30 is a diagram showing relationship between recognition performance and speakers using an acoustic model selected by a search method according to the data process unit 21 of the present invention and an acoustic model selected by a conventional MLLR speaker adaptation technique. FIG. 31 is a diagram showing relationship between the number of utterances produced during a search for an acoustic model and recognition performance of acoustic models selected according to the number of utterances.

For performance comparison, 5240 phoneme-balanced words were divided into word lists each of which consists of 175 words, 145 male speakers were asked to utter in a plurality of speech styles, and resulting speech data were used. A total of 561 speakers participated, of which 533 speakers were learning data speakers and 28 speakers were evaluation data speakers. Details about the selection of the evaluation speakers will be described later. A background noise recorded at an exhibition was superimposed over the speech data at an S/N ratio of 20 dB. Sampling frequency was 11.025 kHz. Seven speech styles were used as shown in FIG. 29A: normally (utter at a usual speed), rapidly (utter faster than usual), in a high voice (utter in a higher than normal voice), in a small voice (utter in such a way as not to be heard even by people nearby), in a loud voice (utter in such a way as to be heard even by people far way), Lombard (utter while hearing car noise), and distinctly (pronounce each kana distinctly).

Acoustic models were created through HMM-based modeling of diphones using simple normal distributions.

FIG. 29B shows an acoustic space map which results when speaker dependent acoustic models of 533 male learning data speakers are displayed as coordinate points in a two-dimensional plane by the data process unit 21. The occurrence frequency of the diphones in learning data was used as the occurrence frequency w(k) of the phonetic unit k in Equation (1). In this example, on the data process unit 21, two types of occurrence frequency—namely, the occurrence frequency of simple diphones and the occurrence frequency of diphones whose recognition performance was lower than a predetermined threshold—were used as the occurrence frequency w(k) in Equation (1) above, and during searches for regional acoustic models, results of searches conducted in two types of acoustic space map generated using the respective occurrence frequencies were compared and the regional acoustic model which gave the higher likelihood was selected.

The symbols of coordinate points used are shown in FIG. 29A.

It can be seen from FIG. 29B that coordinate points form groups according to speech styles. This is believed to indicate that acoustic characteristics vary with the speech style. Since coordinate points for the speech style of "normally" are concentrated at the center of distribution, it is believed that speech styles with more average characteristics appear in the center when mapped to a two-dimensional plane by the data process unit 21. The dotted arrows represent differences in the same speaker among different speech styles. This indicates that if a statistical process is performed again after acoustic analysis, acoustic characteristics vary with the speech style more greatly than with the speaker.

Two speakers per speech style were selected as evaluation speakers from both the inner and outer edges of the distribution in FIG. 29B (for a total of 28 evaluation speakers).

HTK (The Hidden Markov Model Toolkit) was used for evaluation and a parallel network of lists of 175 recorded words was presented to the evaluation speakers. As an evaluation measure, the proportion of evaluation speakers with recognition performance below X % (hereinafter referred to as Population) was used in addition to word accuracy (hereinafter referred to simply as recognition performance). This is one of the performance guarantee indices required of embedded device manufacturers by speech recognition vendors.

The acoustic model library was evaluated using the evaluation data. Acoustic models selected from the acoustic model library by the first search method based on a small quantity of speech samples are referred to as custom acoustic models. First, performance was compared between the custom acoustic models and speaker independent acoustic models to determine baseline performance and performance was also compared between the custom acoustic models and speaker-adapted acoustic models obtained by the conventional MLLR speaker adaptation technique. Next, performance was compared using the number of speech samples needed for model selection, and the number of speech samples needed for sufficient performance improvement was examined. Regarding speech samples used for model selection or MLLR-based speaker adaptation, since it is considered to be general practice to use words in a task, speech samples selected randomly from evaluation data of each evaluation speaker were used.

FIG. 30 shows comparison of recognition performance among speaker independent acoustic models, speaker-adapted acoustic models (the number of adapted utterances is 10 (represented by MLLR_N10 in FIG. 30)), speaker-adapted acoustic models (the number of adapted utterances is 30 (represented by MLLR_N30 in FIG. 30)), and custom acoustic models (the number of utterances for model selection is 5 (represented by Custom_N5 in FIG. 30)) with respect to different speakers. In FIG. 30, the horizontal axis represents speaker numbers while the vertical axis represents the recognition rate of each acoustic model plotted against speakers. Also, it is assumed that speaker-adapted acoustic models have been adapted to speakers using the number of learning sessions which provides the highest performance. The number of adapted utterances plus the number of utterances for model selection equals the number of speech samples of each speaker needed for model selection.

As can be seen from FIG. 30, the custom acoustic models ("■" in FIG. 30) show much higher performance than the speaker independent acoustic models ("x" in FIG. 30) especially in the case of speakers 1 to 11 and offer equal or higher performance than the MLLR-based speaker-adapted acoustic models with 30 adapted utterances ("◊" in FIG. 30). This reduces the number of speech samples required for searches compared to conventional methods (i.e., requires smaller amounts of computation than the conventional methods), making it possible to search for a custom acoustic model suitable for each speaker faster than the conventional methods. The custom acoustic models offer high performance of 80% or more even with speakers (speakers 1 to 4 in FIG. 30) who are marked by poor recognition performance in the case of the speaker independent acoustic models and MLLR-based speaker-adapted acoustic models. Thus, it appears that it was also useful to search for regional acoustic models selectively in acoustic space maps created using the distance among acoustic models, which in turn was calculated using two types of occurrence frequency—namely, the occurrence frequency of simple diphones and the occurrence frequency of diphones whose recognition performance was lower than a predetermined threshold—as the occurrence frequency w(k) in Equation (1) above.

FIG. 31 shows relationship ("■" in FIG. 31) between the number of utterances and average recognition performance as well as relationship ("●" in FIG. 31) between the number of utterances and Population with a recognition rate of 80% or below to exemplify relationship between the recognition performance of custom acoustic models and the number of speech samples during searches for custom acoustic models conducted by the data process unit 21 according to the present invention. In FIG. 31, the results obtained when N=0 are attributable to speaker independent acoustic models (Base_Line). Also, the horizontal axis represents the number of utterances, first vertical axis (left side) represents the recognition rate (speakers' average), and second vertical axis (right side) represents the proportion of speakers with a recognition rate of 80% or below.

In FIG. 31, the relationship between the number of utterances and average recognition performance (the horizontal axis and first vertical axis) indicates that the recognition rate improved within only three or five words and the relationship between the number of utterances and Population with a recognition rate of 80% or below (the horizontal axis and second vertical axis) indicates that the proportion of Population with a recognition rate of 80% or below was reduced to 0 within only three words. Thus, it can be said that the data process unit 21 according to the present invention can search for acoustic models which have sufficient recognition performance with respect to speakers even if only three or five words are uttered.

Eighth Example

Figure 32:
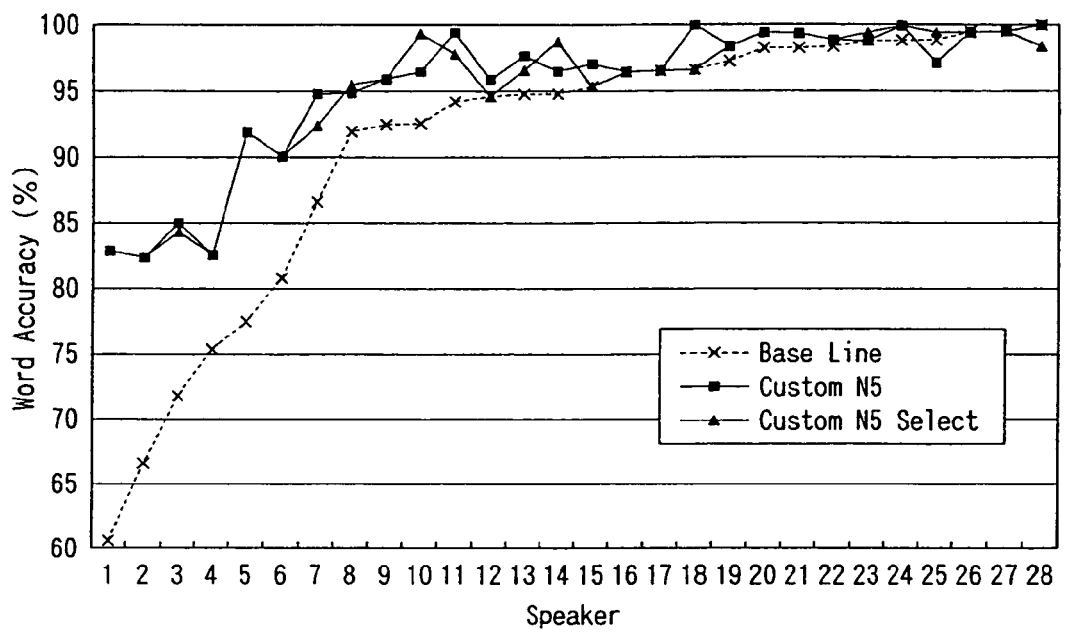
FIG. 32 is a diagram showing relationship between recognition performance and speakers using an acoustic model searched for by the first search method and an acoustic model searched for based on calculated likelihood with an acoustic model generated for a whole region.

With reference to FIG. 32, description will be given of an example in which the data process unit 21 according to the present invention compared recognition performance between two types of regional acoustic model suitable for a new speaker: a regional acoustic model searched for by the first search method and a regional acoustic model searched for based on calculated likelihood of match with an acoustic model generated for a whole region. The speech styles, evaluation speakers, and the like used in this example were the same as in the seventh example above.

FIG. 32 is a diagram showing relationship between recognition performance and speakers using an acoustic model searched for by the first search method and an acoustic model searched for based on calculated likelihood of match with an acoustic model generated for a whole region.

In FIG. 32, five speech samples per speaker were selected randomly for use in searches as was the case with the seventh example above. As can be seen from FIG. 32, when two conditions are compared, namely a condition (▲ in FIG. 32) under which the likelihoods of matches between the speech samples and all regional acoustic models were calculated and the regional acoustic model with the maximum likelihood were selected through comparison of the calculated likelihoods and a condition ("■" in FIG. 32) under which the first method above was used, there is not much difference in the recognition rate between the two conditions as a whole although partially the recognition rate of one condition is superior or inferior to that of the other. Thus, it can be seen that it is possible to search for a regional acoustic model suitable for each speaker without calculating the likelihoods of matches with all the regional acoustic models using the first method above. Thus, the use of the first or second search method in the searches for regional acoustic models is beneficial and makes it possible to search for a regional acoustic model suitable for each speaker quickly.

Ninth Example

Figure 33:
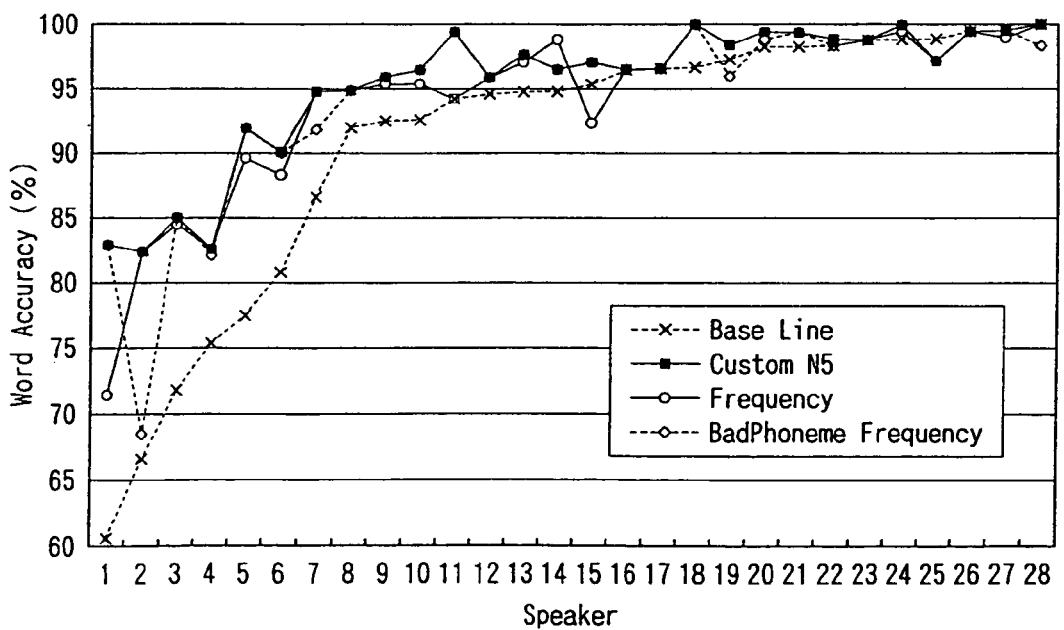
FIG. 33 is a diagram showing relationship between recognition performance and speakers where two types of occurrence frequency are used as weights, normal occurrence frequency is used as weights, or occurrence frequency of phonetic units contained in vocabulary words whose recognition performance is lower than a predetermined threshold is used as weights.

With reference to FIGS. 33 to 34, description will be given of an example in which recognition performance were compared by varying the occurrence frequency w(k) in Equation (1) above. The speech styles, evaluation speakers, and the like used in this example were the same as in the seventh example above.

Figure 34A:
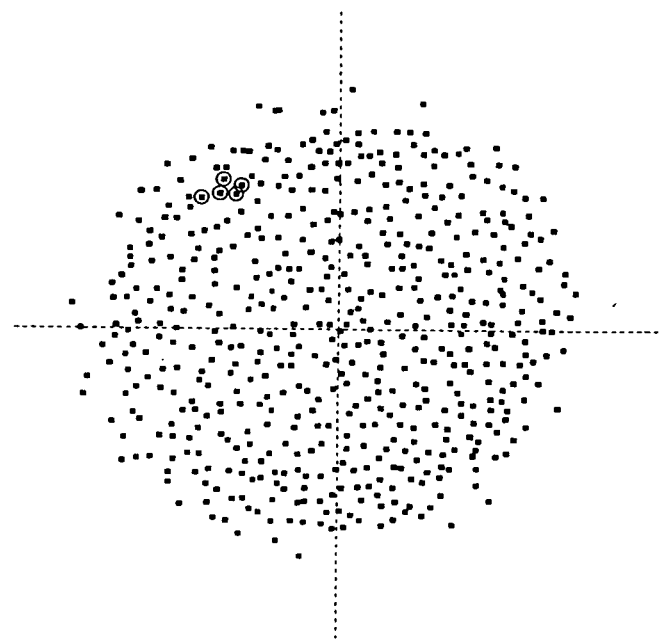
Figure 34B:
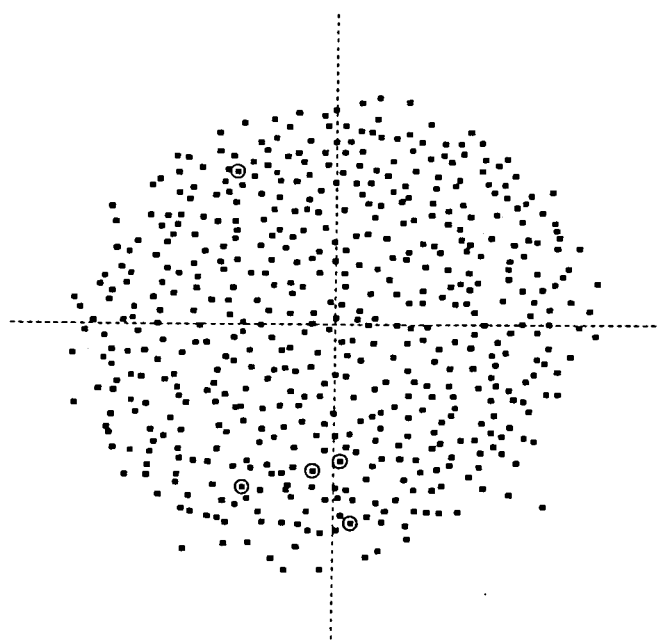
FIG. 34B is a diagram showing an acoustic space map generated using the occurrence frequency of diphones with low recognition performance.

FIG. 33 is a diagram showing relationship between recognition performance and speakers where two types of occurrence frequency are used as weights, normal occurrence frequency is used as weights, or occurrence frequency of phonetic units whose recognition performance is lower than a predetermined threshold is used as weights. FIG. 34A is a diagram showing an acoustic space map generated using the occurrence frequency of simple diphones as weights for distance while FIG. 34B is a diagram showing an acoustic space map generated using the occurrence frequency of diphones whose recognition performance is lower than a predetermined threshold as weights for distance.

In FIG. 33, Base_Line ("x") represents a condition under which speaker independent acoustic models generated using an acoustic model for a whole region, Custom_N5 ("■") represents a condition under which regional acoustic models were searched for selectively in acoustic space maps created using two types of occurrence frequency as was the case with the seventh example above—namely, the occurrence frequency of simple diphones and the occurrence frequency of diphones whose recognition performance was the lowest—as the occurrence frequency w(k) in Equation (1) above, Frequency ("○") represents a condition under which regional acoustic models were searched for in an acoustic space map created using the occurrence frequency of simple diphones, Badphoneme Frequency ("◇") represents a condition under which regional acoustic models were searched for in an acoustic space map created using the occurrence frequency of diphones whose recognition performance was the lowest.

As can be seen from FIG. 33, with respect to speaker 1, the Frequency condition showed low recognition performance with the recognition rate being below 75% and the Badphoneme Frequency condition showed high recognition performance with the recognition rate being above 80%. On the other hand, with respect to speaker 2, the Frequency condition showed high recognition performance with the recognition rate being above 80% and the Badphoneme Frequency condition showed low recognition performance with the recognition rate being below 70%. In this way, although a small number of samples were used, it can be seen that depending on speakers, recognition performance varies greatly with the occurrence frequency used as weights. Thus, it can be said that the Custom_N5 condition, under which the Frequency and Badphoneme Frequency conditions make up for each other's shortcomings (deal with the speakers the counterpart is bad at handling) by selecting regional acoustic models with high likelihood from those belonging to the Frequency and Badphoneme Frequency conditions, is applicable to a wide variety of speakers.

In FIG. 34A, there are five encircled coordinate points located close to each other. On the other hand, encircled coordinate points in FIG. 34B are more scattered than the coordinate points in FIG. 34A. Here, the five encircled coordinate points in FIG. 34A and five encircled coordinate points in FIG. 34B correspond to the same acoustic models. Thus, it can be seen that the distribution of acoustic models varies greatly with the type of the occurrence frequency used. As described earlier, acoustic distance between speakers varies with the phonetic unit (phoneme). This problem is not solved completely even if occurrence frequency is used. The acoustic distance determined by one type of occurrence frequency does not hold true for all phonetic units. Some phonetic units do not give accurate acoustic distance even though they are important for recognition. Thus, as in the case of the Custom_N5 condition under which distance is calculated using two types of occurrence frequency, the above problem is alleviated by calculating the distance among acoustic models using multiple types of occurrence frequency, generating a plurality of acoustic space maps for each type of occurrence frequency, and using the acoustic space maps in such a way as to make up for each other's shortcomings when searching for regional acoustic models.

In the second embodiment described above, the data classification section 1$a$ corresponds to the data classification means; the pattern model generating section 1$c$ corresponds to the pattern model generating means set forth in any of; the mathematical distance calculating section 1$e'$ corresponds to the mathematical distance calculating means; the pattern model converting section 1$f$ corresponds to the pattern model converting means; the pattern model display section 1$g$ corresponds to the low dimensional vector corresponding to pattern model display means; the region dividing section 1$h$ corresponds to the region dividing means; the regional pattern model generating section 21$a$ corresponds to the regional pattern model generating means; the data acquiring section 21$b$ corresponds to the predetermined data acquiring means; the regional pattern model searching section 21$c$ corresponds to the regional pattern model searching means; the division changing section 1$i$ corresponds to the division changing means; the pattern model adapting section 1$k$ corresponds to the pattern model adapting means.

Incidentally, although human voice has been cited in the second embodiment described above, it is not that the present invention is applicable only to human voice. The present invention can solve similar problems and offer similar effect when it is applied to data other than human voice.

Also, although it has been stated in the second embodiment described above that the acoustic-model-compatible low dimensional vectors produced by the pattern model converting section $1f$ are two-dimensional, this is not restrictive and one-dimensional or three-dimensional vectors may also be used.

Third Embodiment

A third embodiment of the present invention will be described with reference to drawings. FIGS. 35 to 42 are diagrams showing a data process system according to the third embodiment of the present invention.

Figure 35:
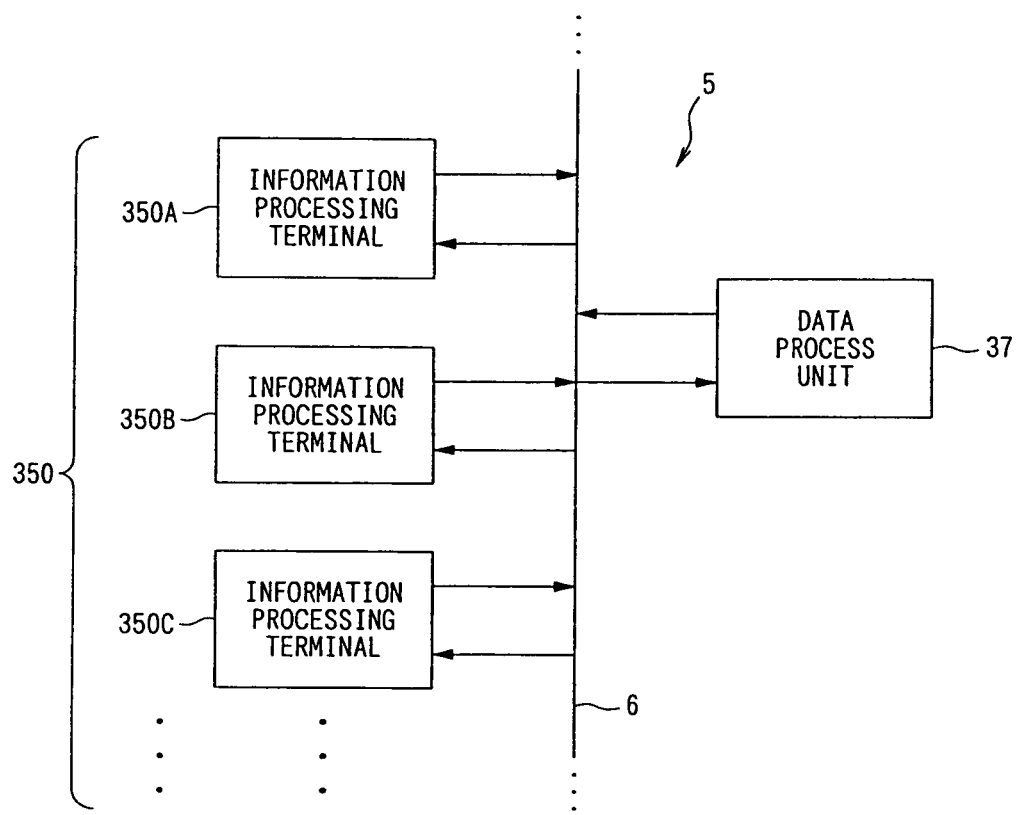
FIG. 35 is a block diagram showing a configuration of a data process system according to the present invention.

First, a configuration of a data process system according to the present invention will be described with reference to FIG. 35. FIG. 35 is a block diagram showing a configuration of a data process system according to the present invention.

As shown in FIG. 35, the data process system 5 comprises information processing terminals 350A, 350B, and 350C a data process unit 37, and a network 6.

The information processing terminals 350A to 350C are under the control of system users A to C. They have a function to acquire speech data of the respective system users and send the speech data to the data process unit 37 via the network 6 and a function to display the information acquired from the data process unit 37. According to this embodiment, hardware and software are installed on information processing units such as cell phones, PDAs, PCs and WSs to implement the above functions. Detailed configuration will be described later.

The data process unit 37 comprises a function to search for regional acoustic models suitable for speakers of speech data acquired from an acoustic space map divided into regions, based on speech data acquired from the information processing terminals 350A to 350C via the network 6; a function to display positional information about the acquired speech data in an acoustic space map composed of acoustic models of a plurality of speakers and results of the search; and a function to send retrieved acoustic models to a system user. Detailed configuration will be described later.

The network 6 is a LAN or WAN which connects a plurality of information processing devices so as to be ready for data communications with each other. This embodiment uses the Internet.

Figure 36:
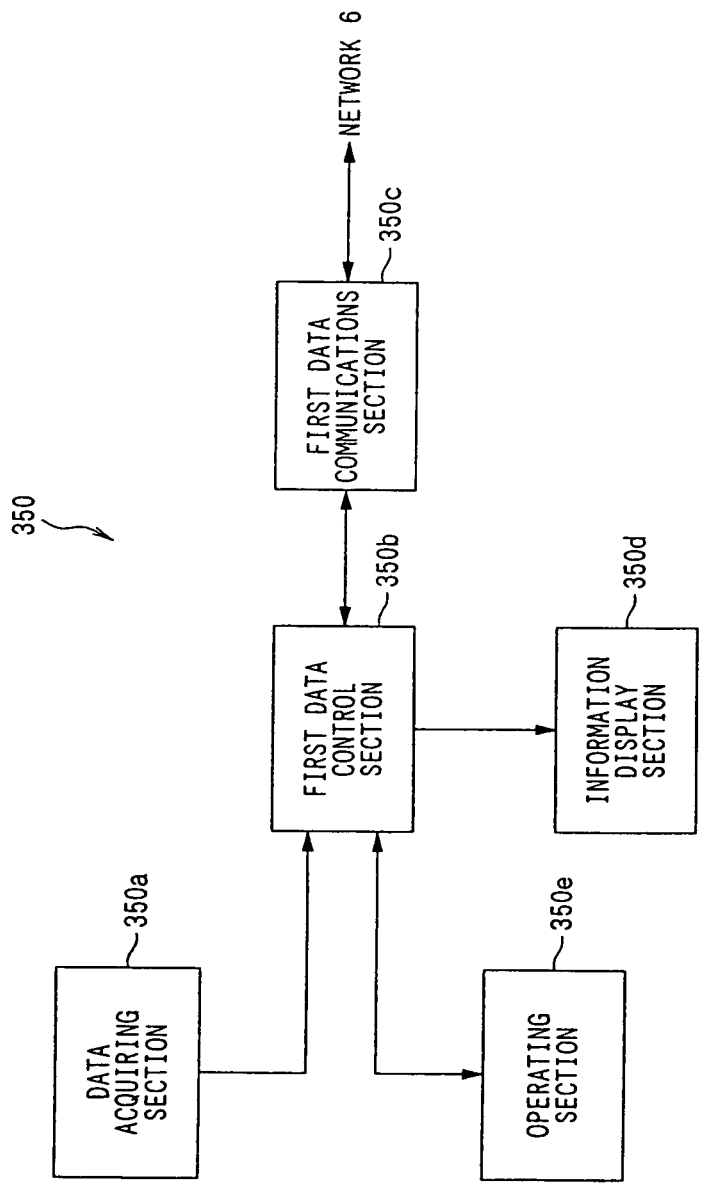
FIG. 36 is a diagram showing a detailed configuration of an information processing terminal 350.

Now, detailed configuration of the information processing terminals 350A to 350C will be described with reference to FIG. 36. FIG. 36 is a diagram showing a detailed configuration of an information processing terminal 350. According to this embodiment, the information processing terminals 350A to 350C (there may be other information processing terminals) have the same configuration and they will be referred to correctively as the information processing terminal 350. Hereinafter, items common to the information processing terminals 350A to 350C will be referred to the information processing terminal 350 called collectively. Also, as shown in FIG. 35, information processing terminals are not limited to the three ones 350A to 350C, and it is possible to connect other information processing terminals which are under the control of other system users.

As shown in FIG. 36, the information processing terminal 350 comprises a speech data acquiring section 350a, first data control section 350b, first data communications section 350c, information display section 350d, and operating section 350e.

The speech data acquiring section 350a comprises means such as a microphone for acquiring speech (analog data) uttered by a target speaker and means such as an A/D converter for converting the analog data (speech) into digital data.

The first data control section 350b comprises functions to control processes of various components, including a function to control the process of sending the speech data acquired by the speech data acquiring section 350a to the data process unit 37 via the first data communications section 350c and a function to control the process of displaying the information acquired from the data process unit 37 in the information display section 350d.

The first data communications section 350c has a function to conduct various data communications with the data process unit 37 via the network 6 under the control of the first data control section 350b.

The information display section 350d has a function to display information including various information acquired from the data process unit 37, under the control of the first data control section 350b.

The operating section 350e allows the system user to enter information to specify a specific speaker or make settings for a speech data processing control program.

According to this embodiment, although they are not shown, the information processing terminal 350 is equipped with a processor, RAM (Random Access Memory), and ROM (Read Only Memory) storing dedicated programs. The information processing terminal 350 controls the above components as the processor executes the dedicated programs.

Figure 37:
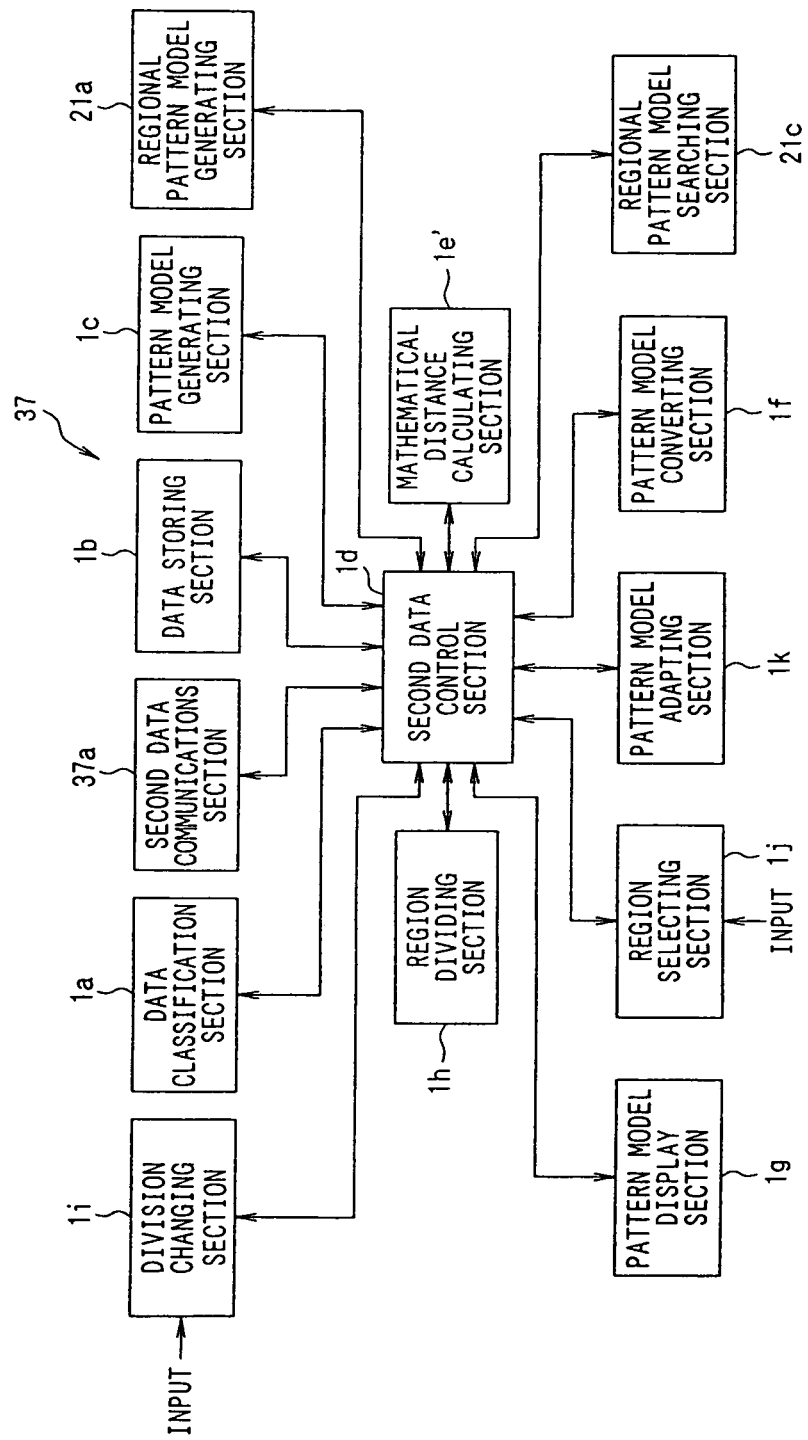
FIG. 37 is a block diagram showing a detailed configuration of a data process unit 37.

Now, detailed configuration of the data process unit 37 will be described with reference to FIG. 37. FIG. 37 is a block diagram showing a detailed configuration of a data process unit 37. Incidentally, functional components similar to those of the data process unit 21 in the second embodiment will be denoted by the same reference numerals as those in the second embodiment and description of the same functions as those of the data process unit 21 will be omitted.

The data process unit 37 comprises a data classification section $1a$, data storing section $1b$, pattern model generating section $1c$, second data control section $1d'$, mathematical distance calculating section $1e'$, pattern model converting section $1f$, pattern model display section $1g$, region dividing section $1h$, division changing section $1i$, region selecting section $1j$, specific pattern model generating section $1k$, regional pattern model generating section 21a, second data communications section 37a, and regional pattern model searching section 21c.

That is, the data process unit 37 includes the second data communications section 37a instead of the data acquiring section 21b of the data process unit 21.

The second data control section $1d'$ has a function to control the process of receiving speech data of a system user from the information processing terminal 350, calculating the location of the speech data on an acoustic space map generated in advance, calculating the value of the appropriate region, and sending the calculation results and comment data on them to the information processing terminal 350 in addition to the function of the data control section $1d$ according to the second embodiment. Also, it has a function to control the process of evaluating the performance of acoustic models currently used by a system user based on newly acquired speech data of the system user and sending the evaluation results and comment data on them to the information processing terminal 350.

The second data communications section 37a has a function to conduct various data communications with the information processing terminal 350 via the network 6 under the control of the second data control section 1d'.

Figure 38:
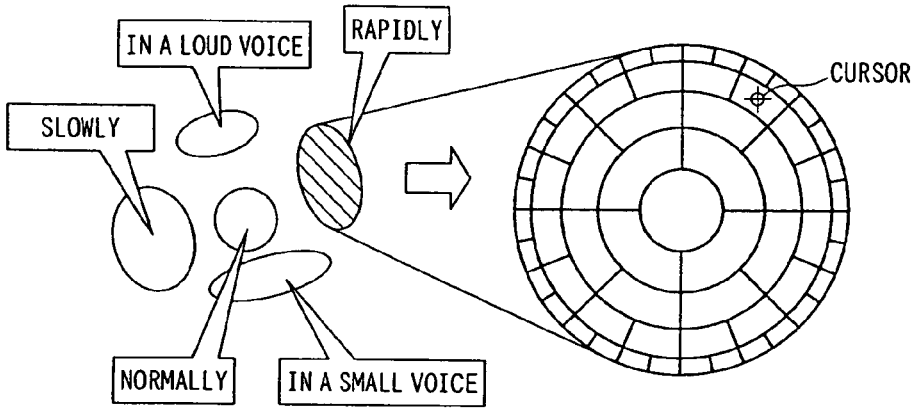
FIG. 38 is a diagram showing an example of information displayed when acoustic models suitable for a system user are delivered.
Figure 39:
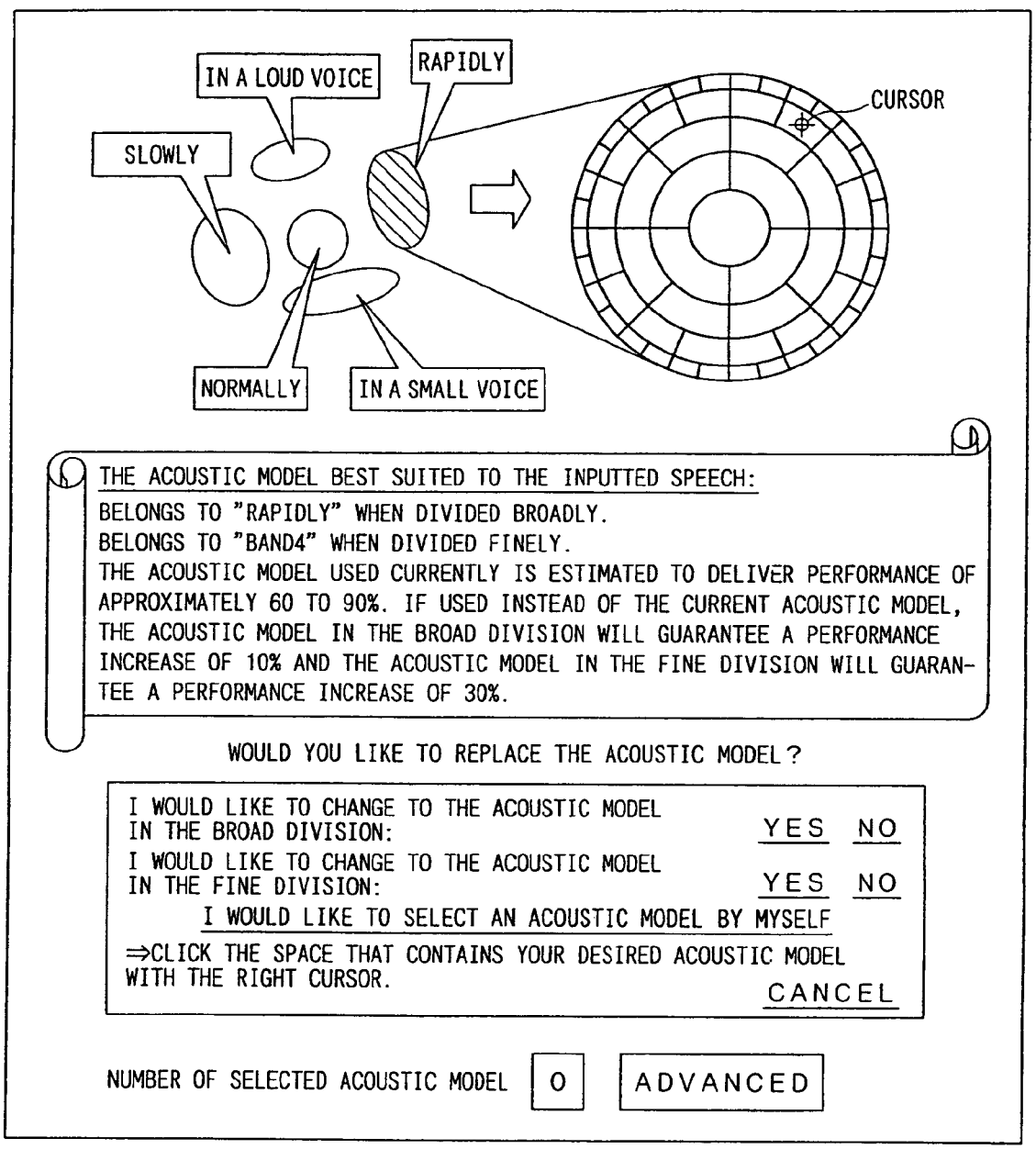
FIG. 39 is a diagram showing an example of information displayed when evaluating the performance of acoustic models used by a system user and delivering new acoustic models.

More concrete operation of the data process system 5 will be described below with reference to FIGS. 38 and 39. FIG. 38 is a diagram showing an example of information displayed when acoustic models suitable for a system use rare delivered. FIG. 39 is a diagram showing an example of information displayed when evaluating the performance of acoustic models used by a system user and delivering new acoustic models.

First, the data process unit 37 generates high dimensional acoustic models from speech data of a plurality of speakers, converts them into acoustic-model-compatible low dimensional vectors, and displays the vectors as coordinate points in a two-dimensional plane, following the same procedures as in the second embodiment above. Then, it divides the acoustic space in which the acoustic-model-compatible low dimensional vectors are displayed as coordinate points and generates a regional acoustic model of each segment region from speech data corresponding to the acoustic-model-compatible low dimensional vectors in the given segment region. Once regional acoustic models are generated, the data process unit 37 waits for a request to deliver acoustic models suitable for a system user or a request to evaluate acoustic models from the information processing terminal 350.

On the other hand, to acquire acoustic models suitable for recognizing his/her own speech, the system user instructs the first data control section 350b by operating the operating section 350e of the information processing terminal 350 to start a speech data acquiring program. The system user acquires his/her own speech via the speech data acquiring section 350a. Then, by operating the operating section 350e, the system user instructs the first data control section 350b to send the acquired speech data in combination with delivery request information and evaluation request information to the data process unit 37.

Upon receiving the speech data, delivery request information, and evaluation request information from the information processing terminal 350, the data process unit 37 searches for regional acoustic models suitable for speech recognition of the acquired speech data using the first search method according to the second embodiment above. The speech data also gives information as to which speech style the system user's speech data has. The information about the system user's speech data thus obtained is sent to the information processing terminal 350 as display information together with comment data prepared in advance. According to this embodiment, the data process unit 37 keeps a history of the acoustic models delivered to the system user in the past, evaluates the performance of the past acoustic models with respect to the current speech data based on the history, and compares the performance with that of the acoustic models newly found this time. This is done because speech data accumulated in the data process unit 37 are updated day by day due to addition of speech data of new speakers, etc. and the acoustic space map is updated accordingly. The performance comparison makes it possible to judge whether the acoustic models found in the new acoustic space map offer higher recognition performance than the past acoustic models, and thus to acquire acoustic models with high recognition performance. Thus, according to this embodiment, evaluation result information is also sent as display information to the information processing terminal 350. Also, delivery request information contains identification information for use to identify the system user.

When the information processing terminal 350 receives the display information from the data process unit 37, the first data control section 350b displays information based on the received display information under the control of the information display section 350d. The information displayed includes, for example, as shown in FIG. 38, the acoustic space for each speech style, the relative position of the system user's speech data in the acoustic spaces and in segment regions obtained by dividing the acoustic space which contains the system user's speech data into regions by the technique according to the second embodiment above, a value calculation formula of acoustic models in a large division for each speech style, a value calculation formula of acoustic models in each ring-shaped region (referred to as BAND here) divided into regions, an explanatory text for acoustic models suitable for the system user, a menu for the system user to decide whether to make a purchase or a menu for the system user to select a desired acoustic model, and information about the number of acoustic models selected and a cumulative amount.

By reading the explanatory text shown in FIG. 38, the system user learns that the acoustic models newly found this time offer higher recognition performance than the acoustic models currently in use. By looking at the prices of new acoustic models, the system user decides whether to purchase new acoustic models or whether to select new acoustic models by himself/herself. Then, the system user selects and applies the desired menu item by operating the operating section 350e. If he/she selects and applies "I want to purchase the acoustic model: Yes" this information is sent to the data process unit 37. Upon receiving the information, the data process unit 37 delivers the selected acoustic model to the information processing terminal 350. On the other hand, if the system user selects and applies "I want to select an acoustic model to purchase," he/she is allowed to select a desired acoustic model by positioning a cursor on the acoustic space of the desired speech style and on the desired segment region from among the segment regions obtained by dividing the acoustic space which contains the system user's speech data by the technique according to the second embodiment above. Consequently, information about the selected acoustic model is sent to the data process unit 37, which then sends the selected acoustic model to the information processing terminal 350.

Now, description will be given of another form in which the data process system 5 is used to evaluate and replace the acoustic model currently used by the system user.

To evaluate the acoustic model she/he is currently using, the system user instructs the first data control section 350b by operating the operating section 350e of the information processing terminal 350 to start a speech data acquiring program. The system user acquires his/her own speech via the speech data acquiring section 350a. Then, by operating the operating section 350e, the system user instructs the first data control section 350b to send the acquired speech data in combination with evaluation request information to the data process unit 37. The evaluation request information contains identification information about the system user.

Upon receiving the speech data and evaluation request information from the information processing terminal 350, the data process unit 37 searches for regional acoustic models suitable for speech recognition of the acquired speech data using the first search method according to the second embodiment above. The speech data also gives information as to which speech style the system user's speech data has. Based on the identification information contained in the evaluation request information, the data process unit 37 acquires information about the acoustic models delivered in the past, calculates the current recognition rate of the past acoustic models and recognition rate of the retrieved acoustic models with respect to the acquired speech data, and generates comments based on the results of calculation. The information about the system user's speech data thus obtained is sent to the information processing terminal 350 as display information together with comment data prepared in advance.

When the information processing terminal 350 receives the display information from the data process unit 37, the information display section 350d displays information based on the received display information under the control of the first data control section 350b. The information displayed includes, for example, as shown in FIG. 39, the acoustic space for each speech style, the relative position of the system user's speech data in the acoustic spaces and in segment regions obtained by dividing the acoustic space which contains the system user's speech data into regions by the technique according to the second embodiment above, evaluation details of the current acoustic models used by the system user, a menu for the system user to decide whether to replace the current acoustic models or a menu for the system user to select a desired acoustic model, and information about the number of acoustic models selected.

By reading the evaluation details shown in FIG. 39, the system user learns that the acoustic models newly found this time offer higher recognition performance than the acoustic models currently in use. The system user decides whether to replace the current acoustic models with the newly found acoustic models or whether to select new acoustic models by himself/herself. Then, the system user selects and applies the desired menu item by operating the operating section 350e. If he/she selects and applies "I want the acoustic model to be replaced: Yes" this information is sent to the data process unit 37. Upon receiving the information, the data process unit 37 delivers the selected acoustic model to the information processing terminal 350. On the other hand, if the system user selects and applies "I want to select a new acoustic model for replacement," he/she is allowed to select a desired acoustic model by positioning a cursor on the acoustic space of the desired speech style and on the desired segment region from among the segment regions obtained by dividing the acoustic space which contains the system user's speech data by the technique according to the second embodiment above. Consequently, information about the selected acoustic model is sent to the data process unit 37, which then sends the selected acoustic model to the information processing terminal 350. Since the performance of acoustic models vary, for example, with the target speaker's manner of speaking, types of word uttered by the target speaker, timing of utterance, environment of utterance, target speaker's physical condition, etc., current acoustic models may not offer sufficient recognition performance if the target speaker is in poor physical condition or the environment of utterance changes abruptly. In such a case, it is possible to improve recognition performance by evaluating the acoustic models currently in use and replacing them with new acoustic models based on the results of evaluation.

Figure 40:
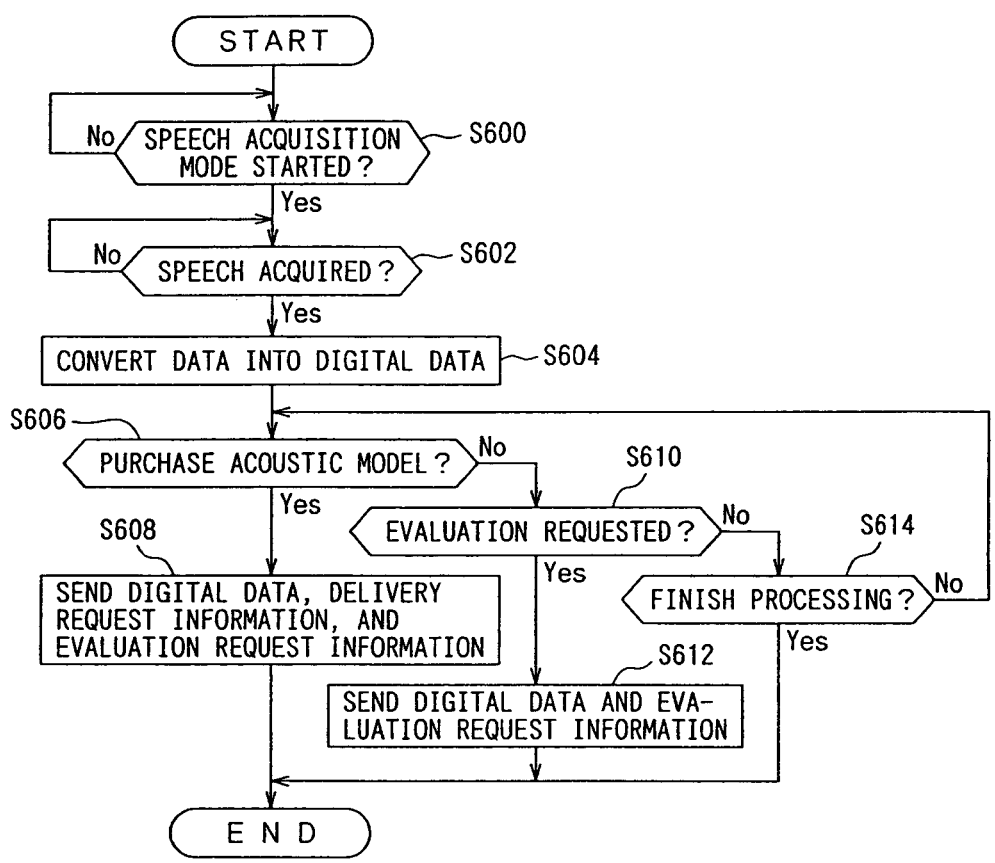
FIG. 40 is a flowchart showing a data sending process performed by the information processing terminal 350.

Now, flow of a data sending process performed by the information processing terminal 350 will be described with reference to FIG. 40. FIG. 40 is a flowchart showing the data sending process performed by the information processing terminal 350.

As shown in FIG. 40, first in Step S600, the first data control section 350b judges whether speech acquisition mode is active. If it is found that the speech acquisition mode is active (Yes), the first data control section 350b goes to Step S602. Otherwise (No), it waits until the speech acquisition mode is activated.

In Step S602, the first data control section 350b judges whether speech data has been acquired via the speech data acquiring section 350a. If it is found that speech data has been acquired (Yes), the first data control section 350b goes to Step S604. Otherwise (No), it waits until speech data is acquired.

In Step S604, the first data control section 350b converts the acquired speech data (analog data) into digital data. Then, it goes to Step S606.

In Step S606, the first data control section 350b judges whether the system user has indicated his/her intention to purchase an acoustic model by operating the operating section 350e. If it is found that the system user wants to purchase an acoustic model (Yes), the first data control section 350b goes to Step S608. Otherwise (No), it goes to Step S610.

In Step S608, the first data control section 350b sends the digital speech data in combination with delivery request information (containing identification information) and evaluation request information to the data process unit 37 via the first data communications section 350c, and then it finishes processing.

On the other hand, in Step S610, the first data control section 350b judges whether the system user has made an evaluation request by operating the operating section 350e. If it is found that the system user has made an evaluation request (Yes), the first data control section 350b goes to Step S612. Otherwise (No), it goes to Step S614.

In Step S612, the first data control section 350b sends the digital speech data in combination with the evaluation request information containing the identification information to the data process unit 37 via the first data communications section 350c, and then it finishes processing.

On the other hand, in Step S614, the first data control section 350b judges whether the system user has specified via the operating section 350e that the processing be finished. If it is found that the processing has been specified to be finished (Yes), the first data control section 350b finishes processing. Otherwise (No), it goes to Step S606.

Figure 41:
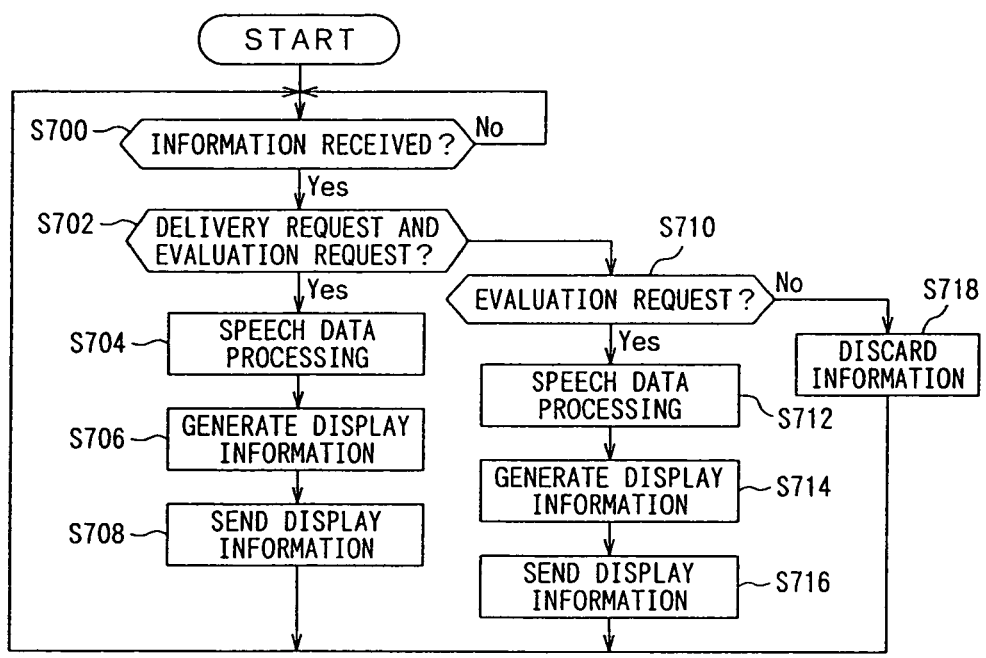
FIG. 41 is a flowchart showing operations and processes performed by the data process unit 37.

Now, with reference to FIG. 41, description will be given of flow of operations and processes performed by the data process unit 37 after generating a regional acoustic model. FIG. 41 is a flowchart showing the operations and processes performed by the data process unit 37.

As shown in FIG. 41, first in Step S700, the second data control section 1d' judges whether information has been received from the information processing terminal 350. If it is found that information has been received (Yes), the second data control section 1d' goes to Step S702. Otherwise (No), it waits until information is received.

In Step S702, the second data control section 1d' judges whether the received information contains delivery request information and evaluation request information. If it is found that they are contained (Yes), the second data control section 1d' goes to Step S704. Otherwise (No), it goes to Step S710.

In Step S704, the second data control section 1d' performs the speech data processing, including searches for regional acoustic models and evaluation of acoustic models. Then, it goes to Step S706.

In Step S706, the second data control section 1d' generates display information based on results of the speech data processing in Step S704. Then, it goes to Step S708.

In Step S708, the second data control section 1d' sends the display information generated in Step S706 to the appropriate information processing terminal 350 via the second data communications section 37a. Then, it goes to Step S700.

On the other hand, if it is found in Step S702 that the received information does not contain delivery request information, the second data control section 1d' judges in Step S710 whether the received information contains evaluation request information. If it is found that evaluation request information is contained (Yes), the second data control section $1d'$ goes to Step S712. Otherwise (No), it goes to Step S718.

In Step S712, the second data control section $1d'$ performs the speech data processing, including searches for regional acoustic models and evaluation of acoustic models. Then, it goes to Step S714.

In Step S714, the second data control section $1d'$ generates display information based on results of the speech data processing in Step S712. Then, it goes to Step S716.

In Step S716, the second data control section $1d'$ sends the display information generated in Step S714 to the appropriate information processing terminal 350 via the second data communications section 37a. Then, it goes to Step S700.

On the other hand, if it is found in Step S710 that the received information does not contain evaluation request information either, the second data control section $1d'$ discards the received information in Step S718. Then, it goes to Step S700.

Figure 42:
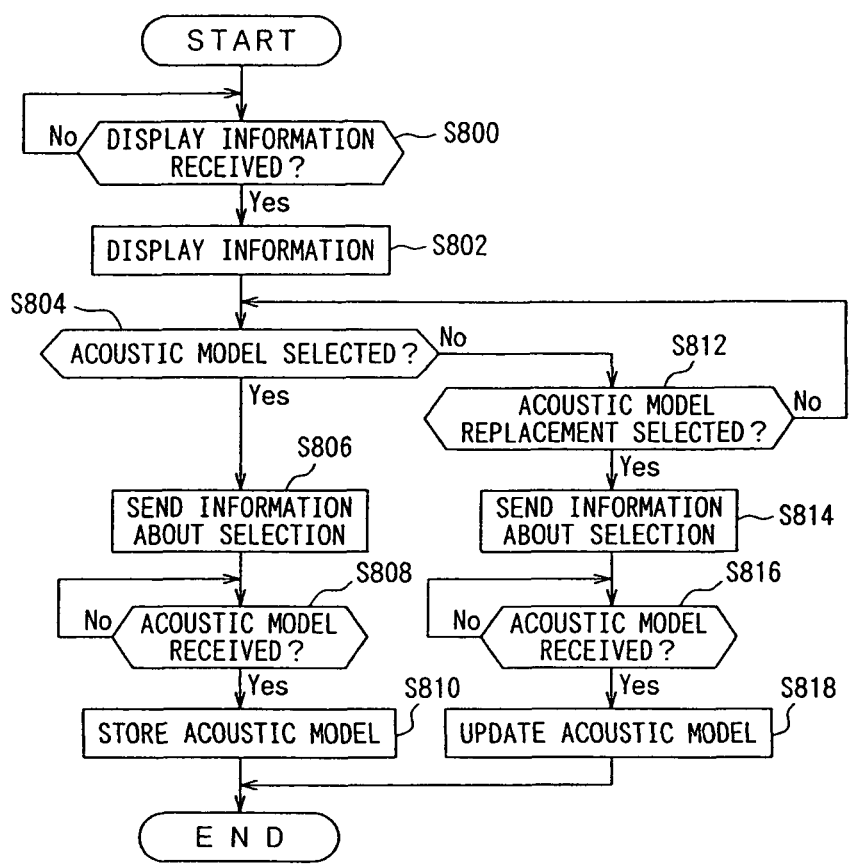
FIG. 42 is a flowchart showing operations and processes performed by the information processing terminal 350 when receiving display information.

Now, with reference to FIG. 42, description will be given of flow of operations and processes performed by the information processing terminal 350 when receiving display information. FIG. 42 is a flowchart showing the operations and processes performed by the information processing terminal 350 when receiving display information.

As shown in FIG. 42, first in Step S800, the first data control section 350b judges whether display information has been received from the data process unit 37. If it is found that display information has been received (Yes), the first data control section 350b goes to Step S802. Otherwise (No), it waits until display information is received.

In Step S802, the first data control section 350b makes the information display section 350d display information based on the received display information. Then, it goes to Step S804.

In Step S804, the first data control section 350b judges whether the system user has selected an acoustic model from the displayed menu by operating the operating section 350e. If it is found that an acoustic model has been selected (Yes), the first data control section 350b goes to Step S806. Otherwise (No), it goes to Step S812.

In Step S806, the first data control section 350b sends information about the selected acoustic model to the data process unit 37 via the first data communications section 350c. Then, it goes to Step S808.

In Step S808, the first data control section 350b judges whether the selected acoustic model has been received from the data process unit 37. If it is found that the selected acoustic model has been received (Yes), the first data control section 350b goes to Step S810. Otherwise (No), it waits until the selected acoustic model is received.

In Step S810, the first data control section 350b stores the received acoustic model in a memory section (not shown), and then it finishes processing.

On the other hand, if it is found in Step S804 that no acoustic model has been selected, the first data control section 350b judges in Step S812 whether the system user has selected replacement of the acoustic model from the displayed menu by operating the operating section 350e. If it is found that the system user has selected acoustic-model replacement (Yes), the first data control section 350b goes to Step S814. Otherwise (No), it goes to Step S804.

In Step S814, the first data control section 350b sends information about the selection of acoustic-model replacement to the data process unit 37 via the first data communications section 350c. Then, it goes to Step S816.

In Step S816, the first data control section 350b judges whether the selected acoustic model has been received from the data process unit 37. If it is found that the selected acoustic model has been received (Yes), the first data control section 350b goes to Step S818. Otherwise (No), it waits until the selected acoustic model is received.

In Step S818, the first data control section 350b updates the current acoustic model with the received acoustic model, and then it finishes processing.

In the third embodiment described above, the speech data sending process performed by the first data control section 350b and first data communications section 350c corresponds to the speech data sending means, the acoustic model receiving process performed by the first data control section 350b and first data communications section 350c corresponds to the specific pattern model acquiring means, and the acoustic model delivery process performed by the second data control section $1d'$ and second data communications section 37a corresponds to the specific pattern model sending means.

Fourth Embodiment

A fourth embodiment of the present invention will be described with reference to drawings. FIGS. 43 to 50 are diagrams showing a data process system according to the fourth embodiment of the present invention.

First, a configuration of a data process system according to the present invention will be described with reference to FIG. 43. FIG. 43 is a block diagram showing a configuration of a data process system according to the present invention.

As shown in FIG. 43, the data process system 7 comprises information processing terminals 2A to 2C, a data process unit 3, and a network 4.

The information processing terminals 2A to 2C are under the control of system users A to C. They have a function to acquire speech data of the respective system users and send the speech data to the data process unit 3 via the network 4, a function to display the information acquired from the data process unit 3, and a function to negotiate with the data process unit 3 over whether speech data can be provided. According to this embodiment, hardware and software are installed on information processing units such as PCs and WSs to implement the above functions. Detailed configuration will be described later.

The data process unit 3 comprises a function to evaluate the value of speech data acquired from the information processing terminals 2A to 2C via the network 4, a function to display positional information of the acquired speech data in an acoustic space composed of pattern models of a plurality of speakers as well as the evaluation results, and a function to negotiate with the information processing terminals 2A to 2C over whether speech data can be provided via the network 4. Detailed configuration will be described later.

The network 4 is a LAN or WAN which connects a plurality of information processing devices so as to be ready for data communications with each other. This embodiment uses the Internet, which is a type of WAN.

Figure 44:
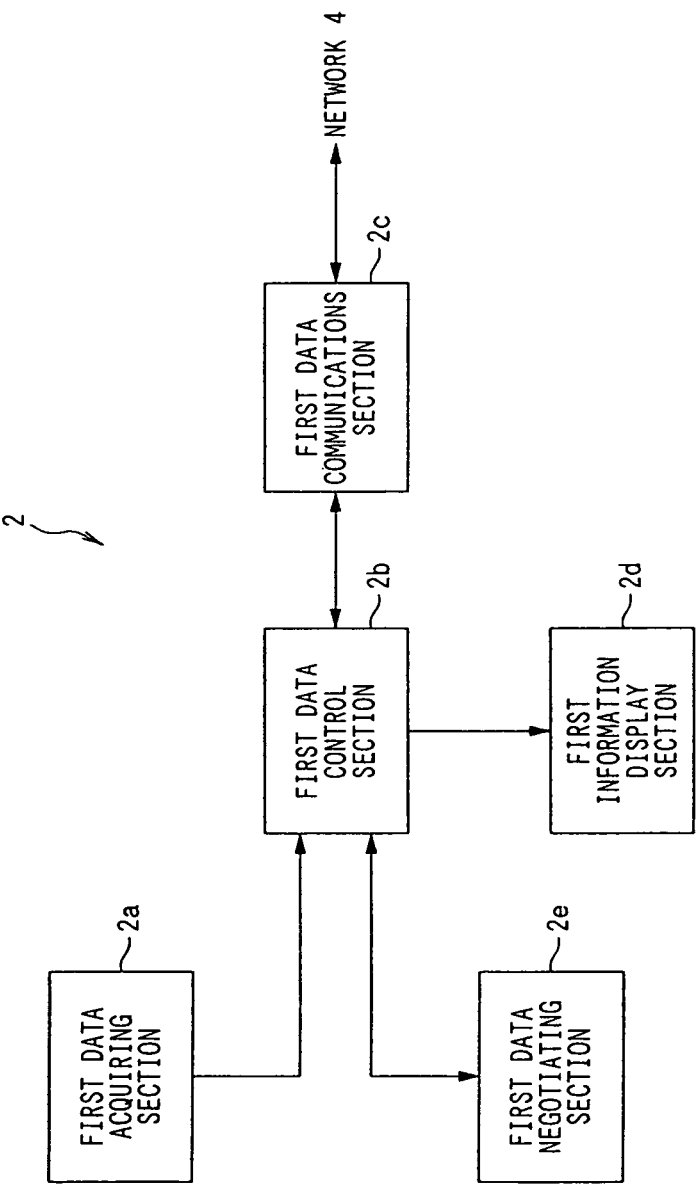
FIG. 44 is a diagram showing a detailed configuration of an information processing terminal 2.

Now, detailed configuration of the information processing terminals 2A to 2C will be described with reference to FIG. 44. FIG. 44 is a diagram showing a detailed configuration of an information processing terminal 2. According to this embodiment, the information processing terminals 2A to 2C have the same configuration and they will be referred to correctively as the information processing terminal 2. Hereinafter, items common to the information processing terminals 2A to 2C will be referred to the information processing terminal 2 called collectively. Also, as shown in FIG. 43, information processing terminals are not limited to the three ones 2A to 2C, and it is possible to connect other information processing terminals which are under the control of other system users.

As shown in FIG. 44, the information processing terminal 2 comprises a first data acquiring section 2a, first data control section 2b, first data communications section 2c, first information display section 2d, and first negotiating section 2e.

The first data acquiring section 2a comprises means such as a microphone for acquiring speech (analog data) uttered by a target speaker and means such as an A/D converter for converting the analog data (speech) into digital data.

The first data control section 2b comprises functions to control processes of various components, including a function to control the process of sending the speech data acquired by the first data acquiring section 2a to the data process unit 3 via the first data communications section 2c, a function to control the process of displaying the information acquired from the data process unit 3 in the first information display section 2d, and a function to control negotiation processes between the first negotiating section 2e and data process unit 3.

The first data communications section 2c has a function to conduct various data communications with the data process unit 3 via the network 4 under the control of the first data control section 2b.

The first information display section 2d has a function to display information including various information acquired from the data process unit 3 under the control of the first data control section 2b.

The first negotiating section 2e has a function to negotiate with the data process unit 3 over whether speech data can be provided via the network 4, under the control of the first data control section 2b. The negotiations here are conducted in order for the system user to exchange messages with an operator of the data process unit 3 using software with chat capabilities, or for the data process unit 3 to automatically send information (evaluation results, messages, etc.) prepared in advance for valuable speech data to the information processing terminal 2 and for the system user who views the information to return a response. In short, they are conducted in order for the system user to judge whether his/her speech data can be provided and return the result of judgment to the data process unit 3.

Now, detailed configuration of the data process unit 3 will be described with reference to FIG. 45. FIG. 45 is a diagram showing a detailed configuration of a data process unit 3.

As shown in FIG. 45, the data process unit 3 comprises a second data communications section 3a, second data acquiring section 3b, second data control section 3c, position calculating section 3d, data evaluating section 3e, second information display section 3f, second negotiating section 3g, operating section 3h, and data storing section 3i.

The second data communications section 3a has a function to conduct various data communications with the information processing terminal 2 via the network 4 under the control of the second data control section 3c.

The second data acquiring section 3b has a function to acquire speech data from the information processing terminal 2 via the second data communications section 3a and also has means for analyzing the acquired speech data and extracting feature data which are a characteristic part of the speech data. It also has means for generating pattern models of a target speaker by constructing HMMs based on the extracted feature data. Incidentally, according to this embodiment, both feature data and target speaker's pattern models are referred to as speech data.

The second data control section 3c has a function to control data exchange between various components of the data process unit 3 as well as to control flow of processes.

The position calculating section 3d has a function to calculate positional relationship between acquired speech data and pattern models of a plurality of speakers.

Specifically, if the feature data are speech data, the likelihoods of matches between the speech data and the pattern models of the plurality of speakers stored in the data storing section 3i (described later) is calculated, the pattern model with the highest likelihood is selected from the pattern models of the plurality of speakers based on the calculation results, and the pattern model is treated as being equivalent to the speech data of the target speaker. According to this embodiment, the pattern models of the plurality of speakers consist of HMMs and their relative position is determined based on a specific pattern model (or possibly a pattern model which corresponds to the speech data of the target speaker) selected from among them. Then, an acoustic space is formed from the pattern models which have information about their relative position.

Thus, in this case, the information about the relative position of the selected pattern model is used as positional information about the target speaker's speech data.

On the other hand, if the pattern models generated by constructing HMMs from feature data are speech data, the relative position between the speech data and the pattern models is calculated and the calculation results are used as positional information about the speech data.

If the feature data are speech data, the data evaluating section 3e calculates the mathematical distance between the selected pattern model and other pattern models of the plurality of speakers, compares the calculated distances with a predetermined threshold Th of the mathematical distance, and evaluates the value of the target speaker's speech data based on the comparison results. For example, if the pattern models existing within the threshold Th are small in number, the speech data of the target speaker exists in a non-dense space, where there are not much speech data with similar features, and scarcity value is considered to be high. On the other hand, if the pattern models existing within the threshold Th are large in number, the speech data of the target speaker exists in a dense space, where there are much speech data with similar features, and scarcity value is considered to be low. According to this embodiment, Euclidean distance given by Equation (8) below or Bhattacharrya distance given by Equation (9) below is used as the mathematical distance.

(Formula 5)

$$X = \frac{1}{L}\sum_{l=1}^{L} \sqrt{\frac{1}{J}\sum_{j=1}^{J} \frac{(\mu_{Ajl} - \mu_{Bjl})^2}{(\sum_{Ajl} \times \sum_{Bjl})^{\frac{1}{2}}}} \quad (8)$$

-continued $$X = \frac{1}{L}\sum_{l=1}^{L}\sqrt{\frac{1}{J}\sum_{j=1}^{J}\left[\frac{1}{8}(\mu_{Ajl} - \mu_{Bjl})'\left(\frac{\sum_{Ajl} \times \sum_{Bjl}}{2}\right)^{-1}(\mu_{Ajl} - \mu_{Bjl}) + \frac{1}{2}\ln\frac{\left|\left(\sum_{Ajl} + \sum_{Bjl}\right)/2\right|}{\left|(\sum_{Ajl}|^{\frac{1}{2}}|\sum_{Bjl}|^{\frac{1}{2}})\right|}\right]} \quad (9)$$

where J is the number of dimensions, L is the number HMM of states, μ is an average HMM output probability, and Σ is the variance of HMM output probabilities.

Here the mathematical distance can be calculated on a phoneme-by-phoneme basis and the value of speech data can be evaluated on a phoneme-by-phoneme basis as well. This embodiment allows the system user to enable and disable such a setting freely.

The second information display section 3f has a function to display information such as evaluation results produced by the data evaluating section 3e. The information displayed here includes information obtained through quantification of evaluation results, information obtained by projecting the distance relationship among HMM-based pattern models two-dimensionally by Sammon's method based on the calculated mathematical distance among the pattern models, and other information.

The second negotiating section 3g has a function to negotiate with the information processing terminal 2 over whether speech data can be provided via the network 4, under the control of the second data control section 3c.

The operating section 3h is used by the operator who views information displayed in the second information display section 3f to enter inputs when determining whether to negotiate with the system user or exchanging messages with the system user.

The data storing section 3i stores the pattern models of a plurality of speakers, the speech data over which negotiations are completed successfully, and other necessary data.

According to this embodiment, although they are not shown, the data process unit 3 is equipped with a processor, RAM (Random Access Memory), and ROM (Read Only Memory) storing dedicated programs. The above components are controlled as the processor executes the dedicated programs.

Now, more concrete operation of the data process system 7 will be described with reference to FIGS. 46 and 47. FIGS. 46A and 46B are diagrams showing flows of an initial-database construction process and data evaluation process performed by the data process system 7. FIG. 47 is a diagram showing an example in which an acoustic space is projected two-dimensionally.

Figures 46A, 46B:
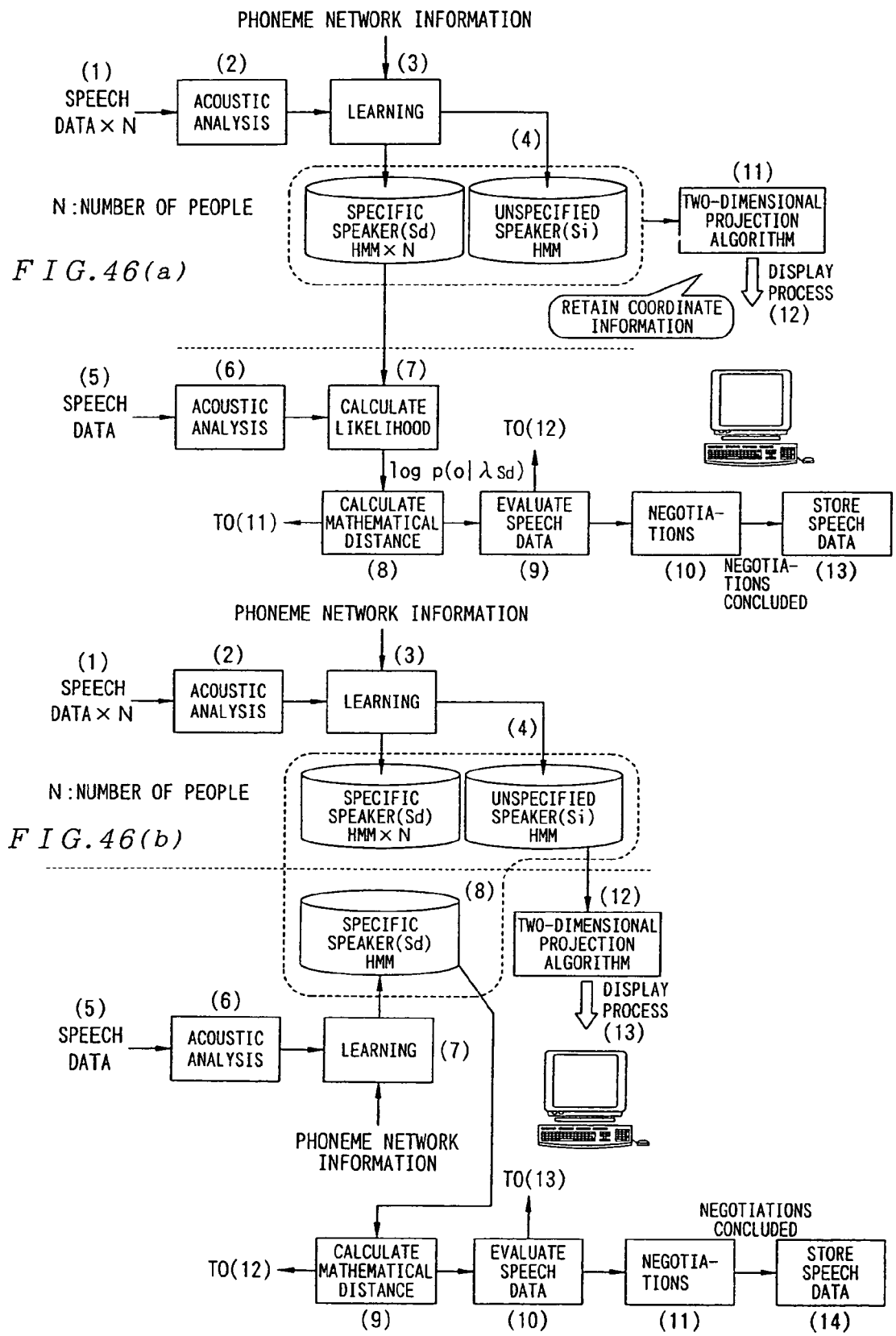
FIGS. 46A and 46B are diagrams showing flows of an initial-database construction process and data evaluation process on a data process system 7.
Figure 47:
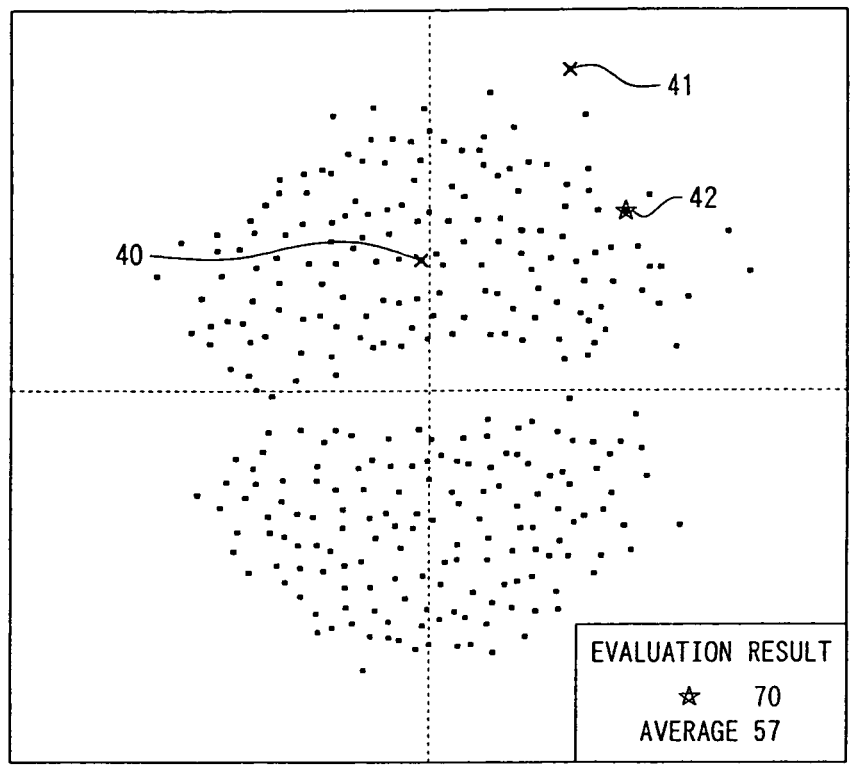
FIG. 47 is a diagram showing an example in which an acoustic space is projected two-dimensionally.
Figure 47:
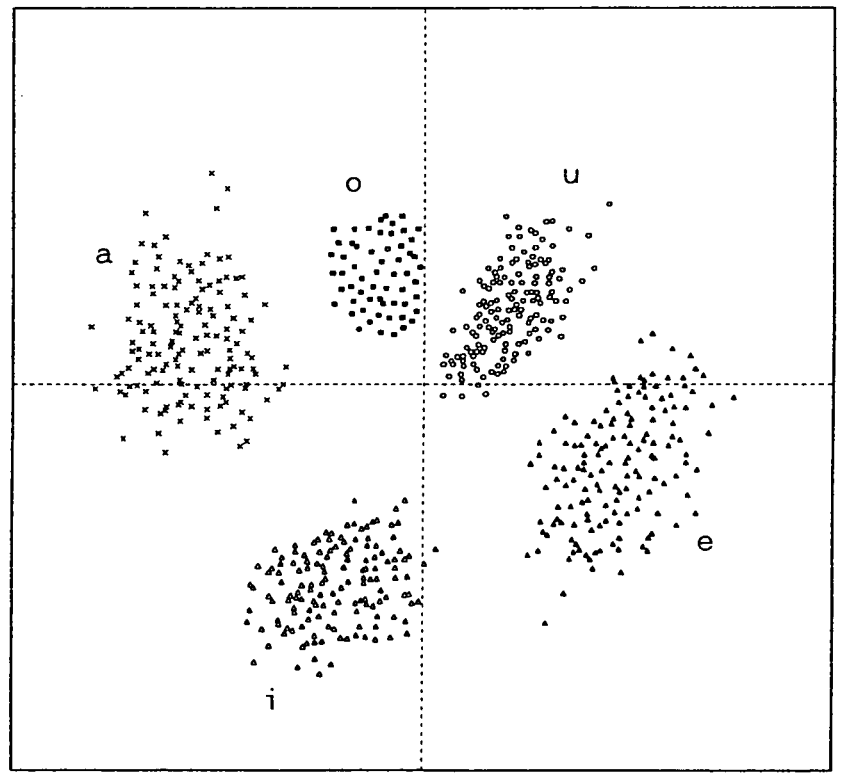

With reference to FIGS. 46A and 47, description will be given below of a first configuration of the initial-database construction process and data evaluation process in the case where feature data are constituted of speech data.

First, description will be given of flow of the initial-database construction process—shown in (1) to (4) in FIG. 46A—needed for the evaluation process. If an initial database already exists, steps (1) to (4) are not necessary.

(1) The second data acquiring section 3b acquires speech of N (N is an integer) registered speakers.

(2) The second data acquiring section 3b analyzes the acquired speech and extracts feature values.

(3) The second data acquiring section 3b generates HMMs for specific speakers and unspecified speakers based on the extracted feature values and does learning using a predetermined learning technique in order to generate a pattern model for each specific speaker and a pattern model for unspecified speakers.

(4) The second data acquiring section 3b stores the pattern models (HMMs) for N specific speakers and a pattern model (HMM) for unspecified speakers in the data storing section 3i.

Next, description will be given of flow of the speech data evaluating process shown in (5) to (10) in 46A.

(5) The second data acquiring section 3b acquires speech data of the system user from the information processing terminal 2.

(6) The second data acquiring section 3b analyzes the acquired speech data and extracts feature values.

(7) The position calculating section 3d calculates the likelihoods of matches between the extracted feature data and pattern models of the plurality of specific speakers. It is assumed here that content of utterances is known (inputted at the time of utterance).

(8) The position calculating section 3d selects the pattern model with the highest likelihood based on the calculated likelihoods and calculates the mathematical distance between this pattern model and the pattern models of the other specific speakers. The top M pattern models may be used (M is an integer smaller than N). In that case, the mathematical distance from the pattern models of the other specific speakers is calculated for each of the selected M pattern models. According to this embodiment, when the mathematical distance is calculated, coordinate data can be displayed by two-dimensional projection (as shown in FIG. 47) through steps (11) and (12) described later, based on the calculated mathematical distance, so that the operator can see positional relationship of speech data visually.

(9) The data evaluating section 3e evaluates the value of the speech data based on the calculated mathematical distance. Specifically, if there are many pattern models whose mathematical distance from the pattern model of the target speaker is below the threshold Th, the data evaluating section 3e determines that there are many pattern models with similar acoustic characteristics around the pattern model of the target speaker. On the other hand, if there are a small number of pattern models whose mathematical distance is below the threshold Th, the data evaluating section 3e determines that there are a small number of acoustically similar pattern models around the given pattern model.

Thus, speech data around which there are a large number pattern models with similar acoustic characteristics are considered to have a low scarcity value and speech data around which there are a small number of pattern models with similar acoustic characteristics are considered to have a high scarcity value.

Evaluation result information is sent, for example, to the information processing terminal 2A if the target speaker is the system user A, via the second data communications section 3a.

According to this embodiment, if scarcity value is considered to be high, the evaluation result information contains information about positional relationship projected two-dimensionally, information (numerals, the degree of scarcity value, etc.) which indicates the evaluation results, and information about an intention to acquire the speech data and if scarcity value is considered to be low, the evaluation result information contains information about positional relationship projected two-dimensionally, information (numerals, the degree of scarcity value, etc.) which indicates the evaluation results, information about an intention not to acquire the speech data, and information about characteristics of the speech data desired to be acquired. The information about characteristics of the speech data desired to be acquired includes information about the manner of speaking such as whispers, speech uttered in a lying position, etc.

The use of the top M pattern models in the calculation of the mathematical distance allows for mistakes in selected pattern models. The number of other speakers existing within the threshold Th is determined in relation to each of the M pattern models and the average is used for the evaluation described above.

Incidentally, although according to this embodiment, the evaluation described above is made automatically by the data evaluating section 3e, the operator may make the evaluation by himself/herself based on the acoustic space displayed by two-dimensional projection and other display information.

If the speech data, is considered to have a high scarcity value, the data process system 7 goes to step (10) in FIG. 46A.

(10) The second negotiating section 3g negotiates with the information processing terminal 2 which is the sender of the speech data desired to be acquired. According to this embodiment, the data process unit 3 sends a predetermined message to the information processing terminal 2 via the network 4 and receives a response to the message from the system user via the network 4. In case the system user refuses to provide speech data desired to be acquired by all means, for example, the operator and system user may be allowed to conduct message-based negotiations by exchanging messages between the data process unit 3 and information processing terminal 2 via the network 4.

(11) The second information display section 3f two-dimensionally projects the distance relationship among all the pattern models (HMMs) by Sammon's method, a known method, based on the calculated mathematical distance.

(12) The second information display section 3f displays coordinate information about the two-dimensional projection of HMMs as points on a plane, as shown in FIGS. 47A and 47B. FIG. 47A shows coordinates of HMMs as points when the HMMs are treated on a word-by-word (or sentence-by sentence) basis. That is, each point represents a pattern model of each speaker and the distance between two points represents their similarity.

In FIG. 47A, there are may points around point 40, meaning that there are a large number of pattern models with similar acoustic characteristics, and thus it can be seen visually that the scarcity value is low.

On the other hand, point 41 is located at the edge of the acoustic space and there are few points around it, and thus it can be seen visually that the scarcity value is high.

FIG. 47B shows coordinates of HMMs as points when the HMMs are treated on a phoneme-by-phoneme basis ("a," "i,", "u," "e," and "o" in the figure). This makes it possible to evaluate the value of speech data visually on a phoneme-by-phoneme basis.

Furthermore, as described above, the density of pattern models or results of evaluation are quantified and resulting numerals are displayed as they are or as a graph. If the speech data of system user A is located at position ☆42 as shown in FIG. 47A, the value of the speech data is represented, for example, by numeral 70 as shown in the lower right-hand corner of the figure. If the average of this value is 57, it can be seen easily that the value of the speech data is higher than the average.

(13) If the negotiation with the system user is completed successfully in (10), the second data control section 3c stores the speech data of the target in the data storing section 3i.

According to this embodiment, the speech data are added to, and thereby stored in, the initial database (generated above) after being converted into HMM-based pattern models.

Now, with reference to FIGS. 46B and 47, description will be given below of a second configuration of an initial-database construction process and verification performance detecting process in the case where pattern models generated from feature data are constituted of speech data.

First, the initial-database construction process—shown in (1) to (4) in FIG. 46B—needed for speaker verification is the same as the first configuration in (1) to (4) of FIG. 46A, and thus description thereof will be omitted.

Next, description will be given of flow of the speech data evaluating process shown in (5) to (11) in FIG. 46B.

(5) The second data acquiring section 3b acquires speech data of the system user from the information processing terminal 2.

(6) The second data acquiring section 3b analyzes the acquired speech data and extracts feature values.

(7) The second data acquiring section 3b constructs HMMs based on the extracted feature data and does learning using a predetermined learning technique.

(8) The second data acquiring section 3b generates a pattern model of the target speaker's speech through HMM learning and stores it in the data storing section 3i.

(9) The position calculating section 3d calculates the mathematical distance between the generated pattern model of the target speaker and the pattern models of the other specific speakers. According to this embodiment, when the mathematical distance is calculated, coordinate data can be displayed by two-dimensional projection (as shown in FIG. 47) through steps (12) and (13) described later, based on the calculated mathematical distance, so that the operator can see positional relationship of speech data visually.

(10) The data evaluating section 3e evaluates the value of the speech data based on the calculated mathematical distance. Specifically, if there are many pattern models whose mathematical distance from the pattern model of the target speaker is below the threshold Th, the data evaluating section 3e determines that there are many pattern models with similar acoustic characteristics around the pattern model of the target speaker. On the other hand, if there are a small number of pattern models whose mathematical distance is below the threshold Th, the data evaluating section 3e determines that there are a small number of acoustically similar pattern models around the given pattern model.

Thus, speech data around which there are a large number pattern models with similar acoustic characteristics are considered to have a low scarcity value and speech data around which there are a small number of pattern models with similar acoustic characteristics are considered to have a high scarcity value.

Evaluation result information is sent, for example, to the information processing terminal 2B if the target speaker is the system user B, via the second data communications section 3a.

The use of the top M pattern models in the calculation of the mathematical distance allows for mistakes in selected pattern models. The number of other speakers existing within the threshold Th is determined in relation to each of the M pattern models and the average is used for the evaluation described above.

Incidentally, although according to this embodiment, the evaluation described above is made automatically by the data evaluating section 3e, the operator may make the evaluation by herself/herself based on the acoustic space displayed by two-dimensional projection and other display information.

If the speech data, is considered to have a high scarcity value, the data process system 7 goes to step (11) in FIG. 46B.

(11) The second negotiating section 3g negotiates with the information processing terminal 2 which is the sender of the speech data desired to be acquired. According to this embodiment, the data process unit 3 sends a predetermined message to the information processing terminal 2 via the network 4 and receives a response to the message from the system user via the network 4. In case the system user refuses to provide speech data desired to be acquired by all means, for example, the operator and system user may be allowed to conduct message-based negotiations (e.g., negotiations on amounts of money) by exchanging messages between the data process unit 3 and information processing terminal 2 via the network 4.

The process of displaying data in the acoustic space by two-dimensional projection and process of displaying evaluation results (shown in (12) and (13) in FIG. 46B) are the same as (11) and (12) in FIG. 46A according to the first configuration described above, and thus description thereof will be omitted.

Now, flow of operations and processes performed by the information processing terminal 2 will be described with reference to FIG. 48. FIG. 48 is a flowchart showing the operations and processes performed by the information processing terminal 2.

As shown in FIG. 48, first in Step S900, the information processing terminal 2 makes the first data control section 2b judge whether acquisition of speech data has started. If it is found that acquisition has started (Yes), the information processing terminal 2 goes to Step S902. Otherwise (No), it makes the first data control section 2b continue the judging process until acquisition is started.

In Step S902, the information processing terminal 2 makes the first data acquiring section 2a acquire speech (analog data) uttered by a target speaker (any of system users A to C, according to this embodiment). Then, it goes to Step S904.

In Step S904, the information processing terminal 2 makes the first data acquiring section 2a convert the acquired speech (analog data) into digital data. Then, it goes to Step S906.

In Step S906, the information processing terminal 2 makes the first data control section 2b send the digital speech data to the data process unit 3 via the first data communications section 2c. Then, it goes to Step S908.

In Step S908, the information processing terminal 2 makes the first data control section 2b judge whether results of evaluation of the speech data have been received from the data process unit 3 via the first data communications section 2c. If it is found that evaluation results have been received (Yes), the information processing terminal 2 goes to Step S910. Otherwise (No), it makes the first data control section 2b continue the judging process until evaluation results is received.

In Step S910, the information processing terminal 2 makes the first information display section 2d display the received evaluation results under the control of the first data control section 2b. Then, it goes to Step S912.

In Step S912, the information processing terminal 2 makes the first data control section 2b judge whether there is a negotiation request in relation to the received evaluation results. If it is found that there is a negotiation request (Yes), the information processing terminal 2 goes to Step S914. Otherwise (No), it goes to Step S918.

In Step S914, the information processing terminal 2 makes the first data control section 2b, first negotiating section 2e, and first data communications section 2c start a negotiation process to negotiate with the data process unit 3 over whether the speech data can be provided via the network 4. Then, it goes to Step S916.

In Step S916, the information processing terminal 2 makes the first data control section 2b, first negotiating section 2e, and first data communications section 2c send the data process unit 3 a decision as to whether the speech data can be provided, based on input information from the target speaker. Then, it goes to Step S918.

In Step S918, the information processing terminal 2 makes the first data control section 2b judge whether the speech data acquiring process should be finished. If it is found that the process should be finished (Yes), the information processing terminal 2 goes to Step S900. Otherwise (No), it goes to Step S902.

Here the judgment as to whether the process should be finished is made based on input information from the system user via an input device such as a mouse or keyboard (not shown).

Figure 49:
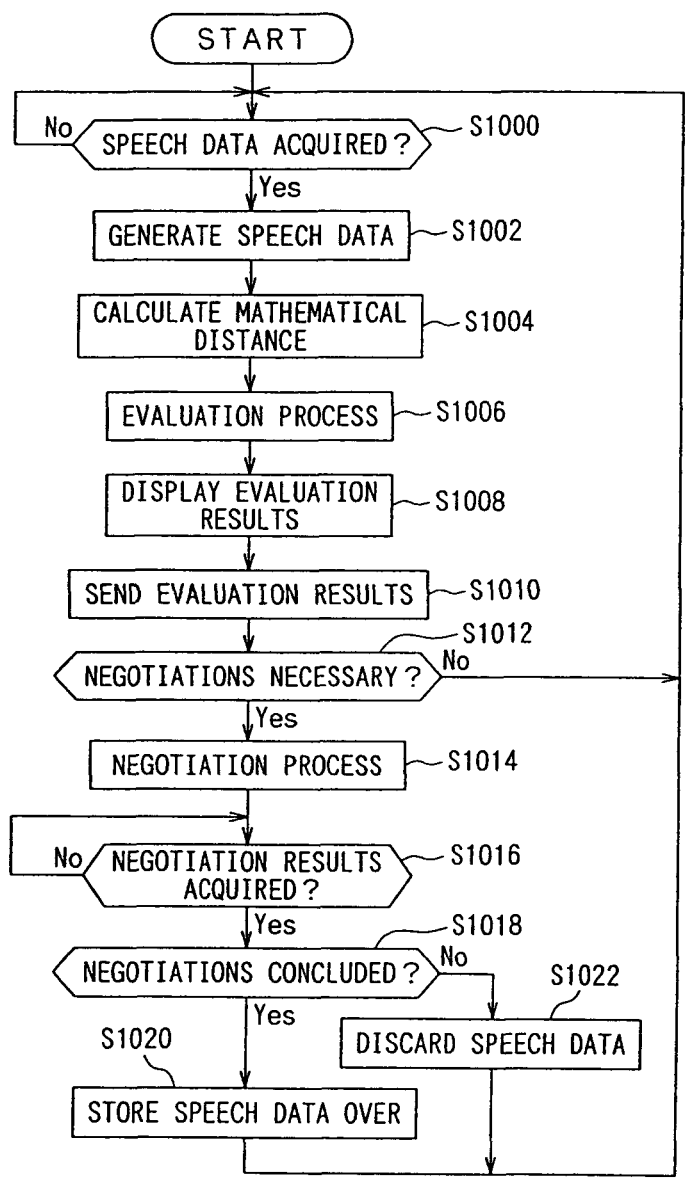
FIG. 49 is a flowchart showing operations and processes performed by the data process unit 3.

Now, flow of operations and processes performed by the data process unit 3 will be described with reference to FIG. 49. FIG. 49 is a flowchart showing the operations and processes performed by the data process unit 3.

As shown in FIG. 49, first in Step S1000, the data process unit 3 makes the second data control section 3c judge whether speech data has been acquired from the information processing terminal 2 via the second data communications section 3a. If it is found that speech data has been acquired (Yes), the data process unit 3 goes to Step S1002. Otherwise (No), it makes the second data control section 3c continue the judging process until speech data is acquired.

In Step S1002, the data process unit 3 makes the second data acquiring section 3b extract feature values from the acquired speech data. Then, it goes to Step S1004.

Incidentally, according to the first configuration, a pattern with the most similar acoustic characteristics is selected from pattern models of multiple speakers and designated as a pattern model of acquired speech based on likelihood calculation. On the other hand, according to the second configuration, a pattern model of acquired speech is generated from the extracted feature values.

In Step S1004, the data process unit 3 makes the position calculating section 3d calculate the mathematical distance between the pattern model of the acquired speech and the pattern models of the other speakers. Then, it goes to Step S1006.

In Step S1006, the data process unit 3 makes the data evaluating section 3e evaluate the value of the acquired speech data based on the calculated mathematical distance. Then, it goes to Step S1008.

In Step S1008, the data process unit 3 makes the second information display section 3f display the evaluation results. Then, it goes to Step S1010.

In Step S1010, the data process unit 3 makes the second data control section 3c send the evaluation results to the given information processing terminal 2 via the second data communications section 3a. Then, it goes to Step S1012.

In Step S1012, the data process unit 3 makes the second data control section 3c judge, based on the evaluation results, whether to conduct negotiations over provision of the speech data. If it is found that negotiations should be conducted (Yes), the data process unit 3 goes to Step S1014. Otherwise (No), it goes to Step S1000.

In Step S1014, the data process unit 3 makes the second data control section 3c, second negotiating section 3g, and second data communications section 3a conduct the negotiations with the information processing terminal 2 via the network 4. Then, it goes to Step S1016.

In Step S1016, the data process unit 3 makes the second data control section 3c judge whether negotiation results have been acquired from the given information processing terminal 2. If it is found that negotiation results have been acquired (Yes), the data process unit 3 goes to Step S1018. Otherwise (No), it makes the second data control section 3c continue the judging process until negotiation results are acquired.

In Step S1018, the data process unit 3 makes the second data control section 3c judge, based on the negotiation results, whether negotiations have been completed successfully. If it is found that negotiations have been completed successfully (Yes), the data process unit 3 goes to Step S1020. Otherwise (No), it goes to Step S1022.

In Step S1020, the data process unit 3 makes the second data control section 3c store the speech data over which negotiations have been completed successfully in the data storing section 3i. Then, it goes to Step S1000.

On the other hand, in Step S1022, the data process unit 3 makes the second data control section 3c discard the speech data over which negotiations have been unsuccessful. Then, it goes to Step S1000.

Now, with reference to FIG. 50, description will be given of flow of a display process performed by the second information display section 3f to display coordinate information through two-dimensional projection. FIG. 50 is a flowchart showing processes performed by the second information display section 3f to display coordinate information through two-dimensional projection.

As shown in FIG. 50, first in Step S1100, the second information display section 3f judges whether the position calculating section 3d has calculated the mathematical distance. If it is found that the mathematical distance has been calculated (Yes), the second information display section 3f goes to Step S1102. Otherwise (No), it waits until the mathematical distance is calculated.

In Step S1102, the second information display section 3f projects the mathematical distance between the pattern model of the target speaker's speech and pattern models of the other speakers two-dimensionally using Sammon's method, a known method. Then, it goes to Step S1104.

In Step S1104, the second information display section 3f displays coordinate information about the pattern models as points on a plane based on the mathematical distance, which is now two-dimensional information resulting from the two-dimensional projection. Then, it finishes processing.

In this way, the second data acquiring section 3b can acquire speech data of the target speaker, the position calculating section 3d and the data evaluating section 3e can evaluate the value of the speech data, the second information display section 3f can display the evaluation results as well as display the positional relationship between the pattern model of the target speaker's speech and pattern models of the other speakers as two-dimensional coordinates.

Also, the second negotiating section 3g of the data process unit 3 can negotiate with the first negotiating section 2e of the information processing terminal 2 over whether the speech data can be provided.

Also, the data process unit 3 can store the speech data over which negotiations have been completed successfully in the data storing section 3i.

In FIG. 44, the speech data acquiring process and transmit process performed by the first data acquiring section 2a, first data control section 2b, and first data communications section 2c correspond to the speech data sending means; and the information process performed by the first data control section 2b and first information display section 2d to display evaluation result information corresponds to the evaluation result display means.

In FIG. 45, the speech data acquiring process performed by the second data communications section 3a and second data acquiring section 3b corresponds to the speech data acquiring means; the position calculating section 3d corresponds to the position calculating means; the data evaluating section 3e corresponds to the speech data evaluating means; the second information display section 3f corresponds to the evaluation result display means and the positional relationship information display means; the second negotiating section 3g corresponds to the negotiating means; and the data storing section 3i corresponds to the speech data storing means.

Fifth Embodiment

A fifth embodiment of the present invention will be described with reference to drawings. FIGS. 51 to 59 are diagrams showing a data process system according to the fifth embodiment of the present invention.

Figure 51:
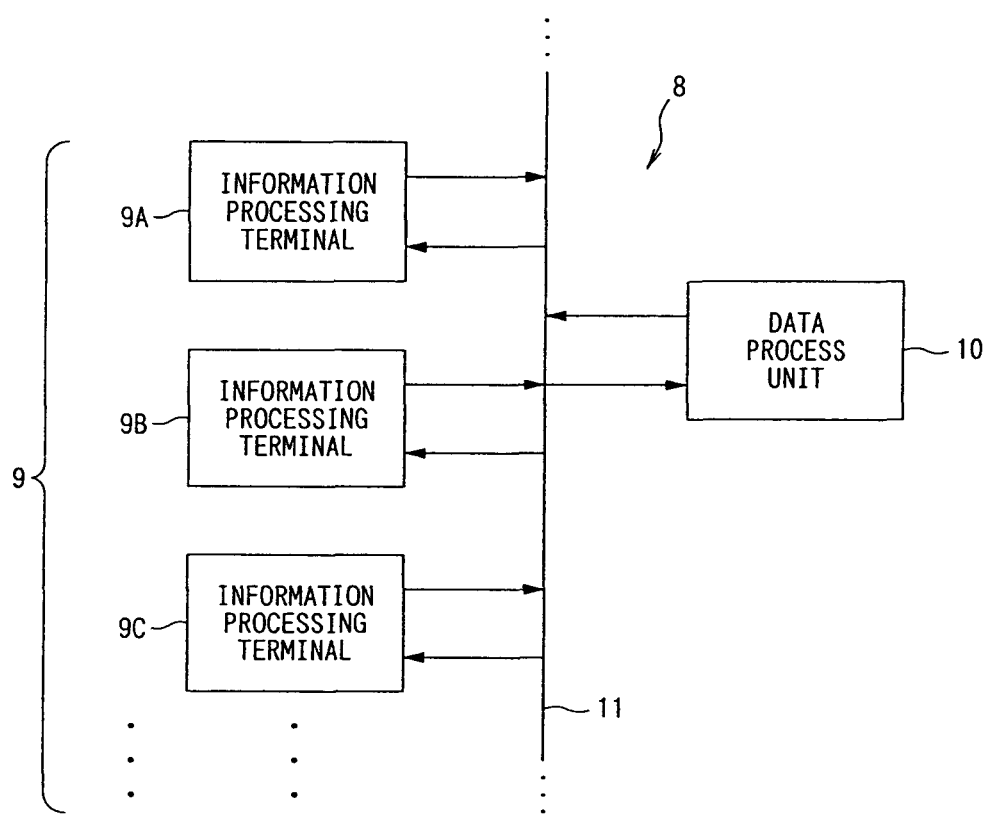
FIG. 51 is a block diagram showing a configuration of a data process system 8 according to the present invention.

First, a configuration of a data process system according to the present invention will be described with reference to FIG. 51. FIG. 51 is a block diagram showing a configuration of a data process system according to the present invention.

As shown in FIG. 51, the data process system 8 comprises information processing terminals 9A to 9C, a data process unit 10, and a network 11.

The information processing terminals 9A to 9C are under the control of system users A to C. They have a function to acquire speech data of the respective system users and send the speech data to the data process unit 10 via the network 11 and a function to display the information acquired from the data process unit 10. According to this embodiment, hardware and software are installed on information processing units such as PCs and WSs to implement the above functions. Detailed configuration will be described later.

The data process unit 10 comprises a function to evaluate the similarity between speech data acquired from the information processing terminals 9A to 9C via the network 11 and speech data of other speakers and a function to display positional information of the acquired speech data in an acoustic space composed of pattern models of a plurality of speakers as well as the evaluation results. Detailed configuration will be described later.

The network 11 is a LAN or WAN which connects a plurality of information processing devices so as to be ready for data communications with each other. This embodiment uses the Internet, which is a type of WAN.

Figure 52:
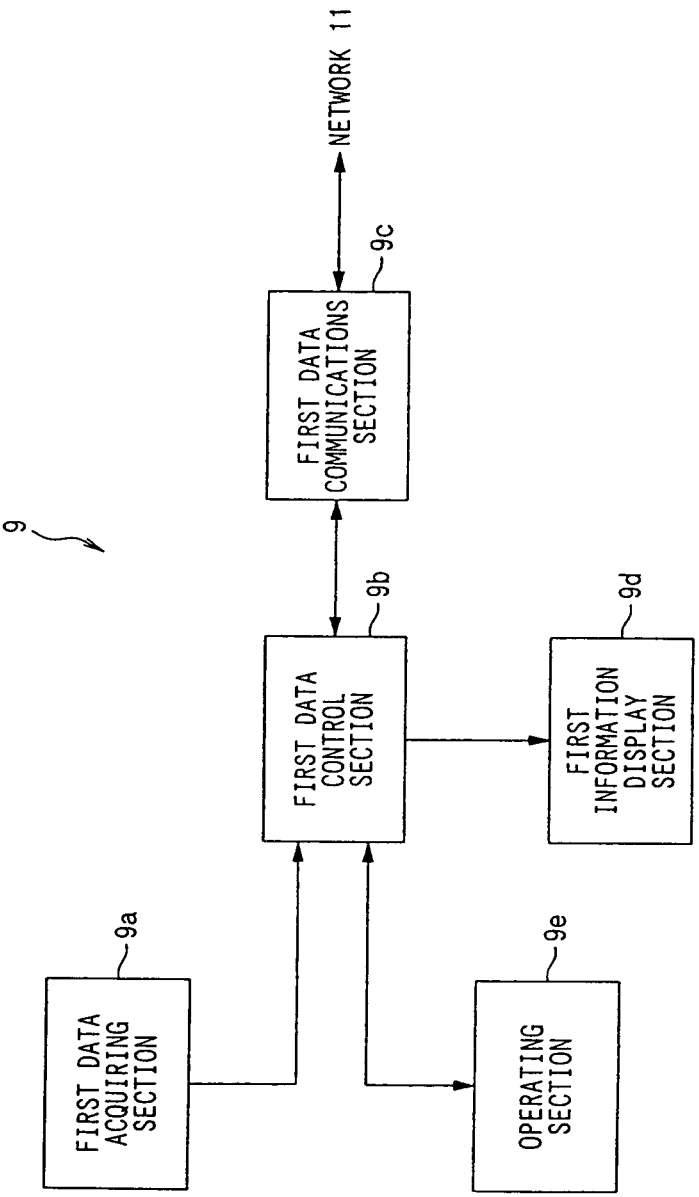
FIG. 52 is a diagram showing a detailed configuration of an information processing terminal 9.

Now, detailed configuration of the information processing terminals 9A to 9C will be described with reference to FIG. 52. FIG. 52 is a diagram showing a detailed configuration of an information processing terminal 9. According to this embodiment, the information processing terminals 9A to 9C have the same configuration and they will be referred to correctively as the information processing terminal 9. Hereinafter, items common to the information processing terminals 9A to 9C will be referred to the information processing terminal 9 called collectively. Also, as shown in FIG. 51, information processing terminals are not limited to the three ones 2A to 2C 9A to 9C, and it is possible to connect other information processing terminals which are under the control of other system users.

As shown in FIG. 52, the information processing terminal 9 comprises a first data acquiring section 9a, first data control section 9b, first data communications section 9c, first information display section 9d, and operating section 9e.

The first data acquiring section 9a comprises means such as a microphone for acquiring speech (analog data) uttered by a target speaker and means such as an A/D converter for converting the analog data (speech) into digital data.

The first data control section 9b comprises functions to control processes of various components, including a function to control the process of sending the speech data acquired by the first data acquiring section 9a to the data process unit 10 via the first data communications section 9c and a function to control the process of displaying the information acquired from the data process unit 10 in the first information display section 9d.

The first data communications section 9c has a function to conduct various data communications with the data process unit 10 via the network 11 under the control of the first data control section 9b.

The first information display section 9d has a function to display information including various information acquired from the data process unit 10 under the control of the first data control section 9b.

The operating section 9e allows the system user to enter information to specify a specific speaker or make settings for a speech data processing control program.

Figure 53:
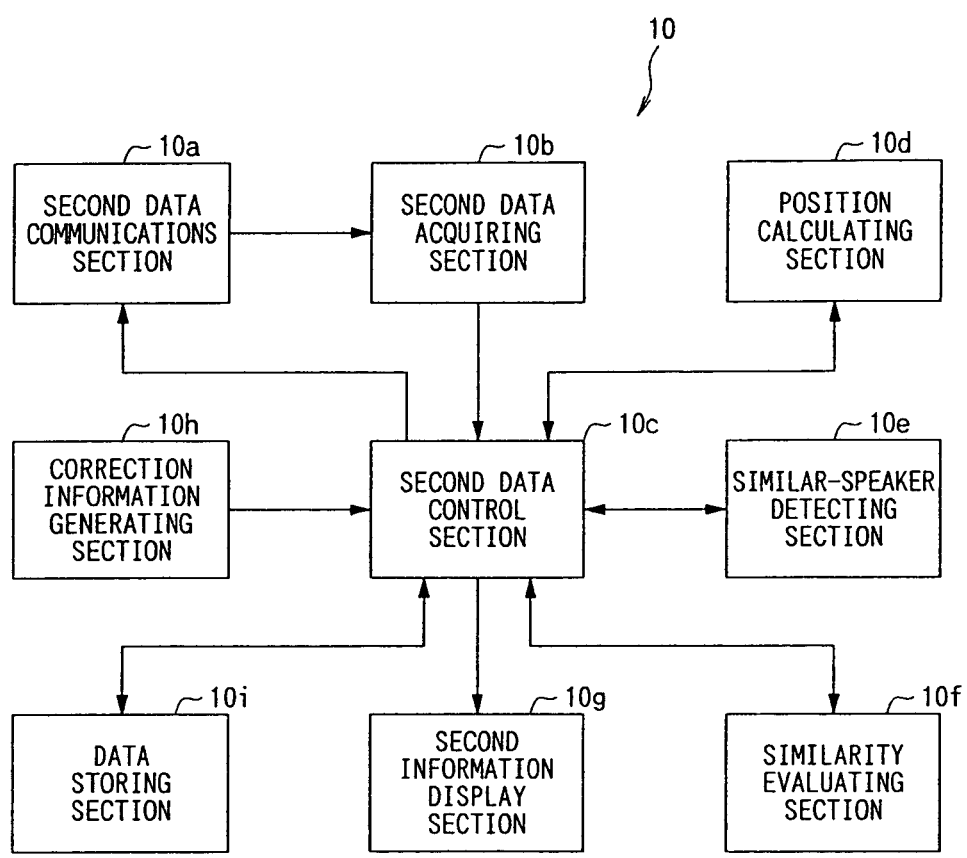
FIG. 53 is a block diagram showing a detailed configuration of a data process unit 10.

Now, detailed configuration of the data process unit 10 will be described with reference to FIG. 53. FIG. 53 is a block diagram showing a detailed configuration of the data process unit 10.

As shown in FIG. 53, the data process unit 10 comprises a second data communications section 10a, second data acquiring section 10b, second data control section 10c, position calculating section 10d, similar-speaker detecting section 10e, similarity evaluating section 10f, second information display section 10g, correction information generating section 10h, and data storing section 10i.

The second data communications section 10a has a function to conduct various data communications with the information processing terminal 9 via the network 11 under the control of the second data control section 10c.

The second data acquiring section 10b has a function to acquire speech data from the information processing terminal 9 via the second data communications section 10a and also has means for analyzing the acquired speech data and extracting feature data which are a characteristic part of the speech data. It also has means for generating pattern models of a target speaker by constructing HMMs based on the extracted feature data. Incidentally, according to this embodiment, both feature data and target speaker's pattern models are referred to as speech data.

The second data control section 10c has a function to control data exchange between various components of the data process unit 10 as well as to control flow of processes.

The position calculating section 10d has a function to calculate positional relationship between acquired speech data and pattern models of a plurality of speakers.

Specifically, if the feature data are speech data, the likelihoods of matches between the speech data and the pattern models of the plurality of speakers stored in the data storing section 10i (described later) is calculated, the pattern model with the highest likelihood is selected from the pattern models of the plurality of speakers based on the calculation results, and the pattern model is treated as being equivalent to the speech data of the target speaker. According to this embodiment, the pattern models of the plurality of speakers consist of HMMs and the irrelative position is determined based on a specific pattern model (or possibly a pattern model which corresponds to the speech data of the target speaker) selected from among them. Then, an acoustic space is formed from the pattern models which have information about their relative position.

Thus, in this case, the information about the relative position of the selected pattern model is used as positional information about the target speaker's speech data.

On the other hand, if the pattern models generated by constructing HMMs from feature data are speech data, the relative position between the speech data and the specific pattern model is calculated and the calculation results are used as positional information about the speech data.

If the feature data are speech data, the similar-speaker detecting section 10e calculates the mathematical distance between the selected pattern model and other pattern models of the plurality of speakers, compares the calculated distances with a predetermined threshold Th of the mathematical distance, detects such speech data that are within the threshold Th distance of the target speaker's speech data based on the comparison results, and designates the speakers whose speech data are within the threshold Th distance as similar speakers.

For example, of the speakers whose pattern models exist within the threshold Th, the speaker whose speech data are closest to the target speaker's speech data may be designated as a similar speaker, or the top few speakers in order of closeness to the target speaker's speech data may be designated as similar speakers. On the other hand, if no pattern model exists within the threshold Th, comparisons may be made again after changing the threshold or it may be determined that there is no similar speaker. According to this embodiment, Euclide an distance given by Equation (8) above or Bhattacharrya distance given by Equation (9) above is used as the mathematical distance.

Here the mathematical distance can be calculated on a phoneme-by-phoneme basis and the value of speech data can be evaluated on a phoneme-by-phoneme basis as well. This embodiment allows the system user to enable and disable such a setting freely.

The similarity evaluating section 10f calculates the mathematical distance between the pattern model of a specific speaker specified via the operating section 3h and the speech data of a target speaker, and evaluates the similarity in speech between the specific speaker and target speaker based on the calculated distance.

When building an acoustic space, pattern models are constructed from speech data produced in various speech styles such as in a high voice, in a low voice, rapidly, and slowly.

Thus, the similarity evaluations are made with respect to pattern models produced in a plurality of speech styles.

The second information display section 10g has a function to display information such as the detection results produced by the similar-speaker detecting section 10e and the evaluation results produced by the similarity evaluating section 10f. The information displayed here includes information obtained through quantification of evaluation results, information obtained by projecting the distance relationship among HMM-based pattern models two-dimensionally by Sammon's method based on the calculated mathematical distance among the pattern models, and other information.

The correction information generating section 10h generates correction information which indicates corrections to be made to the speech of the target speaker in order to enhance similarity in speech between the target speaker and the specific speaker based on the evaluation results produced by the similarity evaluating section 10f. The generated correction information is sent to the appropriate information processing terminal 9 by the first data control section 9b and second data communications section 10a. The correction information here is generated based, for example, on feature data acquired in advance from the target speaker's utterances and on evaluation results and contains information which indicates the shape of the mouth when forming words, where to put the accent, etc. in order to enhance similarity in speech between the target speaker and the specific speaker.

The data storing section 10i stores the pattern models of a plurality of speakers and other necessary data.

According to this embodiment, although they are not shown, the data process unit 10 is equipped with a processor, RAM (Random Access Memory), and ROM (Read Only Memory) storing dedicated programs. The above components are controlled as the processor executes the dedicated programs.

Figure 55:
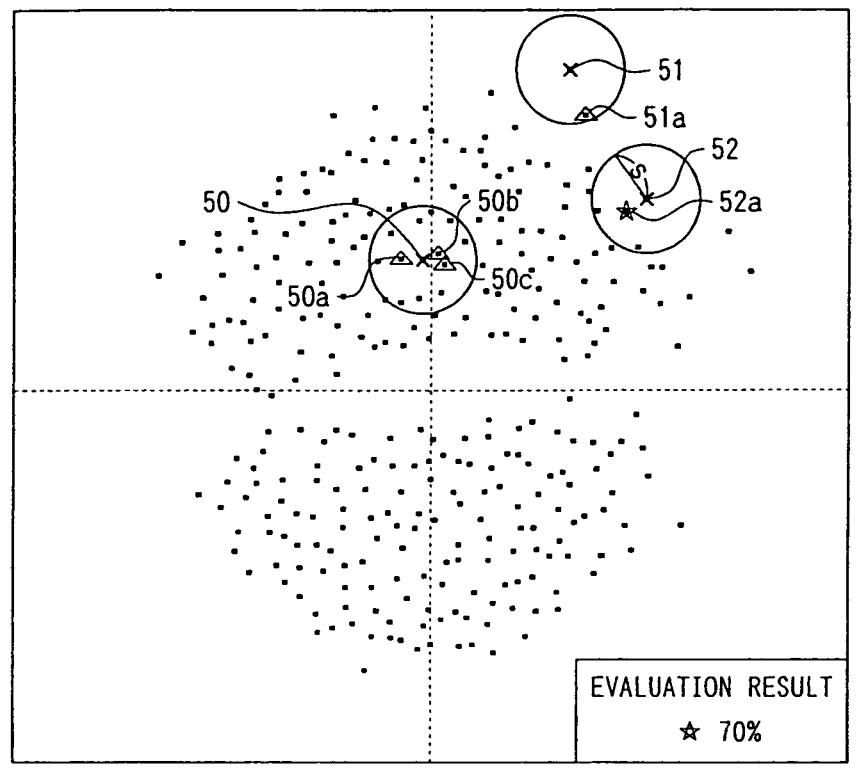
FIG. 55 is a diagram showing an example in which an acoustic space is projected two-dimensionally, where
Figure 55:
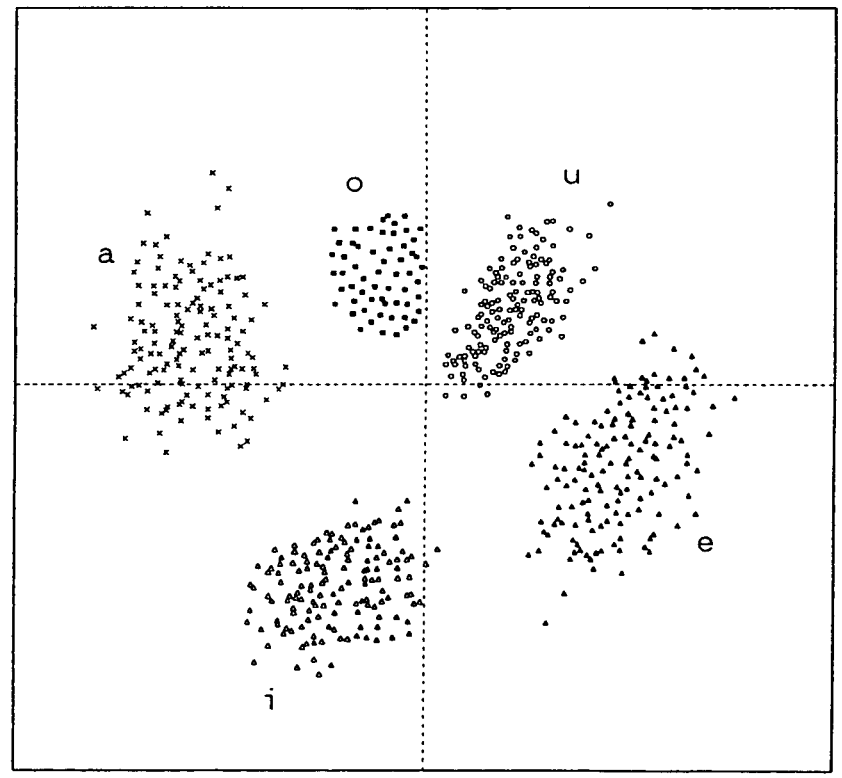
Figure 56:
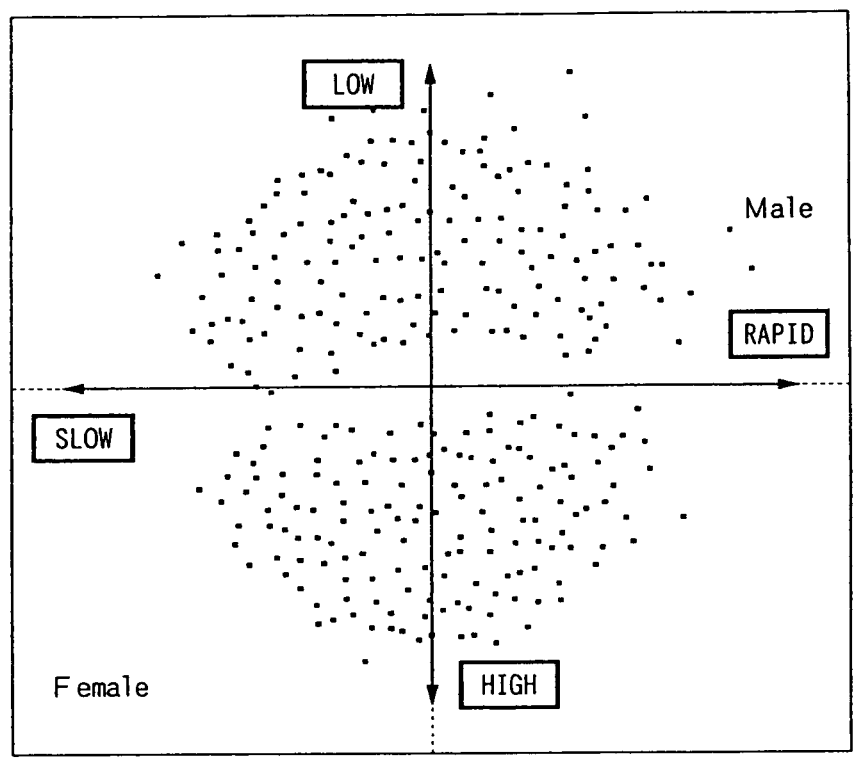
FIG. 56 is a diagram showing an example of two-dimensional projection with axes representing speech styles.

Now, more concrete operation of the data process system 8 will be described with reference to FIGS. 54 to 56. FIGS. 54A and 54B are diagrams showing flows of an initial-database construction process and data evaluation process performed by the data process system 8. FIG. 55 is a diagram showing an example in which an acoustic space is projected two-dimensionally, where FIG. 55A shows coordinates of HMMs as points when the HMMs are treated on a word-by-word (or sentence-by sentence) basis and FIG. 55B shows coordinates of HMMs as points when the HMMs are treated on a phoneme-by-phoneme basis ("a," "i," "u," "e," and "o" in the figure). FIG. 56 is a diagram showing an example of two-dimensional projection with axes representing speech styles.

With reference to FIGS. 54A and 55, description will be given below of a first configuration of an initial-database construction process, similar-speaker detecting process, and similarity evaluating process in the case where feature data are constituted of speech data.

First, description will be given of flow of the initial-database construction process—shown in (1) to (4) in FIG. 54A—needed for the evaluation process. If an initial database already exists, steps (1) to (4) are not necessary.

(1) The second data acquiring section 10b acquires speech of N (N is an integer) registered speakers. As described above, according to this embodiment, the second data acquiring section 10b acquires speech data produced in various speech styles such as in a high voice, in a low voice, rapidly, and slowly.

(2) The second data acquiring section 10b analyzes the acquired speech and extracts feature values.

(3) The second data acquiring section 10b generates HMMs for specific speakers and unspecified speakers based on the extracted feature values and does learning using a predetermined learning technique in order to generate a pattern model for each specific speaker and a pattern model for unspecified speakers.

(4) The second data acquiring section 10b stores the pattern models (HMMs) for N specific speakers and a pattern model (HMM) for unspecified speakers in the data storing section 10i.

Next, description will be given of flows of the similar-speaker detecting process and similarity evaluating process shown in (5) to (10) in FIG. 54A.

(5) The second data acquiring section 10b acquires speech data of the system user from the information processing terminal 9.

(6) The second data acquiring section 10b analyzes the acquired speech data and extracts feature values.

(7) The position calculating section 10d calculates the likelihoods of matches between the extracted feature data and pattern models of the plurality of specific speakers. It is assumed here that content of utterances is known (inputted at the time of utterance).

(8) The position calculating section 10d selects the pattern model with the highest likelihood based on the calculated likelihoods and calculates the mathematical distance between this pattern model and the pattern models of the other specific speakers. The top M pattern models may be used (M is an integer smaller than N). In that case, the mathematical distance from the pattern models of the other specific speakers is calculated for each of the selected M pattern models. According to this embodiment, when the mathematical distance is calculated, coordinate data can be displayed by two-dimensional projection (as shown in FIG. 55) through steps (12) and (13) described later, based on the calculated mathematical distance, so that the operator can see positional relationship of speech data visually.

(9) The similar-speaker detecting section 10e detects similar speakers based on the calculated mathematical distance. Specifically, it detects such pattern models that are within the threshold Th distance of the target speaker's pattern model. For example, if the target speaker's pattern model is represented by coordinate point 50 (indicated by "x") in FIG. 55A, similar speakers are detected from the pattern models existing within a circle with a radius of Th centered at the target speaker's pattern model. In this case, three pattern models 50a to 50c are selected in order of closeness to coordinate point 50 in FIG. 55A.

The speakers corresponding to the pattern models thus selected are detected as similar speakers who are similar in speech to the target speaker. The detection results are displayed by the second data control section 10c and second information display section 10g.

Information about the detection results is sent, for example, to the information processing terminal 9A if the target speaker is the system user A, via the second data communications section 10a.

According to this embodiment, the information about the detection results includes information about the similar speakers such as the names of the speakers corresponding to the selected pattern models and information about the positional relationship between the pattern model of the target speaker and pattern models of the similar speakers projected two-dimensionally.

The use of the top M pattern models in the calculation of the mathematical distance allows for mistakes in selected pattern models (e.g., cases in which the selected pattern models have characteristics far different from those of the target speaker's speech). In this case, other speakers whose pattern models exist within the threshold Th distance are selected and designated as similar speakers.

Incidentally, although according to this embodiment, the evaluation described above is made automatically by the similar-speaker detecting section 10e, the operator may make the evaluation by herself/herself based on the acoustic space displayed by two-dimensional projection and other display information.

Also, since the detecting process can be carried out separately for pattern models corresponding to each of a plurality of the speech styles described above, a similar speaker can be detected in each speech style, making it possible, for example, to detect a speaker who resembles the target speaker in speech style A, but not in speech style B. Consequently, it is possible to designate the speaker who resembles the target speaker in the largest number of speech as a similar speaker or designate the speaker who resembles the target speaker in each speech style separately as a similar speaker.

Once similar speakers are detected and data on them are sent to the information processing terminal 9, the information processing terminal 9 displays the acquired information. Specifically, the information processing terminal 9 displays information about the similar speakers and information about the positional relationship between the pattern model of the target speaker and pattern models of the similar speakers projected two-dimensionally. Upon viewing the displayed information, the system user specifies, by operating the operating section 9e, a specific speaker whose speech he/she wants to imitate. The specified information is sent to the data process unit 10, and the data process system 8 goes to step (10) in FIG. 54A.

(10) The similarity evaluating section 10f evaluates the similarity between the pattern model of the specific speaker specified by the system user (target speaker) and the pattern model of the target speaker.

For example, if the mathematical distance between the pattern model of the specific speaker and pattern model of the target speaker is short, the similarity is considered to be high, and if the mathematical distance is long, the similarity is considered to be low.

According to this embodiment, when the coordinates of the two pattern models coincide, their similarity rate is regarded to be 100% (exactly alike) and if the specific speaker's pattern model is S or more away from coordinate point 52 of the target speaker's pattern model, the similarity rate is regarded to be 0% (totally unlike). The distance between coordinate point 52 of the target speaker and coordinate point 52a of the specific speaker is displayed as the evaluation result in terms of the similarity rate (%) as shown in FIG. 55A.

Here, in evaluating the similarity of specific speakers' pattern models, each of the plurality of speech styles is treated separately.

Evaluation result information is sent, for example, to the information processing terminal 9B if the target speaker is the system user B, via the second data communications section 10a.

According to this embodiment, the evaluation result information includes evaluation results of specific speakers' pattern models in respective speech styles, information about the positional relationship between the pattern models of the specific speakers and pattern model of the target speaker projected two-dimensionally, and correction information (described later).

(11) The correction information generating section 10h generates correction information for the speech of the target speaker in order to enhance similarity in speech between the target speaker and the specific speaker based on the evaluation results produced by the similarity evaluating section 10f.

When generating the correction information, it is possible to acquire speech data of the target speaker anew or use the speech data acquired in steps (5) and (6).

The generated correction information is sent to the appropriate information processing terminal 9, being included in the evaluation result information.

Upon receiving the correction information, the information processing terminal 9 displays it via the first information display section 9d. Thus, by viewing the displayed correction information, the target speaker can do training to enhance the similarity of his/her own speech to the speech of the specific speaker.

(12) The second information display section 10g projects the distance relationship of all pattern models (HMMs) two-dimensionally using Sammon's method, a known method, based on the calculated mathematical distance (relative distance).

(13) The second information display section 10g displays coordinate information about the two-dimensional projection of the HMMs as points on a plane as shown in FIGS. 55A and 55B. That is, each point represents the pattern model of each speaker and the distance between two points represents their similarity (the shorter the distance, the higher the similarity).

FIG. 55B shows coordinates of HMMs as points when the HMMs are treated on a phoneme-by-phoneme basis ("a," "i," "u," "e," and "o" in the figure). This makes it possible to carry out the detection of similar speakers and evaluation of similarity visually on a phoneme-by-phoneme basis.

By adding information about speech styles to pattern models in respective speech styles, it is possible to form a two-dimensional acoustic space using elements of the speech styles (rate of speech and pitch of sound, in this case) as axes, as shown in FIG. 56. As the information processing terminal 9 performs a two-dimensional projection in real time using elements of the speech styles as axes, the target speaker can see changes in the position of his/her own speech data visually, and thereby easily learn a manner of speaking needed to imitate the speech of a desired specific speaker. However, for real-time display, a configuration in which the target speaker inputs his/her speech directly in the data process unit 10 is more suitable than the configuration in which the information processing terminal 9 is connected to the data process unit 10 via the Internet.

Now, with reference to FIGS. 54B and 55, description will be given of a second configuration of an initial-database construction process and verification performance detecting process in the case where pattern models generated from feature data are constituted of speech data.

First, the initial-database construction process—shown in (1) to (4) in FIG. 54B—needed for speaker verification is the same as the first configuration in (1) to (4) of FIG. 54A, and thus description thereof will be omitted.

Next, description will be given of flows of the similar-speaker detecting process and similarity evaluating process shown in (5) to (11) in FIG. 54B.

(5) The second data acquiring section 10b acquires speech data of the system user from the information processing terminal 9.

(6) The second data acquiring section 10b analyzes the acquired speech data and extracts feature values.

(7) The second data acquiring section 10b constructs HMMs based on the extracted feature data and does learning using a predetermined learning technique.

(8) The second data acquiring section 10b generates a pattern model of the target speaker's speech through HMM learning and stores it in the data storing section 10i.

(9) The position calculating section 10d calculates the mathematical distance between the generated pattern model of the target speaker and the pattern models of the other specific speakers. According to this embodiment, when the mathematical distance is calculated, coordinate data can be displayed by two-dimensional projection (as shown in FIG. 55) through steps (13) and (14) described later, based on the calculated mathematical distance, so that the operator can see positional relationship of speech data visually.

(10) The similar-speaker detecting section 10e detects similar speakers based on the calculated mathematical distance. Specifically, it detects such pattern models that are within the threshold Th distance of the target speaker's pattern model. For example, if the target speaker's pattern model is represented by coordinate point 50 (indicated by "x") in FIG. 55A, similar speakers are detected from the pattern models existing within a circle with a radius of Th centered at the target speaker's pattern model. In this case, three pattern models 50*a* to 50*c* are selected in order of closeness to coordinate point 50 in FIG. 55A.

The speakers corresponding to the pattern models thus selected are detected as similar speakers who are similar in speech to the target speaker. The detection results are displayed by the second data control section 2*c* and second information display section 10*g*.

Information about the detection results is sent, for example, to the information processing terminal 9A if the target speaker is the system user A, via the second data communications section 10*a*.

According to this embodiment, the information about the detection results includes information about the similar speakers such as the names of the speakers corresponding to the selected pattern models and information about the positional relationship between the pattern model of the target speaker and pattern models of the similar speakers projected two-dimensionally.

The use of the top M pattern models in the calculation of the mathematical distance allows for mistakes in selected pattern models (e.g., cases in which the selected pattern models have characteristics far different from those of the target speaker's speech). In this case, similar speakers are detected among other speakers whose pattern models exist within the threshold Th distance.

Incidentally, although according to this embodiment, the evaluation described above is made automatically by the similar-speaker detecting section 10*e*, the operator may make the evaluation by herself/herself based on the acoustic space displayed by two-dimensional projection and other display information.

Also, since the detecting process can be carried out separately for pattern models corresponding to each of a plurality of the speech styles described above, a similar speaker can be detected in each speech style, making it possible, for example, to detect a speaker who resembles the target speaker in speech style A, but not in speech style B. Consequently, it is possible to designate the speaker who resembles the target speaker in the largest number of speech as a similar speaker or designate the speaker who resembles the target speaker separately in each speech style as a similar speaker.

Once similar speakers are detected and data on them are sent to the information processing terminal 9, the information processing terminal 9 displays the acquired information. Specifically, the information processing terminal 9 displays information about the similar speakers and information about the positional relationship between the pattern model of the target speaker and pattern models of the similar speakers projected two-dimensionally. Upon viewing the displayed information, the system user specifies, by operating the operating section 9*e*, a specific speaker whose speech he/she wants to imitate. The specified information is sent to the data process unit 10, and the data process system 8 goes to step (11) in FIG. 54B.

(11) The similarity evaluating section 10*f* evaluates the similarity between the pattern model of the specific speaker specified by the system user (target speaker) and the pattern model of the target speaker.

For example, if the mathematical distance between the pattern model of the specific speaker and pattern model of the target speaker is short the similarity is considered to be high, and if the mathematical distance is long, the similarity is considered to be low.

According to this embodiment, when the coordinates of the two pattern models coincide, their similarity rate is regarded to be 100% (exactly alike) and if the specific speaker's pattern model is S or more away from coordinate point 52 of the target speaker's pattern model, the similarity rate is regarded to be 0% (totally unlike). The distance between coordinate point 52 of the target speaker and coordinate point 52*a* of the specific speaker is displayed as the evaluation result in terms of the similarity rate (%) as shown in FIG. 55A.

Here, in evaluating the similarity of specific speakers' pattern models, each of the plurality of speech styles is treated separately.

Evaluation result information is sent, for example, to the information processing terminal 9B if the target speaker is the system user B, via the second data communications section 10*a*.

According to this embodiment, the evaluation result information includes evaluation results of specific speakers' pattern models in respective speech styles, information about the positional relationship between the pattern models of the specific speakers and pattern model of the target speaker projected two-dimensionally, and correction information (described later).

(12) The correction information generating section 10*h* generates correction information for the speech of the target speaker in order to enhance similarity in speech between the target speaker and the specific speaker based on the evaluation results produced by the similarity evaluating section 10*f*.

When generating the correction information, it is possible to acquire speech data of the target speaker anew and use the speech data for the pattern model corresponding to the speech data, or use the speech data acquired in steps (5) and (6).

The generated correction information is sent to the appropriate information processing terminal 9, being included in the evaluation result information.

Upon receiving the correction information, the information processing terminal 9 displays it via the first information display section 9*d*. Thus, by viewing and following the displayed correction information, the target speaker can do training to enhance the similarity of his/her own speech to the speech of the specific speaker.

The process of displaying data in the acoustic space by two-dimensional projection and process of displaying evaluation results (shown in (13) and (14) in FIG. 54B) are the same as (12) and (13) in FIG. 54A according to the first configuration described above, and thus description thereof will be omitted.

Figure 57:
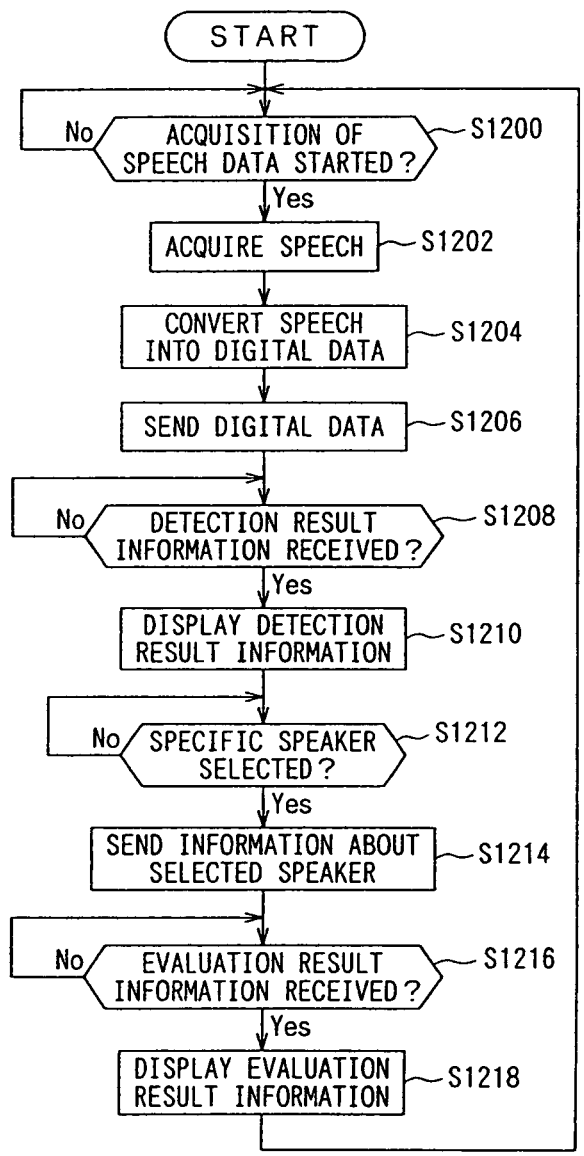
FIG. 57 is a flowchart showing operations and processes performed by the information processing terminal 9.

Now, with reference to FIG. 57, description will be given of operations and processes performed by the information processing terminal 9. FIG. 57 is a flowchart showing the operations and processes performed by the information processing terminal 9.

As shown in FIG. 57, first in Step S1200, the information processing terminal 9 makes the first data control section 9*b* judge whether acquisition of speech data has started. If it is found that acquisition has started (Yes), the information processing terminal 9 goes to Step S1202. Otherwise (No), it makes the first data control section 9*b* continue the judging process until acquisition is started.

In Step S1202, the information processing terminal 9 makes the first data acquiring section 9*a* acquire speech (analog data) uttered by a target speaker (any of system users A to C, according to this embodiment). Then, it goes to Step S1204.

In Step S1204, the information processing terminal 9 makes the first data acquiring section 9*a* convert the acquired speech (analog data) into digital data. Then, it goes to Step S1206.

In Step S1206, the information processing terminal 9 makes the first data control section 9*b* send the digital speech data to the data process unit 10 via the first data communications section 9c. Then, it goes to Step S1208.

In Step S1208, the information processing terminal 9 makes the first data control section 9b judge whether detection result information about similar speakers in relation to the speech data has been received from the data process unit 10 via the first data communications section 9c. If it is found that detection result information has been received (Yes), the information processing terminal 9 goes to Step S1210. Otherwise (No), it makes the first data control section 9b continue the judging process until detection result information is received.

In Step S1210, the information processing terminal 9 makes the first information display section 9d display the received detection result information under the control of the first data control section 9b. Then, it goes to Step S1212.

In Step S1212, the information processing terminal 9 makes the first data control section 9b judge whether a specific speaker has been selected via the operating section 9e. If it is found that a specific speaker has been selected (Yes), the information processing terminal 9 goes to Step S1214. Otherwise (No), it waits until a specific speaker is selected.

In Step S1214, the information processing terminal 9 makes the first data control section 9b send information about the selected speaker to the data process unit 10 via the first data communications section 9c. Then, it goes to Step S1216.

In Step S1216, the information processing terminal 9 makes the first data control section 9b judge whether the speech data as well as evaluation result information about the selected speaker have been received from the data process unit 10 via the first data communications section 9c. If it is found that they have been received (Yes), the information processing terminal 9 goes to Step S1218. Otherwise (No), it waits until they are received.

In Step S1218, the information processing terminal 9 makes the first information display section 9d display the received evaluation result information under the control of the first data control section 9b. Then, it goes to Step S1200.

Figure 58:
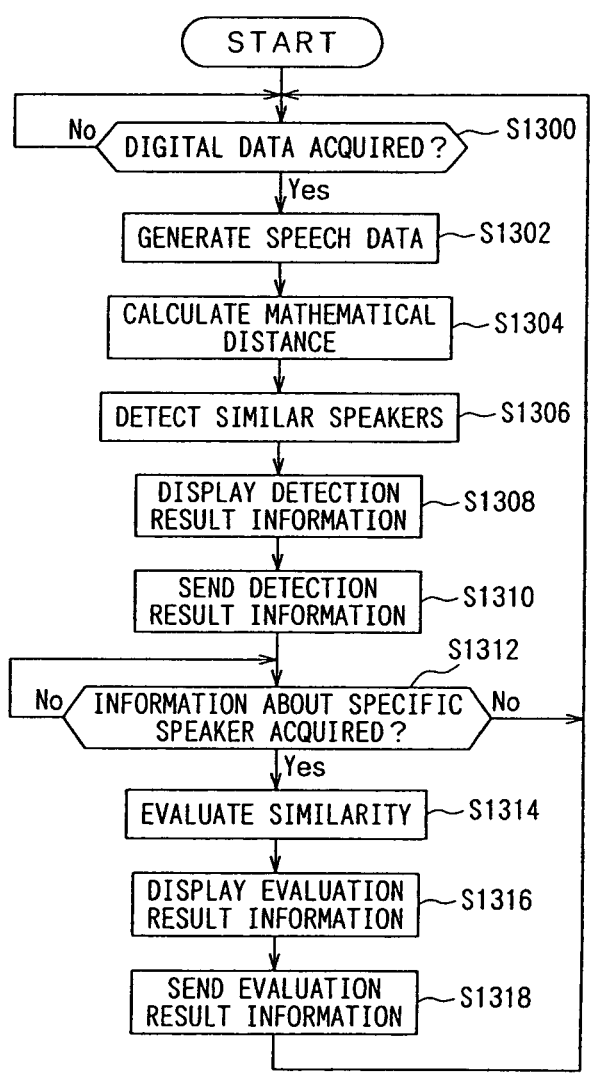
FIG. 58 is a flowchart showing operations and processes performed by the data process unit 10.

Now, with reference to FIG. 58, description will be given of operations and processes performed by the data process unit 10. FIG. 58 is a flowchart showing the operations and processes performed by the data process unit 10.

As shown in FIG. 58, first in Step S1300, the data process unit 10 makes the second data control section 10c judge whether speech data has been acquired from the information processing terminal 9 via the second data communications section 10a. If it is found that speech data has been acquired (Yes), the data process unit 10 goes to Step S1302. Otherwise (No), it makes the second data control section 10c continue the judging process until speech data is acquired.

In Step S1302, the data process unit 10 makes the second data acquiring section 10b extract feature values from the acquired speech data. Then, it goes to Step S1304. Incidentally, according to the first configuration, a pattern with the most similar acoustic characteristics is selected from pattern models of multiple speakers and designated as a pattern model of acquired speech based on likelihood calculation. On the other hand, according to the second configuration, a pattern model of acquired speech is generated from the extracted feature values.

In Step S1304, the data process unit 10 makes the position calculating section 10d calculate the mathematical distance between the pattern model of the acquired speech and the pattern models of the other speakers. Then, it goes to Step S1306.

In Step S1306, the data process unit 10 makes the similar-speaker detecting section 10e detect similar speakers in relation to the acquired speech data based on the calculated mathematical distance. Then, it goes to Step S1308.

In Step S1308, the data process unit 10 makes the second information display section 10g display detection result information, i.e., information about the detection results. Then, it goes to Step S1310.

In Step S1310, the data process unit 10 makes the second data control section 10c send the detection result information to the appropriate information processing terminal 9 via the second data communications section 10a. Then, it goes to Step S1312.

In Step S1312, the data process unit 10 makes the second data control section 10c judge whether information about a selected speaker has been acquired from the information processing terminal 9 via the second data communications section 10a. If it is found that information has been acquired (Yes), the data process unit 10 goes to Step S1314. Otherwise (No), it makes the second data control section 10c continue the judging process until information is acquired.

In Step S1314, the data process unit 10 makes the similarity evaluating section 10f evaluate the similarity between the pattern model of the target speaker and pattern model of the selected speaker. Then, it goes to Step S1316. After the similarity evaluation, the correction information generating section 10h generates correction information for use to enhance similarity in speech between the target speaker and the specific speaker, based on the evaluation results.

In Step S1316, the data process unit 10 makes the second information display section 10g display evaluation result information, i.e., information about the evaluation results. Then, it goes to Step S1318.

In Step S1318, the data process unit 10 makes the second data control section 10c send the evaluation result information to the appropriate information processing terminal 9 via the second data communications section 10a. Then, it goes to Step S1300.

Now, with reference to FIG. 59, description will be given of flow of a display process performed by the information display section 10g to display coordinate information through two-dimensional projection. FIG. 59 is a flowchart showing processes performed by the information display section 10g to display coordinate information through two-dimensional projection.

As shown in FIG. 59, first in Step S1400, the second information display section 10g judges whether the position calculating section 10d has calculated the mathematical distance. If it is found that the mathematical distance has been calculated (Yes), the second information display section 10g goes to Step S1402. Otherwise (No), it waits until the mathematical distance is calculated.

In Step S1402, the second information display section 10g projects the mathematical distance between the pattern model of the target speaker's speech and pattern models of the other speakers two-dimensionally using Sammon's method, a known method. Then, it goes to Step S1404.

In Step S1404, the second information display section 10g displays coordinate information about the pattern models as points on a plane based on the mathematical distance, which is now two-dimensional information resulting from the two-dimensional projection. Then, it finishes processing.

In this way, in the data process unit 10, the second data acquiring section 10b can acquire speech data of the target speaker, the position calculating section 10d and the similar-speaker detecting section 10e can detect speakers similar in speech to the speech data, the second information display section 10g can display detection result information about the detection results as well as display the positional relationship between the pattern model of the target speaker's speech and pattern models of the similar speakers or other speakers as two-dimensional coordinates.

Also, the information processing terminal 9 can acquire the detection result information from the data process unit 10, make the first information display section 9*d* display the detection result information, and allow the target speaker to select and specify a specific speaker based on the displayed detection result information using the operating section 9*e*.

Also, the data process unit 10 can acquire information about the specified specific speaker, make the similarity evaluating section 10*f* evaluate the similarity in speech between the pattern model of the target speaker and pattern model of the selected speaker, and make the second information display section 10*g* display information about the evaluation results.

Also, the information processing terminal 9 can acquire the evaluation result information from the data process unit 10 and make the first information display section 9*d* display the evaluation result information.

In FIG. 52, the speech data acquiring process and transmit process performed by the first data acquiring section 9*a*, first data control section 9*b*, and first data communications section 9*c* correspond to the speech data sending means; the display processes performed by the first data control section 9*b* and first information display section 9*d* to display the detection result information and evaluation result information correspond to the information display means; and the process of selecting specific speakers via the operating section 9*e* corresponds to the specific speaker specifying means.

In FIG. 53, the speech data acquiring process performed by the second data communications section 10*a* and second data acquiring section 10*b* corresponds to the speech data acquiring means; the position calculating section 10*d* corresponds to the position calculating means; similar-speaker detecting section 10*e* corresponds to the similar-speaker detecting means; the similarity evaluating section 10*f* corresponds to the similarity evaluating means; the second information display section 10*g* corresponds to evaluation result display means, and positional relationship information display means; and correction information generating section 10*h* corresponds to the correction information generating means.

Incidentally, although according to the above embodiment, the information processing terminal 9 is connected to the data process unit 10 via the Internet, this is not restrictive. Speech of the target speaker may be inputted directly in the data process unit 10. This will make it easy to accommodate processes which require high response speed such as the process of displaying evaluation results of similarity between inputted target speaker's speech and specific speaker's speech in real time.

What is claimed is:

1. A data process unit comprising:
an acoustic space storing unit for storing an acoustic space composed of a plurality of first pattern models, which are generated from first speech data of a plurality of speakers, and each of which has first 4-dimensional or higher dimensional feature data;
a speech data acquiring unit for acquiring second speech data of a target speaker;
a position calculating unit for:
converting the second speech data acquired by the speech data acquiring unit into second 4-dimensional or higher dimensional feature data;
generating a second pattern model to correspond to the second speech data based on the second 4-dimensional or higher dimensional feature data;
calculating a mathematical distance between the second pattern model and the first pattern models based on the second 4-dimensional or higher dimensional feature data and the first 4-dimensional or higher dimensional feature data; and
calculating a position of the second speech data in the acoustic space based on the mathematical distance;
a positional relationship information display unit for displaying information representing a positional relationship between the second speech data and the first pattern models in the acoustic space, on a two-dimensional plane or in a three-dimensional space with a relationship of the mathematical distance being maintained, based on the position of the second speech data;
a speech data evaluating unit for evaluating a value of the second speech data as a higher value, as the number of first pattern models existing within a predetermined distance from the position of the second speech data unit becomes smaller; and
an evaluation result display unit for displaying an evaluation result evaluated by the speech data evaluating unit.

2. The data process unit according to claim 1, wherein:
the predetermined distance is set stepwise; and
the speech data evaluating unit evaluates the value of the second speech data based on the number of first pattern models existing within each distance range set stepwise.

3. The data process unit according to claim 1, wherein the speech data evaluating unit uses a pattern model similar in feature to the second speech data out of the first pattern models as the second pattern model based on the position.

4. The data process unit according to claim 3, wherein the speech data evaluating unit uses some of the first pattern models similar in feature to the second speech data as the second pattern model.

5. The data process unit according to claim 1, wherein the second pattern model is a pattern model selected from the first pattern models, based on a likelihood of the second 4-dimensional or higher dimensional feature data and the first pattern models.

6. The data process unit according to claim 1, wherein the first pattern models are generated using HMMs (Hidden Markov Models).

7. The data process unit according to claim 1, wherein:
the speech data evaluating unit evaluates the value of the second speech data on a phoneme-by-phoneme basis; and
the evaluation result display unit displays the evaluation result of the second speech data on the phoneme-by-phoneme basis.

8. The data process unit according to claim 1, wherein the evaluation result display unit displays supplementary information of the second speech data when the speech data evaluating unit evaluates that the value of the second speech data is low.

9. The data process unit according to claim 1, further comprising:
a negotiating unit for negotiating with the target speaker on whether the speech data can be provided; and
a speech data storing unit for storing the second speech data over which a negotiation by the negotiating unit is completed successfully.

10. The data process unit according to claim 1, wherein the second pattern model and the first pattern models each have the first 4-dimensional or higher dimensional feature, and the mathematical distance is calculated based on the second 4-dimensional or higher dimensional feature and the first 4-dimensional or higher dimensional feature, wherein the second pattern model and the first pattern models are generated by using Hidden Markov Models (HMM), and wherein the mathematical distance is calculated according to Euclidean distance determined based on a mean vector normalized by a product of standard deviations of normal distributions between the second pattern model and the first pattern models.

11. A data process system comprising:

an information processing terminal which is under control of a target speaker; and the data process unit according to claim 1, wherein:

the information processing terminal and the data process unit are communicably connected with each other, the information processing terminal comprises a speech data sending unit for acquiring the second speech data and sending the second speech data to the data process unit, and an evaluation information display unit for displaying information about the evaluation result of the second speech data acquired from the data process unit, and the data process unit comprises an evaluation information sending unit for sending the information about the evaluation result to the information processing terminal.

12. An information processing terminal applicable to the data process system according to claim 11, the information processing terminal comprising:

a speech data sending unit for acquiring the second speech data and sending the second speech data to the data process unit; and an evaluation information display unit for displaying information on an evaluation result of the second speech data acquired from the data process unit.

13. A non-transitory computer-readable storage medium containing instructions for controlling the information processing terminal according to claim 12, to perform a method, the method comprising:

acquiring the second speech data of and sending the second speech data to the data process unit; and displaying information on an evaluation result of the second speech data acquired from the data process unit.

14. A data process method comprising the steps of:

preparing an acoustic space composed of a plurality of first pattern models, which are generated from first speech data of a plurality of speakers, and each of which has first 4-dimensional or higher dimensional feature data;

acquiring second speech data of a target speaker;

converting the second speech data into second 4-dimensional or higher dimensional feature data;

generating a second pattern model to correspond to the second speech data based on the second 4-dimensional or higher dimensional feature data;

calculating a mathematical distance between the second pattern model and the first pattern models based on the second 4-dimensional or higher dimensional feature data generated and the first 4-dimensional or higher dimensional feature data;

calculating a position of the second speech data in the acoustic space based on the mathematical distance;

displaying information representing a positional relationship between the second speech data and the first pattern models in the acoustic space, on a two-dimensional plane or in a three-dimensional space with a relationship of the mathematical distance being maintained, based on the position of the second speech data;

evaluating a value of the second speech data as a higher value, as the number of first pattern models existing within a predetermined distance from the position of the second speech data becomes smaller; and displaying a result evaluated.

15. A non-transitory computer-readable storage medium containing instructions for controlling a data process unit to perform a method, the method comprising:

storing an acoustic space composed of a plurality of first pattern models, which are generated from first speech data of a plurality of speakers, and each of which has first 4-dimensional or higher dimensional feature data;

acquiring second speech data of a target speaker;

converting the second speech data into second 4-dimensional or higher dimensional feature data;

generating a second pattern model to correspond to the second speech data based on the second 4-dimensional or higher dimensional feature data;

calculating a mathematical distance between the second pattern model and the first pattern models based on the second 4-dimensional or higher dimensional feature data and the first 4-dimensional or higher dimensional feature data;

calculating a position of the second speech data in the acoustic space based on the mathematical distance;

displaying information representing a positional relationship between the second speech data and the first pattern models in the acoustic space, on a two-dimensional plane or in a three-dimensional space with a relationship of the mathematical distance being maintained, based on the position of the second speech data;

evaluating a value of the second speech data as a higher value, as the number of first pattern models existing within a predetermined distance from the position of the second speech data becomes smaller; and displaying a result evaluated.

16. A non-transitory computer-readable storage medium containing instructions for controlling a data process unit to perform a method, the method comprising:

storing an acoustic space composed of a plurality of first pattern models, which are generated from first speech data of a plurality of speakers, and each of which has first 4-dimensional or higher dimensional feature data;

acquiring second speech data of a target speaker;

converting the second speech data into second 4-dimensional or higher dimensional feature data;

generating a second pattern model to correspond to the second speech data based on the second 4-dimensional or higher dimensional feature data;

calculating a mathematical distance between the second pattern model and the first pattern models based on the second 4-dimensional or higher dimensional feature data and the first 4-dimensional or higher dimensional feature data;

calculating a position of the second speech data in the acoustic space based on the mathematical distance;

displaying information representing a positional relationship between the second speech data and the first pattern models in the acoustic space, on a two-dimensional plane or in a three-dimensional space with a relationship of the mathematical distance being maintained, based on the position of the second speech data;

evaluating a value of the second speech data as a higher value, as the number of first pattern models existing within a predetermined distance from the position becomes smaller; and displaying a result evaluated.

17. A data process unit comprising:
an acoustic space storing unit for storing an acoustic space composed of a plurality of first pattern models, which are generated from first speech data of a plurality of speakers, and each of which has first 4-dimensional or higher dimensional feature data;
a speech data acquiring unit for acquiring second speech data of a target speaker;
a position calculating unit for:
converting the second speech data into second 4-dimensional or higher dimensional feature data,
generating a second pattern model to correspond to the second speech data based on the second 4-dimensional or higher dimensional feature data,
calculating a mathematical distance between the second pattern model and the first pattern models based on the second 4-dimensional or higher dimensional feature data and the first 4-dimensional or higher dimensional feature data, and
calculating a position of the second speech data in the acoustic space based on the mathematical distance;
a similar-speaker detecting unit for detecting a similar speaker who is similar in speech to the target speaker out of the speakers, based on the position of the second speech data and the first pattern models; and
a positional relationship information display unit for displaying information representing a positional relationship between the second speech data and a third pattern model of the similar speaker in the acoustic space, on a two-dimensional plane or in a three-dimensional space with a relationship of the mathematical distance being maintained, based on the position of the second speech data,
wherein the second pattern model and the first pattern models are generated by using Hidden Markov Models (HMM), and
wherein the mathematical distance is calculated according to Euclidean distance determined based on a mean vector normalized by a product of standard deviations of normal distributions between the second pattern model and the first pattern models.

18. The data process unit according to claim 17, further comprising:
a specific speaker specifying unit for specifying a specific speaker among the speakers;
a similarity evaluating unit for evaluating a similarity in speech between the specific speaker and the target speaker based on the position of the second speech data and a fourth pattern model of the specific speaker in the acoustic space; and
an evaluation result display unit for displaying an evaluation result evaluated by the similarity evaluating unit,
wherein the positional relationship information display unit displays information about a positional relationship between the second speech data and the fourth pattern model in the acoustic space based on the position of the second speech data and the fourth pattern model.

19. The data process unit according to claim 18, further comprising:
a correction information generating unit for generating correction information which indicates a correction to be made to the speech of the target speaker in order to enhance the similarity in speech between the target speaker and the specific speaker based on the evaluation result evaluated by the similarity evaluating unit; and
a correction information display unit for displaying the correction information.

20. The data process unit according to claim 18, wherein the similarity evaluating unit evaluates the similarity of the second speech data on a phoneme-by-phoneme basis.

21. The data process unit according to claim 18, wherein:
the acoustic space is composed of the first pattern models generated from the first speech data made in a plurality of speech styles; and
the similarity evaluating unit evaluates the similarity in each of the speech styles.

22. The data process unit according to claim 21, wherein the positional relationship information display unit establishes a coordinate axis of a low dimensional space based on the speech styles corresponding to the first pattern models.

23. The data process unit according to claim 17, wherein the second pattern model is a pattern model selected from the first pattern models, based on a likelihood of the second 4-dimensional or higher dimensional feature, and the first pattern models.

24. A data process unit comprising:
an acoustic space storing unit for storing an acoustic space composed of a plurality of first pattern models, which are generated from first speech data of a plurality of speakers, and each of which has first 4-dimensional or higher dimensional feature data;
a specific speaker specifying unit for specifying a specific speaker among the plurality speakers;
a speech data acquiring unit for acquiring second speech data of a target speaker;
a position calculating unit for:
converting the second speech data into second 4-dimensional or higher dimensional feature data,
generating a second pattern model to correspond to the second speech data based on the second 4-dimensional or higher dimensional feature data converted,
calculating a mathematical distance between the second pattern model and the first pattern models based on the second 4-dimensional or higher dimensional feature data and the first 4-dimensional or higher dimensional feature data, and
calculating a position of the second speech data in the acoustic space based on the mathematical distance;
a similarity evaluating unit for evaluating a similarity in speech between the specific speaker and the target speaker based on the position of the second speech data and a fourth pattern model of the specific speaker in the acoustic space;
an evaluation result display unit for displaying an evaluation result evaluated by the similarity evaluating unit; and
a positional relationship information display unit for displaying information representing a positional relationship between the second speech data and the fourth pattern model in the acoustic space, on a two-dimensional plane or in a three-dimensional space with a relationship of the mathematical distance being maintained, based on the position of the second speech data,
wherein the second pattern model and the first pattern models are generated by using Hidden Markov Models (HMM), and
wherein the mathematical distance is calculated according to Euclidean distance determined based on a mean vector normalized by a product of standard deviations of normal distributions between the second pattern model and the first pattern models.

25. The data process unit according to claim 24, wherein:
the similar-speaker detecting unit uses the fourth pattern model which is similar in feature to the second speech data, out of the first pattern models, as the second pattern model based on the position of the second speech data; and the similarity evaluating unit uses the fourth pattern model which is similar in feature to the second speech data, out of the first pattern models, as the second pattern model based on the position of the second speech data.

26. The data process unit according to claim 24, wherein:
the similar-speaker detecting unit uses some top models of the first pattern models which are similar in feature to the second speech data, out of the first pattern models, as the second pattern model based on the position of the second speech data; and
the similarity evaluating unit uses some of the first pattern models which are similar in feature to the second speech data, out of the first pattern models, as the second pattern model based on the position of the second speech data.

27. A data process system comprising:
an information processing terminal which is under control of a target speaker; and
the data process unit according to claim 17, wherein:
the information processing terminal and the data process unit are communicably connected with each other,
the information processing terminal comprises a speech data sending unit for acquiring the second speech data and sending the second speech data to the data process unit, and an information display unit for displaying information about a result of processing of the second speech data acquired from the data process unit, and
the data process unit comprises an information sending unit for sending the information about the result of processing of the second speech data to the information processing terminal.

28. A data process method comprising the steps of:
preparing an acoustic space composed of a plurality of first pattern models, which are generated from first speech data of a plurality of speakers, and each of which has first 4-dimensional or higher dimensional feature data;
acquiring second speech data of a target speaker;
converting the second speech data into second 4-dimensional or higher dimensional feature data;
generating a second pattern model to correspond to the second speech data based on the second 4-dimensional or higher dimensional feature data;
calculating a mathematical distance between the second pattern model and the first pattern models based on the second 4-dimensional or higher dimensional feature data and the first 4-dimensional or higher dimensional feature data;
calculating a position of the second speech data in the acoustic space based on the mathematical distance;
detecting a similar speaker who is similar in speech to the target speaker out of the speakers based on the position and the first pattern models; and
displaying information representing a positional relationship between the second speech data and a third pattern model of the similar speaker in the acoustic space, on a two-dimensional plane or in a three-dimensional space with a relationship of the mathematical distance being maintained, based on the position,
wherein the second pattern model and the first pattern models are generated by using Hidden Markov Models (HMM), and
wherein the mathematical distance is calculated according to Euclidean distance determined based on a mean vector normalized by a product of standard deviations of normal distributions between the second pattern model and the first pattern models.

29. A data process method comprising the steps of:
preparing an acoustic space composed of a plurality of first pattern models, which are generated from first speech data of a plurality of speakers, and each of which has first 4-dimensional or higher dimensional feature data;
specifying a specific speaker among the speakers;
acquiring second speech data of a target speaker;
converting the second speech data into second 4-dimensional or higher dimensional feature data;
generating a second pattern model to correspond to the second speech data based on the second 4-dimensional or higher dimensional feature data;
calculating a mathematical distance between the second pattern model and the first pattern models based on the second 4-dimensional or higher dimensional feature data and the first 4-dimensional or higher dimensional feature data;
calculating a position of the second speech data of in the acoustic space based on the mathematical distance;
evaluating a similarity in speech between the specific speaker and the target speaker based on the position of the second speech data and a fourth pattern model of the specific speaker;
displaying an evaluation result; and
displaying information representing a positional relationship between the second speech data and the fourth pattern model in the acoustic space, on a two-dimensional plane or in a three-dimensional space with a relationship of the mathematical distance being maintained, based on the position of the second speech data,
wherein the second pattern model and the first pattern models are generated by using Hidden Markov Models (HMM), and
wherein the mathematical distance is calculated according to Euclidean distance determined based on a mean vector normalized by a product of standard deviations of normal distributions between the second pattern model and the first pattern models.

30. A non-transitory computer-readable storage medium containing instructions for controlling a data process unit to perform a method, the method comprising:
storing an acoustic space composed of a plurality of first pattern models, which are generated from first speech data of a plurality of speakers, and each of which has first 4-dimensional or higher dimensional feature data;
acquiring second speech data of a target speaker;
converting the second speech data into second 4-dimensional or higher dimensional feature data;
generating a second pattern model to correspond to the second speech data based on the second 4-dimensional or higher dimensional feature data;
calculating a mathematical distance between the second pattern model and the first pattern models based on the second 4-dimensional or higher dimensional feature data and the first 4-dimensional or higher dimensional feature data;
calculating a position of the second speech data in the acoustic space based on the mathematical distance;
detecting a similar speaker who is similar in speech to the target speaker out of the speakers based on the position of the second speech data and the first pattern models;
displaying information representing a positional relationship between the second speech data and a third pattern model of the similar speaker in the acoustic space, on a two-dimensional plane or in a three-dimensional space with a relationship of the mathematical distance being maintained, based on the position of the second speech data, wherein the second pattern model and the first pattern models are generated by using Hidden Markov Models (HMM), and wherein the mathematical distance is calculated according to Euclidean distance determined based on a mean vector normalized by a product of standard deviations of normal distributions between the second pattern model and the first pattern models.

31. A non-transitory computer-readable storage medium containing instructions for controlling a data process unit to perform a method, the method comprising:

storing an acoustic space composed of a plurality of first pattern models, which are generated from first speech data of a plurality of speakers, and each of which has first 4-dimensional or higher dimensional feature data;

specifying a specific speaker among the speakers;

acquiring second speech data of a target speaker;

converting the second speech data into second 4-dimensional or higher dimensional feature data;

generating a second pattern model to correspond to the second speech data based on the second 4-dimensional or higher dimensional feature data;

calculating a mathematical distance between the second pattern model and the first pattern models based on the second 4-dimensional or higher dimensional feature data and the first 4-dimensional or higher dimensional feature data;

calculating a position of the second speech data in the acoustic space based on the mathematical distance;

evaluating a similarity in speech between the specific speaker and the target speaker based on the position of the second speech data and a fourth pattern model of the specific speaker;

displaying an evaluation result; and displaying information representing a positional relationship between the second speech data and the fourth pattern model in the acoustic space, on a two-dimensional plane or in a three-dimensional space with a relationship of the mathematical distance being maintained, based on the position of the second speech data, wherein the second pattern model and the first pattern models are generated by using Hidden Markov Models (HMM), and wherein the mathematical distance is calculated according to Euclidean distance determined based on a mean vector normalized by a product of standard deviations of normal distributions between the second pattern model and the first pattern models.

* * * * *